United States Patent [19]

Hiyoshi et al.

[11] Patent Number: 5,290,964
[45] Date of Patent: Mar. 1, 1994

[54] MUSICAL TONE CONTROL APPARATUS USING A DETECTOR

[75] Inventors: Teruo Hiyoshi; Kinpara Mamoru; Suzuki Hideo; Akira Nakada; Eiichiro Aoki; Masao Sakama, all of Hamamatsu, Japan

[73] Assignee: Yamaha Corporation, Hamamatsu, Japan

[21] Appl. No.: 943,128

[22] Filed: Sep. 10, 1992

Related U.S. Application Data

[63] Continuation of Ser. No. 489,777, Mar. 5, 1990, abandoned, which is a continuation of Ser. No. 108,205, Oct. 13, 1987, abandoned.

[30] Foreign Application Priority Data

| Oct. 14, 1986 | [JP] | Japan | 61-243348 |
|---|---|---|---|
| Oct. 31, 1986 | [JP] | Japan | 61-259805 |
| Nov. 7, 1986 | [JP] | Japan | 61-265167 |
| Nov. 18, 1986 | [JP] | Japan | 61-274345 |
| Nov. 22, 1986 | [JP] | Japan | 61-279028 |
| Nov. 22, 1986 | [JP] | Japan | 61-279030 |
| Nov. 25, 1986 | [JP] | Japan | 61-280426 |
| Dec. 2, 1986 | [JP] | Japan | 61-287392 |
| Feb. 20, 1987 | [JP] | Japan | 62-37295 |

[51] Int. Cl.$^5$ .................. G10H 7/00; G10H 5/00
[52] U.S. Cl. .................. 84/600; 84/615; 84/622; 84/626; 84/644; 84/653; 84/658; 84/670; 84/723; 84/735; 84/737; 84/743; 84/DIG. 7; 84/DIG. 12
[58] Field of Search .................. 84/622

[56] References Cited

U.S. PATENT DOCUMENTS

| 1,661,058 | 2/1928 | Theremin . | |
|---|---|---|---|
| 3,383,487 | 5/1968 | Wiener | 335/2 X |
| 3,704,339 | 11/1972 | Niinomi . | |
| 3,705,948 | 12/1972 | Tomisawa | 84/1.24 |
| 3,749,810 | 7/1973 | Dow . | |
| 3,793,890 | 2/1974 | Anderson et al. | 73/503 X |
| 3,823,245 | 7/1974 | Suzuki | 84/1.04 |
| 3,865,001 | 2/1975 | Hershey | 84/DIG. 27 |
| 3,935,669 | 2/1976 | Potrzuski et al. . | |
| 4,095,547 | 6/1978 | Benington | 73/503 |
| 4,138,600 | 2/1979 | Ozols | 200/61.47 |
| 4,241,636 | 12/1980 | Long . | |
| 4,276,802 | 7/1981 | Mieda | 84/700 |
| 4,341,140 | 7/1982 | Ishida | 84/1.27 X |
| 4,365,512 | 12/1982 | Woodruff | 73/503 |
| 4,377,961 | 3/1983 | Bode | 84/681 |
| 4,429,607 | 2/1984 | Meno . | |
| 4,502,035 | 2/1985 | Obenauf et al. | 340/669 X |
| 4,627,324 | 12/1986 | Zwosta | 84/1.24 X |

(List continued on next page.)

FOREIGN PATENT DOCUMENTS

| 3436703 | 4/1986 | Fed. Rep. of Germany . |
|---|---|---|
| 2206030 | 5/1974 | France . |
| 2543722 | 10/1984 | France . |
| 2547093 | 12/1984 | France . |

OTHER PUBLICATIONS

WIPO 87/92168 to Sigalov.

*Primary Examiner*—Matthew S. Smith
*Attorney, Agent, or Firm*—Graham & James

[57] ABSTRACT

A musical tone control apparatus controls a musical tone corresponding to a movement itself of an object and the like which is detected by a detector Such detector detects also a moving speed, a moving force, a moving angle or an intensity of given impulse of the object. In the case where the detector is mounted in the vicinity of a player's joint, the detector detects a revolving or bending angle of the player's joint. Hence, the musical tone can be controlled based on such angle of the player's joint. Thus, through this musical tone control apparatus, the player can generate a musical tone having, for example, a desirable tone pitch, a desirable volume and a desirable tone color based on the movement of the object or the player's joint.

82 Claims, 33 Drawing Sheets

U.S. PATENT DOCUMENTS

| | | | |
|---|---|---|---|
| 4,635,516 | 1/1987 | Giannini | 84/DIG. 8 X |
| 4,662,260 | 5/1987 | Rumsey | 84/1.01 |
| 4,757,737 | 7/1988 | Conti | 84/681 |
| 4,776,253 | 10/1988 | Downes | 84/645 |
| 4,860,364 | 8/1989 | Giannini | 84/DIG. 7 |
| 4,905,560 | 3/1990 | Suzuki et al. | |
| 4,909,117 | 3/1990 | Reiling et al. | 84/738 |
| 4,920,848 | 5/1990 | Suzuki | |
| 4,962,688 | 10/1990 | Suzuki et al. | 84/600 |
| 4,977,811 | 12/1990 | Suzuki et al. | 84/600 |
| 4,995,294 | 2/1991 | Kashio et al. | 84/DIG. 7 |
| 4,998,457 | 3/1991 | Suzuki et al. | 84/DIG. 7 |
| 5,005,460 | 4/1991 | Suzuki et al. | 84/615 X |
| 5,022,303 | 6/1991 | Suzuki et al. | 84/600 |
| 5,105,708 | 4/1992 | Suzuki et al. | 84/600 |
| 5,125,313 | 6/1992 | Hiyoshi et al. | 84/600 |
| 5,127,301 | 7/1992 | Suzuki et al. | 84/600 |
| 5,147,969 | 9/1992 | Hiyoshi et al. | 84/600 |
| 5,151,553 | 9/1992 | Suzuki et al. | 84/600 |
| 5,157,213 | 10/1992 | Kashio et al. | 84/622 |
| 5,166,462 | 11/1992 | Suzuki et al. | 84/600 |
| 5,166,463 | 11/1992 | Weber | 84/600 |
| 5,170,002 | 12/1992 | Suzuki et al. | 84/600 |
| 5,171,930 | 12/1992 | Teaney | 84/735 X |
| 5,177,311 | 1/1993 | Suzuki et al. | 84/600 |
| 5,192,823 | 3/1993 | Suzuki et al. | 84/600 |
| 5,216,193 | 6/1993 | Masubuchi | 84/600 |

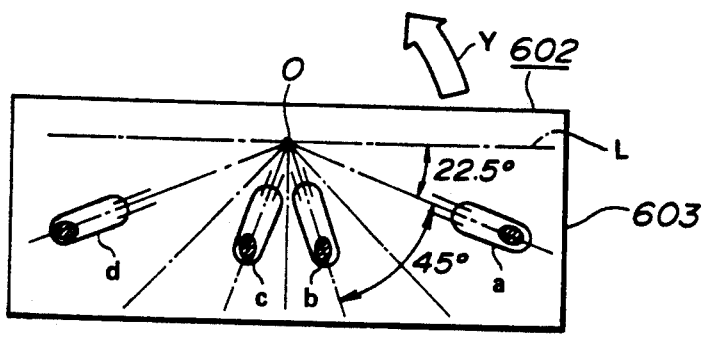
FIG. 43
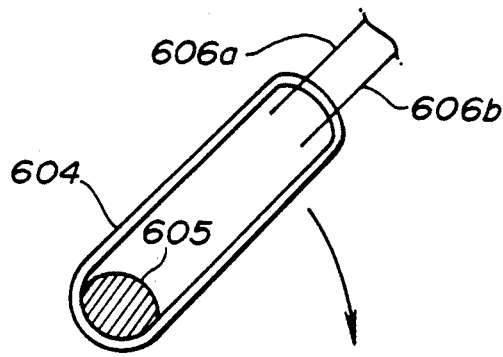
FIG. 44
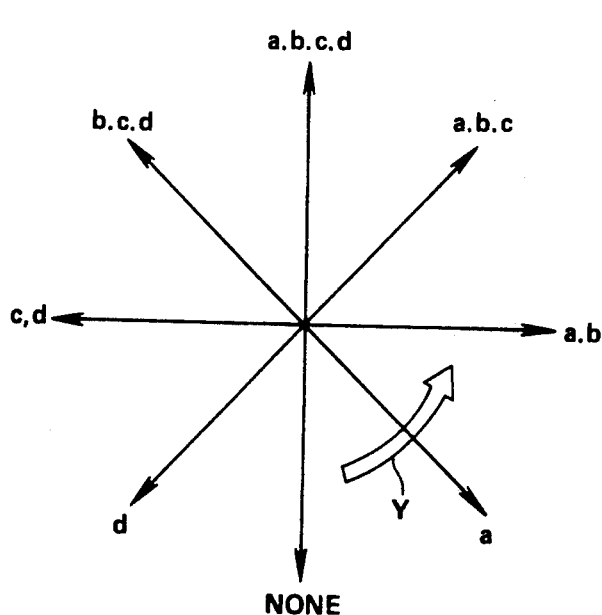
FIG. 45
| SWITCH ON | TONE PITCH | KEY CODE DATA |
|---|---|---|
| NONE | $C_3$ | 60 |
| a | $D_3$ | 62 |
| a, b | $E_3$ | 64 |
| a,b,c | $F_3$ | 65 |
| a,b,c,d | $G_3$ | 67 |
| b,c,d | $A_3$ | 69 |
| c,d | $B_3$ | 71 |
| d | $C_4$ | 72 |
| OTHER | — | 0 |
FIG. 46

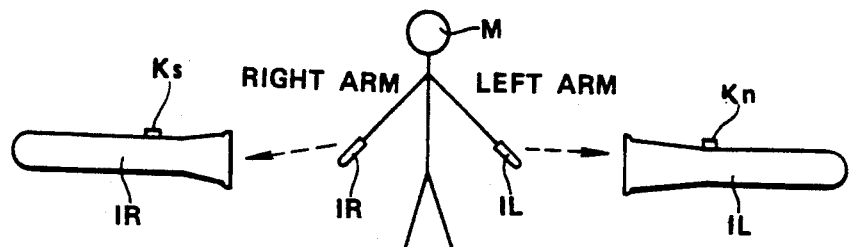
FIG.49A
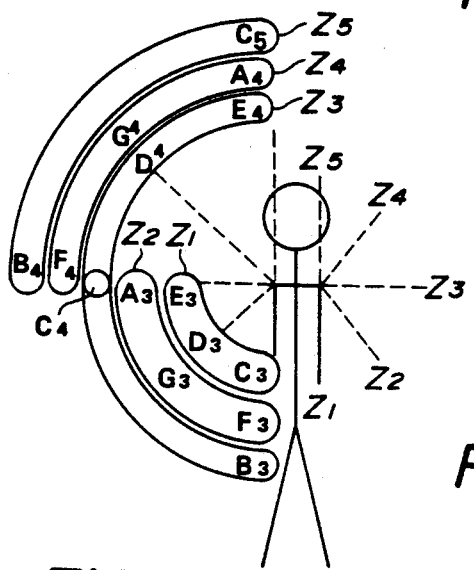
FIG.49B
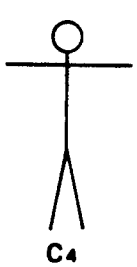
FIG.49C  FIG.49E
FIG.49D
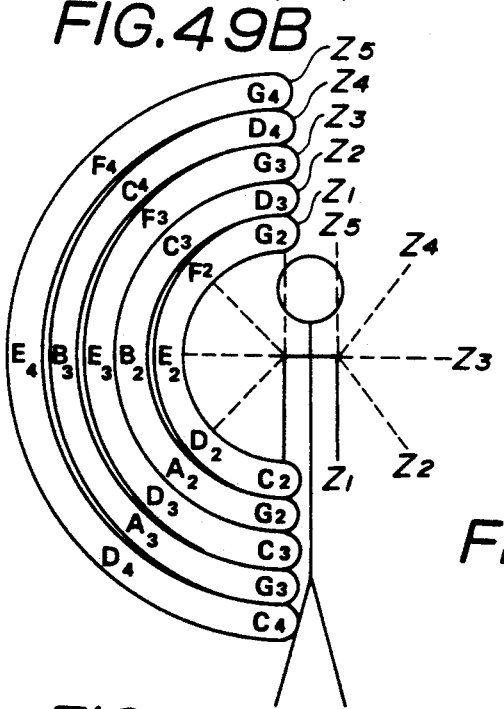
FIG.49F
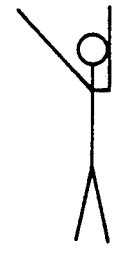
FIG.49G  FIG.49I
FIG.49H

|  | (RIGHT) | | | | |
|---|---|---|---|---|---|
| (LEFT) | | 0° | 45° | 90° | 135° | 180° |
| | 0° | F2 | G2 | A2 | B2 | C3 |
| | 45° | C3 | D3 | E3 | F3 | G3 |
| | 90° | G3 | A3 | B3 | C4 | D4 |
| | 135° | D4 | E4 | F4 | G4 | A4 |
| | 180° | A4 | B4 | C5 | D5 | E5 |

FIG. 52

| S1 (SWITCH 705) | "1" | "1" | "0" |
|---|---|---|---|
| S2 (SWITCH 706) | "0" | "1" | "1" |
| F2#~F3 | Major | 7th | miner |
| F3#~F4 | M7 | m7 | b5 |
| F4#~E5 | M6 | dim | Aug |

FIG. 53

MUSICAL TONE CONTROL APPARATUS USING A DETECTOR

This is a continuation of copending application Ser. No. 07/489,777 filed on Mar. 5, 1990, now abandoned, which was a continuation of application Ser. No. 108,205 filed on Oct. 13, 1987, now abandoned.

BACKGROUND OF THE INVENTION

1. Field of the Invention

The present invention generally relates to a musical tone control apparatus using a detector, and more particularly to a musical tone control apparatus which controls a musical tone in response to a movement of a player and the like detected by a detector.

2. Prior Art

Conventionally, musical tones are generated by playing a natural musical instrument (such as a violin, a piano, an organ and a bass drum) and an electronic musical instrument and the like. In such musical instruments, a tone pitch and a tone color of the generating musical tone is controlled by touching or depressing keys, strings or pedals by use of hands or feet of the player.

SUMMARY OF THE INVENTION

It is a primary object of the invention to provide a musical tone control apparatus which controls the musical tones based on the movement of the player such as the swing angle or the swing speed of the player's hand.

It is another object of the invention to provide an apparatus which generates artificial musical tones corresponding to natural tones generated by the player.

It is a further object of the invention to provide a detector which detects the movement of the player and an impulse given to the player's hand and the like.

In a first aspect of the invention, there is provided a musical tone control apparatus comprising: (a) detector means for detecting a movement itself of an object; (b) musical tone control means for controlling a musical tone signal based on a detecting result of the detector means; and (c) musical tone generating means for generating a musical tone corresponding to the musical tone signal.

In a second aspect of the invention, there is provided a musical tone control apparatus comprising: (a) detecting means for detecting a swing movement itself of an object to be detected; and (b) means for outputting musical tone control data which control a musical tone signal based on a detecting result of the detecting means.

In a third aspect of the invention, there is provided a musical tone control apparatus comprising: (a) detecting means for detecting acceleration of an object to be detected; and (b) means for outputting musical tone control data which control a musical tone signal based on a detecting result of the detecting means.

In a fourth aspect of the invention, there is provided a musical tone control apparatus comprising: (a) acceleration sensor means being connected to the predetermined part of the human body; (b) first detecting means for outputting a first detection signal when an output level of the acceleration sensor means becomes higher than a predetermined first level; (c) second detecting means for outputting a second detection signal when a level of a higher harmonic component included in the output signal of the acceleration sensor means becomes higher than a predetermined second level; (d) hold means for holding the higher harmonic component level when both of the first and second detection signals are outputted respectively from the first and second detecting means; and (e) first means for generating first musical tone control data which control a musical tone signal based on a detecting result of the first detecting means.

In a fifth aspect of the invention, there is provided a musical tone control apparatus comprising: (a) acceleration sensor means being mounted at the predetermined part of the human body; (b) first detecting means for outputting a first detection signal the level of which becomes a predetermined level while an output level of the acceleration sensor means becomes higher than a level of a first reference signal; (c) amplifier means for amplifying a higher harmonic component included within the output signal of the acceleration sensor; (d) second detecting means for outputting a second detection signal the level of which becomes a predetermined level while the output level of the amplifier means becomes higher than a level of a second reference signal; (e) interrupt signal generating means for generating an interrupt signal representing that both levels of the first and second detection signals become identical to the predetermined level; (f) hold means for holding a peak value of the higher harmonic component in response to a timing of the second detection signal; (g) analog-to-digital converter means for converting the peak value of the higher harmonic component into digital data representing the intensity of impulse; and (h) central processing means for converting the digital data into tone pitch data representing a tone pitch of a musical tone in response to the timing of the interrupt signal.

In a sixth aspect of the invention, there is provided a musical tone generating apparatus comprising: (a) acceleration sensor means being mounted at the predetermined part of the human body; (b) first detecting means for outputting a first detection signal the level of which becomes a predetermined level while an output level of the acceleration sensor means becomes higher than a level of a first reference signal; (c) amplifier means for amplifying a higher harmonic component included within the output signal of the acceleration sensor; (d) second detecting means for outputting a second detection signal the level of which becomes a predetermined level while the output level of the amplifier means becomes higher than a level of a second reference signal; (e) interrupt signal generating means for generating an interrupt signal representing that both levels of the first and second detection signals become identical to the predetermined level; (f) hold means for holding a peak value of the higher harmonic component in response to a timing of the second detection signal; (g) analog-to-digital converter means for converting the peak value of the higher harmonic component into digital data representing the intensity of impulse; (h) central processing means for converting the digital data into tone pitch data representing a tone pitch of a musical tone in response to the timing of the interrupt signal; and (i) musical tone generating means for generating a musical tone based on the tone pitch data.

In a seventh aspect of the invention, there is provided a musical tone control apparatus comprising: (a) a first integration circuit for integrating an acceleration signal outputted from an acceleration sensor which detects an acceleration of an object so as to convert the acceleration signal into a speed signal representing a moving speed of the object; (b) a second integration circuit for integrating the speed signal so as to convert the speed signal into a distance signal representing a moving distance of the object; (c) control means for controlling integration actions of the first and second integration circuit based on a level of the acceleration signal in a predetermined period; and (d) generating means for generating a musical tone signal in accordance with the distance signal.

In an eighth aspect of the invention, there is provided a musical tone control apparatus comprising: (a) a first integration circuit for integrating an acceleration signal outputted from an acceleration sensor which detects an acceleration of the object so as to convert the acceleration signal into a speed signal representing a moving speed of the object; (b) a second integration circuit for integrating the speed signal so as to convert the speed signal into a distance signal representing a moving distance of the object; and (c) control means for controlling integration actions of the first and second integration circuit based on a level of the acceleration signal in an acceleration increasing period when the acceleration of the object is increasing, the control means outputting an interrupt signal at a timing when the acceleration increasing period is ended; (d) a central processing unit supplied with the interrupt signal; (e) analog-to-digital converter means for converting the speed signal and the distance signal into respective digital data at a timing of the interrupt signal under a control of the central processing unit; (f) register means for storing the digital data therein, the central processing unit reading out the digital data stored in the register means so as to output the digital data corresponding to the speed signal as volume data and also output the digital data corresponding to the distance signal as tone pitch data; (g) sound generator means for generating a musical tone signal representing a musical tone having a volume corresponding to the volume data and a tone pitch corresponding to the tone pitch data; and (h) musical tone generating means for generating the musical tone based on the musical tone signal.

In a ninth aspect of the invention, there is provided a musical tone control apparatus comprising: (a) detecting means for detecting characteristics of a tone which is generated based on an action of a player; and (b) means for generating musical tone control data based on a detecting result of the detecting means.

In a tenth aspect of the invention, there is provided a musical tone control apparatus comprising: (a) detecting means for detecting a bending or revolving movement of a joint of a player; and (b) means for generating musical tone control data which control a musical tone signal based on a detecting result of the detecting means.

In an eleventh aspect of the invention, there is provided a musical tone control apparatus comprising: (a) detecting means for detecting a bending angle or a revolving angle of a predetermined portion of a player; and (b) means for generating musical tone control data which control a musical tone signal based on a detecting result of the detecting means.

In a twelfth aspect of the invention, there is provided a musical tone control apparatus comprising: (a) angle detecting means for detecting an angle formed between an object and a reference plane and generating an angle signal representative of the detected angle; and (b) means for generating musical tone control data which control an external musical tone generating apparatus based on the angle signal.

In a thirteenth aspect of the invention, there is provided a musical tone control apparatus comprising: (a) detecting means for detecting a position of at least a predetermined portion of a player's body with respect to a reference point; and (b) generating means for generating musical tone control data which control the musical tone based on a detecting result of the detecting means, the musical tone control data being supplied to the musical tone generating apparatus.

In a fourteenth aspect of the invention, there is provided a musical tone control apparatus comprising: (a) detecting means mounted on in the vicinity of a joint portion of a player, the detecting means detecting an angle of the joint portion; (b) means for detecting a revolving angular velocity of the joint portion based on a variation of the angle detected by the detecting means in lapse of time; and (c) generating means for generating a musical tone signal in accordance with the distance signal.

In a fifteenth aspect of the invention, there is provided a musical tone control apparatus comprising: (a) a hollow case; (b) a plurality of contacts arranged within the inside of the hollow case; (c) conductive fluid enclosed within the hollow case, the conductive fluid moving or flowing in response to an inclination of the hollow case so as to electrically connect between two contacts among the plural contacts, the hollow case generating an angle signal representative of the inclination of the hollow case in response to connected contacts; and (d) generating means for generating musical tone control data which control a musical tone to be generated based on the angle signal.

BRIEF DESCRIPTION OF THE DRAWINGS

Further objects and advantages of the present invention will be apparent from the following description, reference being made to the accompanying drawings wherein preferred embodiments of the present invention are clearly shown.

In the drawings:

FIG. 43 shows a mechanical constitution of a angle detector 602 provided in the stick 601;

FIG. 44 shows a construction of detecting switches a to d which are mounted on the angle detector 602;

FIG. 45 shows a relation between relative positions and on/off states of the detecting switches a to d;

FIG. 46 shows a relation among the on/off states of the detecting switches a to d, tone pitches and key code data KC;

FIGS. 49A to 49I are drawings for explaining an operation and a performance of the third embodiment;

FIG. 52 is a drawing for explaining an operation for generating a melody tone in the fourth embodiment;

FIG. 53 is a drawing for explaining an operation for generating an accompaniment tone in the fourth embodiment;

DESCRIPTION OF THE PREFERRED EMBODIMENTS

Figure 1:
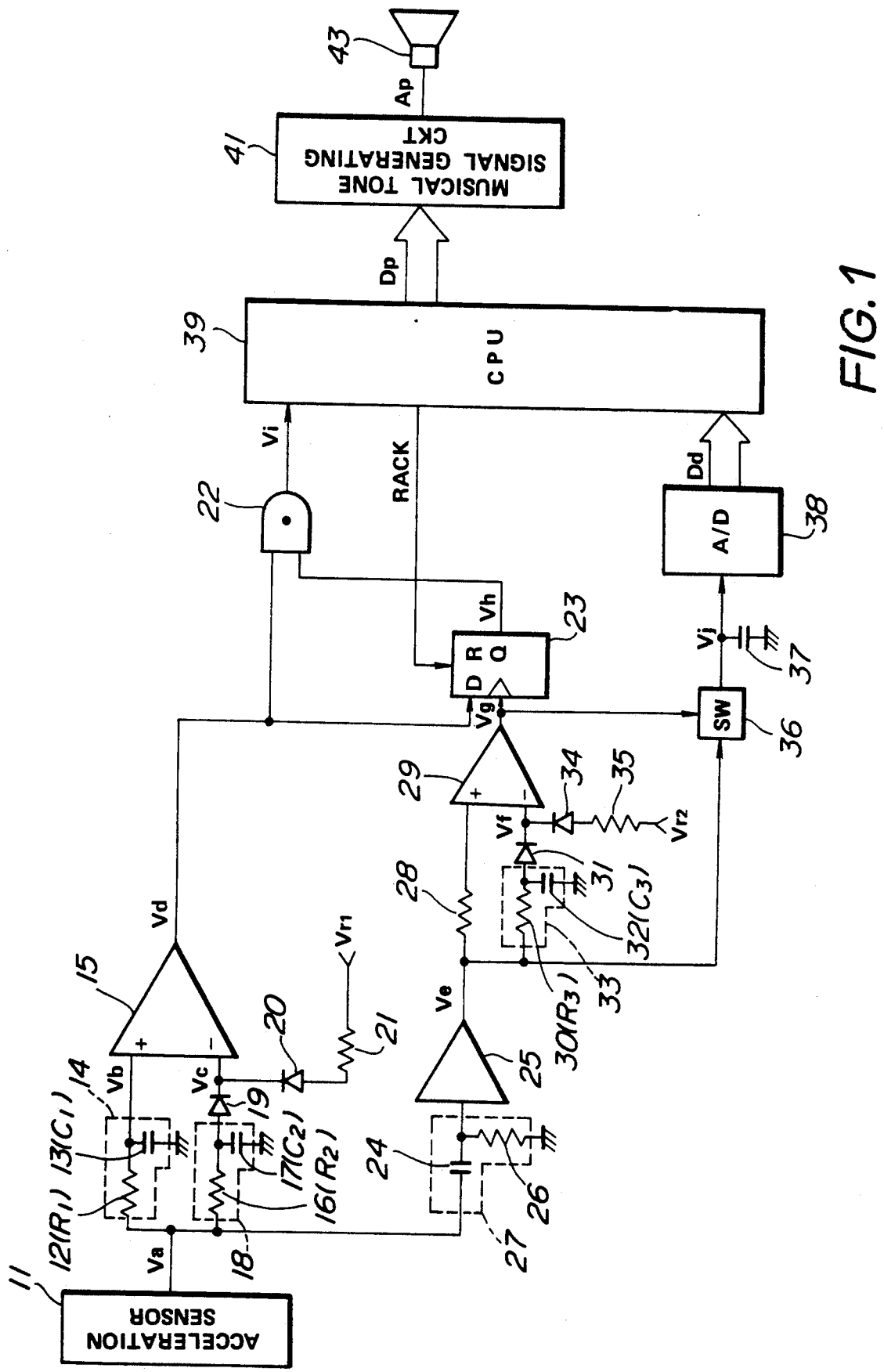
FIG. 1 is a circuit diagram showing an embodiment of a musical tone generating apparatus employing an impulse detector according to the present invention.

Referring now to the drawings, wherein like reference characters designate like or corresponding parts throughout the several views.

The present invention relates to a musical tone control apparatus which controls the musical tones based on the movement of the object such as a player's hand and the like. This movement of the player's hand, such as a moving speed, a moving force or a moving angle of the object, must be detected by a detector. Hence, first description will be given with respect to [I] DETECTOR, and next description will be given with respect to [II] MUSICAL TONE GENERATING APPARATUS. [I] DETECTOR The detector according to the present invention can be classified into an impulse detector, a motion detector, an angular velocity detector and an angle sensor. Hence, description will be given with respect to these detectors and the sensor sequentially.

(1) IMPULSE DETECTOR

FIG. 1 shows a circuit constitution of an embodiment of the musical tone generating apparatus employing the impulse detector according to the present invention. In FIG. 1, 11 designates an acceleration sensor which has a vibrator made of an organic material or an inorganic material having piezoelectric characteristics. As such organic material, a piezo-plastic and the like are used. As such inorganic material, a crystal, a Rochelle salt, a barium titanate and the like are used. In the present embodiment, the piezo-plastic is used as an organic vibrator, the circumference of which is fixed so that the vibrator has a diaphragm structure.

The above-mentioned acceleration sensor 11 converts the acceleration into the voltage signal, hence, the acceleration sensor 11 generates and outputs an output voltage Va as shown in FIG. 2(a). Next, 12 in FIG. 1 designates a resistor having a resistance of $R_1$ (Ohm), and one terminal of the resistor 12 is connected to an output terminal of the acceleration sensor 11. In addition, 13 designates a capacitor having a capacitance of $C_1$ (F), another terminal of the resistor 12 is grounded via the capacitor 13. These resistor 12 and capacitor 13 constitute a lowpass filter 14 having a time constant of $R_1C_1$ (seconds). The connection point between the resistor 12 and the capacitor 13 is connected to a non-inverting input terminal (+) of a comparator 15. Similar to the resistor 12, one terminal of a resistor 16 having a resistance of $R_2$ (Ohm) is connected to the output terminal of the acceleration sensor 11, and another terminal of the resistor 16 is grounded via a capacitor 17 having a capacitance of $C_2$. These resistor 16 and capacitor 17 constitute a lowpass filter 18 having a time constant of $R_2C_2$ (seconds). In the present embodiment, the time constant $R_2C_2$ is set approximately ten times of the time constant $R_1C_1$. More concretely, the time constant $R_2C_2$ is set equal to 0.5 milli-second and the time constant $R_1C_1$ is set equal to 50 micro-seconds.

The connection point between the resistor 16 and the capacitor 17 is connected to an anode of a diode 19, and an inverting input terminal (−) of the comparator 15 is connected to a cathode of the diode 19. Similar to the diode 19, a cathode of a diode 20 is connected to the inverting input terminal of the comparator 15. One terminal of a resistor 21 is connected to an anode of the diode 20, hence, the diode 20 and the resistor 21 constitute a serial circuit which supplies a reference voltage $V_{r1}$ to the inverting input terminal of the comparator 15.

One terminal of a capacitor 24 is connected to the output terminal of the acceleration sensor 11, and another terminal of the capacitor 24 is connected to an input terminal of an amplifier 25 which is grounded via a resistor 26. The resistor 26 and the capacitor 24 constitute a highpass filter 27.

One terminal of a resistor 28 is connected to the output terminal of the amplifier 25, and another terminal of the resistor 28 is connected to a non-inverting input terminal (+) of a comparator 29. In addition, one terminal of a resistor 30 having a resistance of $R_3$ (which is provided at an inverting input terminal (−) side of the comparator 29) is connected to the output terminal of the amplifier 25. Another terminal of the resistor 30 is connected to an anode of a diode 31 and is also grounded via a capacitor 32 having a capacitance of $C_3$.

The resistor 30 and the capacitor 32 constitute a lowpass filter 33 having a time constant of $R_3C_3$. A cathode of diode 31 is connected to the inverting input terminal of the comparator 29. Similar to the diode 31, a cathode of diode 34 is connected to the inverting input terminal of the comparator 29, whereas an anode of diode 34 is connected to one terminal of a resistor 35. The diode 34 and the resistor 35 constitute a serial circuit which supplies a reference voltage $V_{r2}$ to the inverting input terminal of the comparator 29.

Meanwhile, 22 designates an AND gate having two input terminals, one of which is connected to the output terminal of the comparator 15. In addition, a data input terminal D of a D flip-flop 23 is connected to the output terminal of the comparator 15, and a clock input terminal of the D flip-flop 23 is connected to the output terminal of the comparator 29. Furthermore, the D flip-flop 23 has a reset terminal R, and an output terminal Q of the D flip-flop 23 is connected to another input terminal of the AND gate 22. This D flip-flop 23 stores data supplied to the data input terminal D thereof at a leading edge timing of a pulse signal supplied to the clock input terminal thereof.

Next, an input terminal of an analog switch 36 is connected to the output terminal of the amplifier 25, and a gate terminal of the analog switch 36 is connected to the output terminal of the comparator 29. And an output terminal of the analog switch 36 is connected to an input terminal of an analog-to-digital (A/D) converter 38 which is grounded via a capacitor 37. This capacitor 37 is provided for holding a peak value of an analog signal supplied to the A/D converter 38 via the analog switch 36.

Next, a central processing unit (CPU) 39 is connected to the output terminal of the AND gate 22, the reset terminal R of the D flip-flop 23 and a digital output terminal of the A/D converter 38. The CPU 39 outputs data $D_p$ to a musical tone signal generating circuit 41 wherein a musical tone signal $A_p$ corresponding to the data $D_p$ is generated. The musical tone signal $A_p$ is supplied to a speaker 43 wherein a musical tone corresponding to the musical tone signal $A_p$ is generated.

Figure 2:
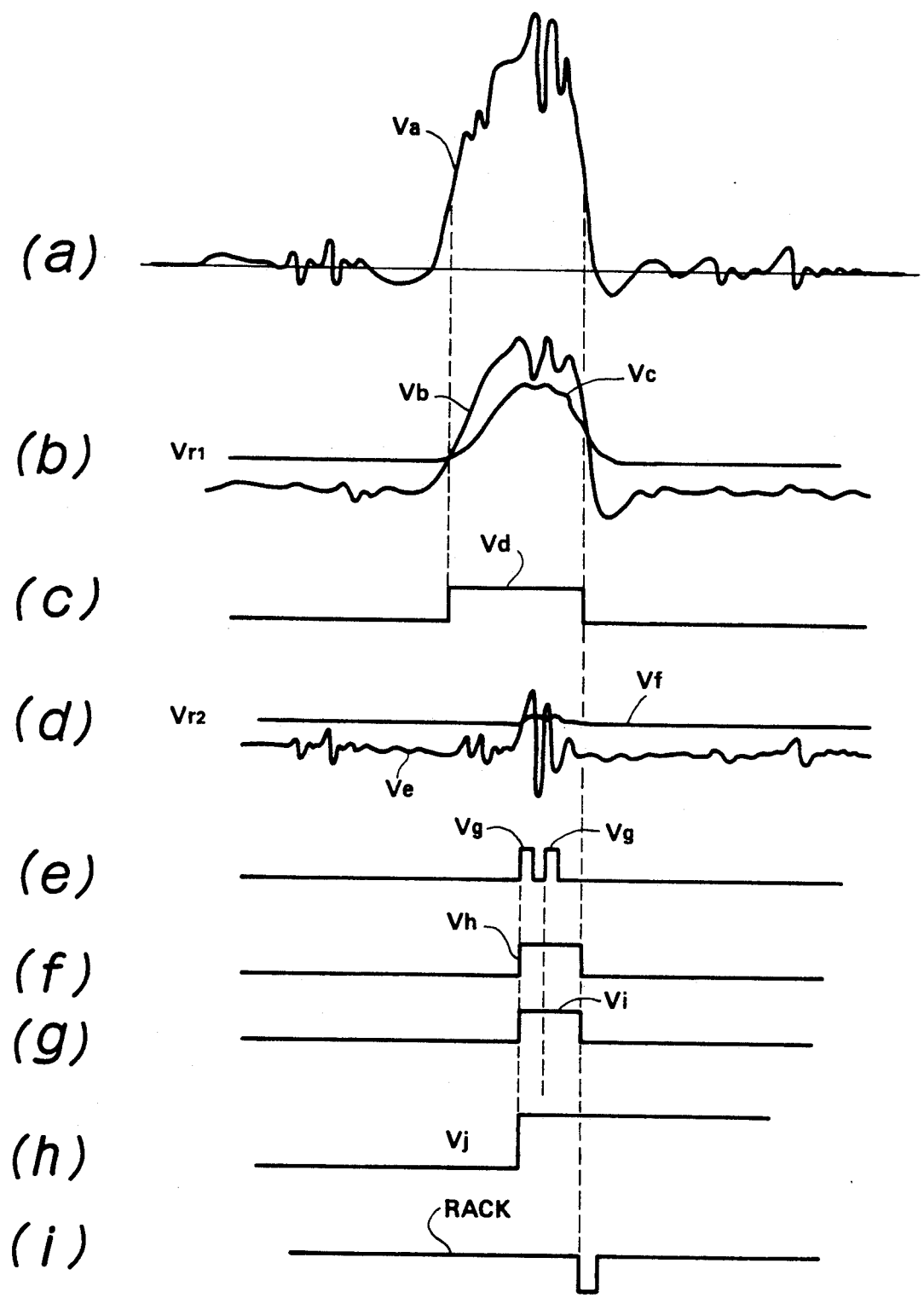
FIGS. 2(a) to 2(i) show waveforms at several points in the impulse detector shown in FIG. 1.

Next, description will be given with respect to an operation of the musical tone generating apparatus shown in FIG. 1 in conjunction with FIG. 2. The acceleration sensor 11 is mounted on a part of the player, i.e., a palm of the player's hand, for example. This acceleration sensor 11 generates the voltage signal $V_a$ shown in FIG. 2(a) at a timing when the player claps his hands. Such signal $V_a$ is inputted to the non-inverting input terminal of the comparator 15 via the lowpass filter 14, and the signal $V_a$ is also inputted to the inverting input terminal of the comparator 15 via the lowpass filter 18. In this case, the non-inverting input terminal of the comparator 15 is supplied with a signal $V_b$ (shown in FIG. 2(b)) which is obtained by delaying the signal $V_a$ by a delay time corresponding to the time constant $R_1C_1$ (sec) of the lowpass filter 14. Similarly, the inverting input terminal of the comparator 15 is supplied with a signal $V_c$ (shown in FIG. 2(b)) which is obtained by delaying the signal $V_a$ by a delay time corresponding to the time constant $R_2C_2$ (sec) of the lowpass filter 18.

Meanwhile, the diode 19 is inserted between the lowpass filter 18 and the inverting input terminal of the comparator 15. This diode 19 is subject to a bias state in backward direction when the level of the output signal of the lowpass filter 18 is lower than that of the reference voltage $V_{r1}$, whereby the diode 19 is turned off and the reference voltage $v_{r1}$ is supplied to the inverting input terminal of the comparator 15. On the contrary, the diode 19 is subject to a bias state in forward direction when the level of the output signal of the lowpass filter 18 is higher than that of the reference voltage $V_{r1}$, whereby the diode 19 is turned on and the output signal of the lowpass filter 18 is supplied to the inverting input terminal of the comparator 15.

As described before, the time constant $R_1C_1$ is set smaller than the time constant $R_2C_2$, hence, the phase of the signal $V_c$ is delayed behind that of the signal $V_b$. As a result, the comparator 15 outputs a pulse signal $V_d$ (shown in FIG. 2(c)), the level of which rises up to a high (H) level while the level of the signal $V_b$ is higher than that of the signal $V_c$. On the other hand, the voltage signal $V_a$ outputted from the acceleration sensor 11 is also supplied to the highpass filter 27 wherein a higher harmonic component signal is extracted from the signal $V_a$. The level of such extracted signal is amplified in the amplifier 25 so that the amplifier 25 outputs a signal $V_e$ as shown in FIG. 2(d).

The signal $V_e$ is supplied to the non-inverting input terminal of the comparator 29 via the resistor 28. In addition, the signal $V_e$ is also supplied to the lowpass filter 33 wherein the signal $V_e$ is subject to a time delay (or an integration operation). As described before, the diode 31 is inserted between the lowpass filter 33 and the inverting input terminal of the comparator 29, and the reference voltage $V_{r2}$ is supplied to the inverting input terminal of the comparator 29. Hence, the reference voltage $V_{r2}$ must be always supplied to the inverting input terminal of the comparator 29 while the level of the output signal of the lowpass filter 33 is lower than that of the reference voltage $V_{r2}$. On the contrary, the output signal of the lowpass filter 33 is supplied to the inverting input terminal of the comparator 29 while the level of the output signal of the lowpass filter 33 is higher than that of the reference voltage $V_{r2}$. As a result, a signal $V_f$ shown in FIG. 2(d) is inputted into the inverting input terminal of the comparator 29.

Thus, the comparator 29 outputs a pulse signal $V_g$ having the H level (as shown in FIG. 2(e)) while the level of the signal $V_e$ is higher than that of the signal $V_f$.

The above-mentioned signal $V_g$ is supplied to the clock input terminal of the D flip-flop 23 as the clock signal. Since the signal $V_d$ (shown in FIG. 2(c)) is supplied to the data input terminal D of the D flip-flop 23, the D flip-flop 23 stores the signal $V_d$ at a leading edge timing of the signal $V_g$ and outputs an output signal $V_h$ (shown in FIG. 2(f)) via an output terminal Q thereof. The logical product of the signals $V_h$ and $V_d$ is obtained in the AND gate 22. Hence, the AND gate 22 outputs a signal $V_i$ (shown in FIG. 2(g)). This signal $V_i$ is supplied to the CPU 39 as an interrupt signal.

On the other hand, when the signal $V_g$ is outputted from the comparator 29, the analog switch 36 is turned on. For this reason, the capacitor 37 is charged by the signal $V_e$, and the peak value of the signal $V_e$ is held by the capacitor 37. FIG. 2(h) shows a waveform of a voltage signal $V_j$ held by the capacitor 37. Such voltage signal $V_j$ is converted into the corresponding digital data $D_d$ in the A/D converter 38, and such digital data $D_d$ are supplied to the CPU 39.

The interrupt signal $V_i$ is supplied to the CPU 39 wherein a signal RACK (shown in FIG. 2(i)) is generated and outputted to the reset terminal R of the D flip-flop 23, whereby the D flip-flop 23 is reset. Thereafter, the CPU 39 stores the digital data $D_d$ outputted from the A/D converter 38. Next, the CPU 39 converts the stored digital data $D_d$ into tone pitch data $D_p$ designating the tone pitch of the musical tone, and the tone pitch data $D_p$ are supplied to the musical tone signal generating circuit 41. The musical tone signal generating circuit 41 generates the musical tone signal designating the tone pitch corresponding to the tone pitch data $D_p$. This musical tone signal is outputted to the speaker 43, whereby the speaker 43 generates the musical tone having the tone pitch corresponding to the intensity of the impulse given to the acceleration sensor 11 mounted on the player's hand.

As described before, the acceleration sensor 11 can be fixed at a predetermined part of the player. According to the constitution of the present embodiment, it is possible to generate a musical tone having a tone pitch corresponding to an intensity of hand clapping, an intensity of step shock occurred between a floor and the feet of the player.

In addition, the present embodiment generates the musical tone having the tone pitch corresponding to the intensity of impulse detected by the acceleration sensor 11. However, the impulse detector according to the present invention is not limited to the present embodiment. For example, it is possible to constitute the impulse detector so that a volume or the tone color of the musical tone is varied in response to the intensity of impulse.

Furthermore, it is possible to constitute the impulse detector so that the tone colors of the musical tones are controlled independently based on the signal $V_b$ (shown in FIG. 2(b)) and the signal $V_e$ (shown in FIG. 2(d)). For example, a musical tone of the bass drum can be controlled by the signal $V_b$, and another musical tone of a cymbal can be controlled by the signal $V_e$. In such a constitution, two kinds of musical tones can be controlled by use of only one detector (i.e., only one acceleration sensor 11).

As described heretofore, the impulse detector according to the present invention can eliminate detecting errors caused by touching noise and the like, and the present impulse detector can detect the intensity of impulse with accuracy.

(2) MOTION DETECTOR

Figure 3:
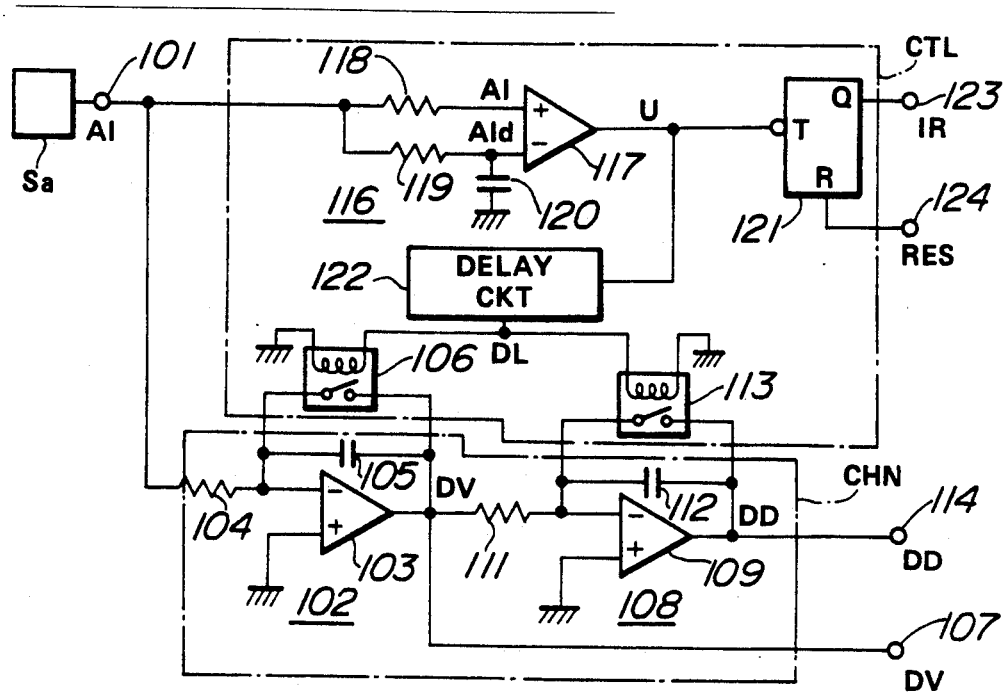
FIG. 3 is a circuit diagram showing an embodiment of a motion detector according to the present invention.

FIG. 3 is a circuit diagram showing an embodiment of a motion detector according to the present invention. More specifically, the circuit shown in FIG. 3 generates signals corresponding to a speed and a moving distance of an object to be detected by integrating an output signal of an acceleration sensor.

In FIG. 3, 101 designates an input terminal which is supplied with an acceleration signal AI outputted from a piezoelectric type acceleration sensor $S_a$.

Meanwhile, a resistor 104 is inserted between the input terminal 101 and an inverting input terminal (−) of an operational amplifier 103, and a capacitor 105 is inserted between the inverting input terminal and the output terminal of the operational amplifier 103. In addition, a non-inverting input terminal (+) of the operational amplifier 103 is grounded. The output terminal of the operational amplifier 103 is connected to a terminal 107 and also connected to an inverting input terminal (−) of an operational amplifier 109 (the non-inverting input terminal of which is grounded) via a resistor 111. The above-mentioned operational amplifier 103, the resistor 104 and the capacitor 105 constitute an integration circuit 102. Both terminals of the capacitor 105 are connected to respective contacts of a reed relay 106.

Similar to the integration circuit 102, the operational amplifier 109, the resistor 111 and a capacitor 112 constitute an integration circuit 108. The output terminal of the integration circuit 108 (i.e., the connection point between the operational amplifier 109 and the capacitor 112) is connected to a terminal 114. Both terminals of the capacitor 112 are connected to respective contacts of a reed relay 113. Both of one terminals of the reed relays 106 and 113 are connected to an output terminal of a delay circuit 122, and both of another terminals of the reed relays 106 and 113 are grounded. In this case, it is possible to displace the reed relays 106 and 113 by semiconductor switches.

The above-mentioned integration circuits 102 and 108 constitute a data converting section CHN.

Next, a non-inverting input terminal of a comparator 117 is connected to the input terminal 101 via a resistor 118. In addition, an inverting input terminal of the comparator 117 is connected to the input terminal 101 and also grounded via a capacitor 120. In this case, the resistor 119 and the capacitor 120 constitute an integration circuit which generates a signal AId by delaying the acceleration signal AI. The output terminal of the comparator 117 is connected to an input terminal T of a flip-flop 121 and also connected to an input terminal of the delay circuit 122.

The above-mentioned comparator 117, the resistors 118 and 119, and the capacitor 120 constitute a phase-shift/peak-detection circuit 116.

Figure 4:
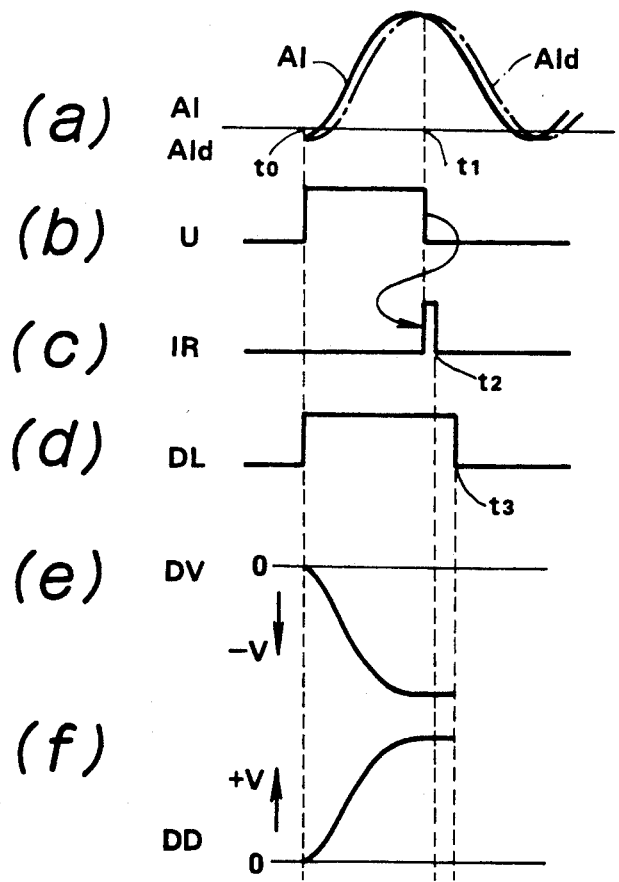
FIGS. 4(a) to 4(f) show waveforms at several points within the motion detector shown in FIG. 3.

This phase-shift/peak-detection circuit 116 compares the level of the acceleration signal AI (which is supplied to the input terminal 101) and that of the signal AId (which is obtained by delaying the acceleration signal AI) and outputs a pulse signal corresponding to the comparing result thereof. For example, when the acceleration signal AI (shown in FIG. 4(a)) is supplied to the input terminal 101 at a time $t_0$, the acceleration signal AI is supplied to the non-inverting input terminal of the comparator 117 via the resistor 118. In addition, the signal AId (as shown by a dashed line in FIG. 4(a)) is generated by delaying the signal AI in the integration circuit (which is constituted by the resistor 119 and the capacitor 120), and this signal AId is supplied to the inverting input terminal of the comparator 117. As a result, the comparator 117 compares the levels of the signals AI and AId, and an output signal U (shown in FIG. 4(b)) of the comparator 117 becomes identical to a "1" signal (i.e., a signal having a logical level "1") during times $t_0$ to $t_1$ while the level of the acceleration signal AI is larger than that of the signal AId. As shown in FIG. 4(a), the time $t_1$ is almost identical to a peak time when the level of the acceleration signal AI reaches at a peak level. More specifically, the signal AId is identical to a delay signal of the acceleration signal AI, hence, a time when the level of the signal AId becomes larger than that of the acceleration signal AI must be delayed behind the peak time of the acceleration signal AI. However, it is possible to identify the peak time of the acceleration signal AI with the time when the level of the signal AId becomes larger than that of the acceleration signal AI by properly setting the delay time of the signal AId smaller.

Next, the output signal of the flip-flop 121 is inverted every time when the level of the input signal U thereof falls down. This flip-flop 121 has an output terminal Q which is connected to a terminal 123 and a reset terminal R which is connected to a terminal 124. The flip-flop 121 outputs a signal IR (shown in FIG. 4(c)) to an external device which outputs a reset signal RES so as to reset the flip-flop 121 when the signal IR rises up to the "1" signal.

The delay circuit 122 delays a trailing edge timing of the signal U so as to enlarge the pulse width of the signal U. As shown in FIG. 4(d), the trailing edge timing $t_3$ of an output signal DL of the delay circuit 122 is delayed behind the trailing edge timing $t_1$ of the signal U by 20 microseconds to 100 micro-seconds in the present embodiment.

The above-mentioned phase-shift/peak-detection circuit 116, the delay circuit 122 and the flip-flop 121 constitute a data control section CTL.

Next, description will be given with respect to operations of the motion detector shown in FIG. 3 in conjunction with FIGS. 4(a) to 4(f).

When the acceleration signal AI is supplied to the input terminal 101, such acceleration signal AI is simultaneously supplied to the data control section CTL and the data converting section CHN.

First, description will be given with respect to the operation of the data control section CTL.

When the acceleration signal AI is supplied to the phase-shift/peak-detection circuit 116 via the input terminal 101, the output signal U of the phase-shift/peak-detection circuit 116 rises up to the "1" signal. Thereafter, the level of the signal U falls down to a "0" signal (i.e., a signal having a logical level "0") at the time $t_1$ when the amplitude of the acceleration signal AI becomes to the maximum value. At the same time, the output signal IR of the flip-flop 121 rises up to the "1" signal, and such "1" signal is supplied to the external device via the terminal 123. As a result, the external device supplies the reset signal RES to the reset terminal R of the flip-flop 121 via the terminal 124, whereby the signal IR falls down to the "0" signal. On the other hand, when the signal U rises up to the "1" signal, the output signal DL of the delay circuit 122 rises up to the "1" signal. The period while the signal DL is at the "1" signal continues by 20 micro-seconds to 100 micro-seconds after the signal U falls down to the "0" signal. Relay coils of the reed relays 106 and 113 are magnetized (in a period between the times $t_0$ to $t_3$) while the signal DL is at the "1" signal. Thus, the contacts of the reed relays 106 and 113 are opened in the period between the times $t_0$ to $t_3$.

Next, description will be given with respect to the operation of the data converting section CHN.

The integration circuits 102 and 108 do not work while the reed relays 106 and 113 are closed. At the time $t_0$ when the acceleration signal AI is supplied to the input terminal 101, the contacts of the reed relays 106 and 113 are opened and the integration circuits 102 and 108 start to work. More specifically, the integration circuit 102 integrate the acceleration signal AI so as to output a signal DV in the period between the times $t_0$ and $t_3$. Since the signal DV is obtained by integrating the acceleration signal AI in an acceleration increasing period between the times $t_0$ to $t_1$, the value of the signal DV represents a maximum speed at a time when the acceleration increasing period for the object to be detected is ended. On the other hand, the integration circuit 108 integrates the output signal DV of the integration circuit 102 while the output signal DL of the delay circuit 122 is at the "1" signal, so that the integration circuit 108 generates a signal DD. Since the signal DD is obtained by integrating the (speed) signal DV, the value of the signal DD represents a moving distance which is measured until the acceleration of the object becomes identical to the maximum.

As described heretofore, the present embodiment detects the acceleration by every minute period based on the acceleration signal AI outputted from the acceleration sensor $S_a$ and performs an integration operation on the detected acceleration in the minute period (i.e., the acceleration increasing period). Hence, the present embodiment can detect characteristics of the motion of the object to be detected.

In addition, the present embodiment can obtain the moving speed and the moving distance of the object to be detected by use of a simple circuit constitution (using three operational amplifiers, one flip-flop and a plurality of resistors, capacitors and reed relays). Hence, the present embodiment can save money.

Figure 5:
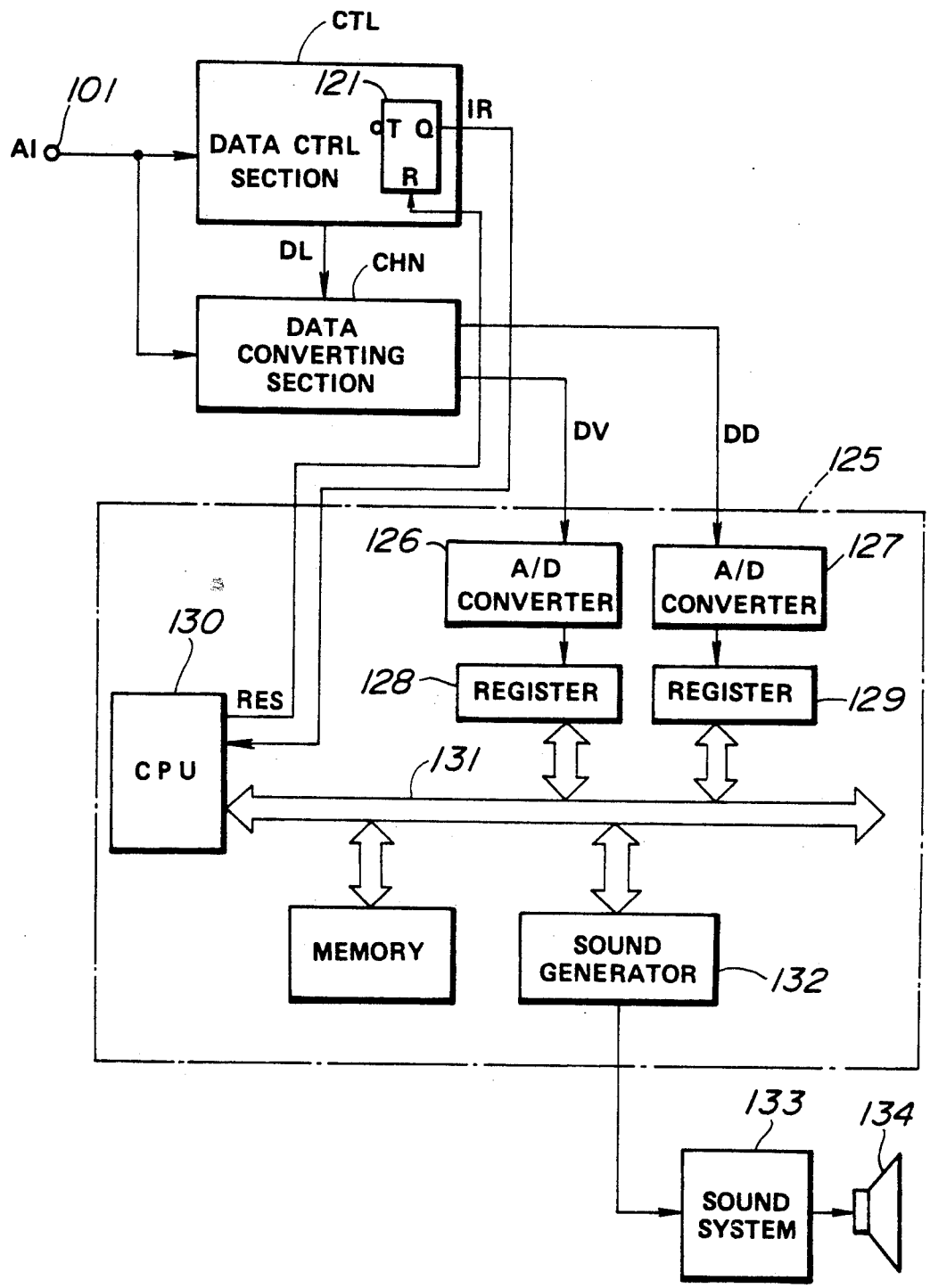
FIG. 5 is a block diagram showing an embodiment of a musical tone generating apparatus employing the motion detector shown in FIG. 3.

Incidentally, it is possible to apply a musical tone generating unit 125 (as shown in FIG. 5) as an external control device. Next, description will be given with respect to the operation of the circuit shown in FIG. 5.

In FIG. 5, when the flip-flop 121 outputs the signal IR to a central processing unit (CPU) 130 as an interrupt signal, the CPU 130 supplies the reset signal RES to the flip-flop 121. Meanwhile, analog-to-digital converters (A/D converters) 126 and 127 hold the levels of the signals DV and DD at a time $t_2$ (shown in FIG. 4) when the reset signal RES is outputted from the CPU 130. At the same time, the A/D converters 126 and 127 start to convert the held signals DV and DD into respective digital data, and such digital data are stored respectively in the registers 128 and 129. Thereafter, the digital data stored in the registers 128 and 129 are supplied to and stored in the CPU 130 via a data bus 131. Thereafter, the CPU 130 reads out the data stored in the registers 128 and 129 and the read data are supplied to the sound generator 132 via the data bus 131. In this case, the CPU 130 supplies the data stored in the register 128 to the sound generator 132 as volume control data, and the CPU 130 supplies the data stored in the register 129 to the sound generator 132 as tone pitch data. As a result, the sound generator 133 generates and outputs a musical tone signal having a volume and a tone pitch respectively corresponding to the signals DV and DD to a sound system 133. Under the control of the sound system 133, a speaker 134 generates a musical tone corresponding to the signals DV and DD.

The meanings of the above-mentioned signals DV and DD are not limited to the volume and the tone pitch. For example, the signal DV can be modified into a signal for controlling a "regist", and the signal DD can be modified into a signal for controlling a tone color of musical tone (such as tones of a flute, the piano and the like).

The above "regist" represents preset operations of several kinds of levers which are arranged on an operation panel (not shown).

When the regist is controlled by varying the signal DV, the regist condition can be varied in accordance with the movement of the human body and the like. Hence, it is possible to obtain a new musical effect other than the conventional musical effect which is controlled by a manual operation.

(3) ANGULAR VELOCITY DETECTOR

Figure 6:
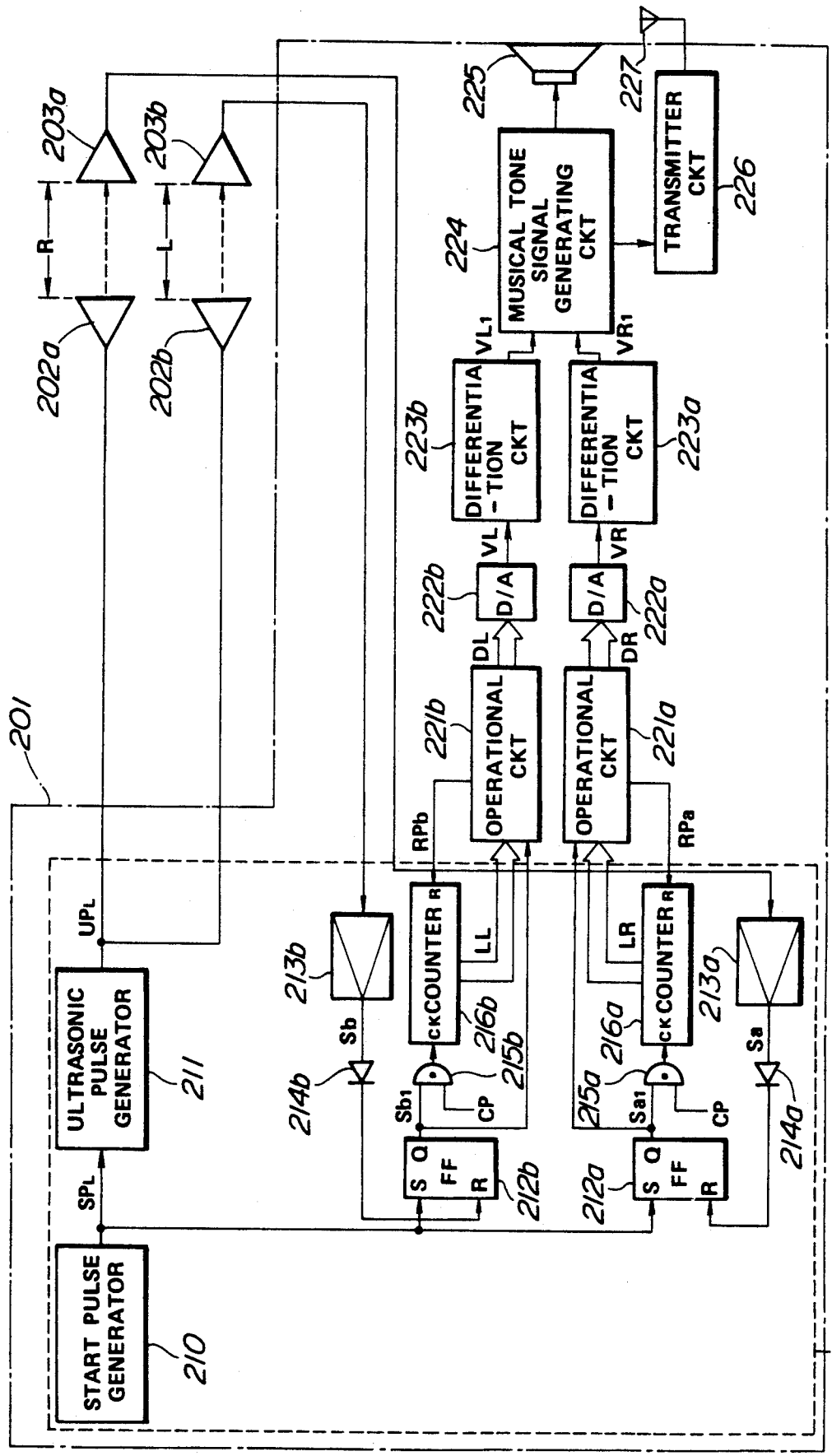
FIG. 6 is a block diagram showing an embodiment of a musical tone generating apparatus employing an angular velocity detector according to the present invention.
Figure 7:
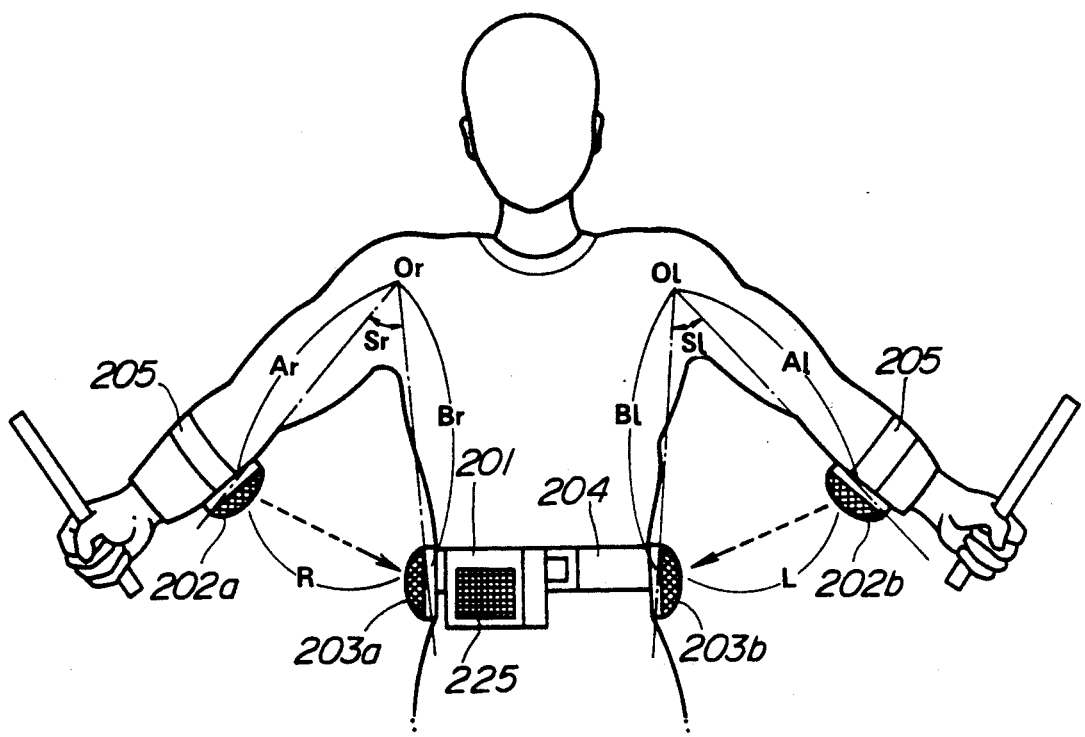
FIG. 7 shows an appearance of a player who is mounted by the angular velocity detector shown in FIG. 6.

FIG. 6 is a block diagram showing an embodiment of a musical tone generating apparatus employing an angular velocity detector according to the present invention, and FIG. 7 shows a perspective view of the player who wears the musical tone generating apparatus shown in FIG. 6.

In FIG. 6, 201 designates a musical tone generating unit, 202a and 202b designate ultrasonic transmitters, and 203a and 203b designate ultrasonic receivers. As shown in FIG. 7, the musical tone generating unit 201 and the ultrasonic receivers 203a and 203b are worn at a waist of a player by use of a belt 204. The ultrasonic transmitters 202a and 202b are respectively worn at predetermined portions of right and left arms of the player by use of mounting members 205 such as supporters so that the ultrasonic transmitters 202a and 202b respectively face with the ultrasonic receivers 203a and 203b. These ultrasonic transmitters 202a and 202b are constructed by piezoelectric elements such as barium titanate vibrators and the like. When a high frequency voltage is applied to the ultrasonic transmitters 202a and 202b, these ultrasonic transmitters 202a and 202b generate ultrasonic waves. In addition, the ultrasonic receivers 203a and 203b generate the high frequency voltages when these ultrasonic receivers 203a and 203b receive the ultrasonic wave. In this case, two or three transmitting piezoelectric elements are arranged radially within the ultrasonic transmitters 202a and 202b so as to radiate the ultrasonic waves therefrom by an angular range of 180 degrees. Similarly, two or three receiving piezoelectric elements are arranged radially within the ultrasonic receivers 203a and 203b so as to receive and detect the ultrasonic waves radiated from the ultrasonic transmitters 202a and 202b. As a result, even when relative position relations between the ultrasonic transmitters 202a and 202b and the ultrasonic receivers 203a and 203b are changed, the ultrasonic waves radiated from the ultrasonic transmitters 202a and 202b can always reach at the ultrasonic receivers 203a and 203b, regardless of the change of the above relative position relations.

Next, description will be given with respect to the musical tone generating unit 201. In the musical tone generating unit 201, 210 designates a start pulse generator which generates a start pulse $SP_L$ having a constant cycle. This start pulse $SP_L$ is supplied to an input terminal of an ultrasonic pulse generator 211 and respective set input terminals S of reset-set (R-S) flip-flops 212a and 212b. The start pulse $SP_L$ triggers the ultrasonic pulse generator 211 wherein an ultrasonic pulse $UP_L$ is generated and outputted to the ultrasonic transmitters 202a and 202b, whereby the ultrasonic waves having constant cycles are radiated from the ultrasonic transmitters 202a and 202b. When the ultrasonic waves reach at the ultrasonic receivers 203a and 203b, the ultrasonic receivers 203a and 203b generate high frequency voltages respectively.

The high frequency voltage outputted from the ultrasonic receiver 203a is supplied to an amplifier 213a wherein the high frequency voltage is amplified. Thus, the amplifier 213a outputs an amplified signal Sa to a diode 214a wherein the amplified signal Sa is rectified. Thereafter, the diode 214a outputs the rectified signal of the signal Sa to a reset input terminal R of the R-S flip-flop 212a. This R-S flip-flop 212a is set by the start pulse $SP_L$ and reset by the output signal of the diode 214a. Thus, a signal $Sa_1$ outputted from an output terminal Q of the R-S flip-flop 212a has a pulse width which corresponds to a distance R between the ultrasonic transmitter 202a and the ultrasonic receiver 203a. Such signal $Sa_1$ is supplied to one input terminal of an AND gate 215a. While the signal $Sa_1$ is supplied to the AND gate 215a, this signal $Sa_1$ opens the AND gate 215a wherein a clock pulse CP is passed through and supplied to a clock input terminal CK of a counter 216a. The counter 216a counts up the clock pulse CP and outputs a counting value thereof as distance measuring data LR. The value of such distance measuring data LR corresponds to the distance R between the ultrasonic transmitter 202a and the ultrasonic receiver 203a.

Meanwhile, the high frequency voltage generated by the ultrasonic receiver 203b is supplied to an amplifier 213b wherein the high frequency voltage is amplified. Thus, the amplifier 213b outputs an amplified signal Sb to a diode 214b wherein the signal Sb is rectified. Thereafter, the rectified signal of the signal Sb is supplied to a reset input terminal R of the R-S flip-flop 212b. This R-S flip-flop 212b is set by the start pulse $SP_L$ and reset by the output signal of the diode 214b. Thus, a signal $Sb_1$ outputted from an output terminal Q of the R-S flip-flop 212b has a pulse width which corresponds to a distance L between the ultrasonic transmitter 202b and the ultrasonic receiver 203b. Such output signal $Sb_1$ is supplied to one input terminal of an AND gate 215b. While the signal $Sb_1$ is supplied to the AND gate 215b, the signal $Sb_1$ opens the AND gate 215b wherein the clock pulse CP is passing through and supplied to a clock input terminal CK of a counter 216b. This counter 216b counts up the clock pulse CP and outputs the counting value thereof as distance measuring data LL. The value of such distance measuring data LL corresponds to a distance L between the ultrasonic transmitter 202b and the ultrasonic receiver 203b. As described heretofore, an ultrasonic distance measuring circuit 220 is constituted by the above-mentioned elements.

Next, the above distance measuring data LR and LL are supplied respectively to operational circuits 221a and 221b. These operational circuits 221a and 221b are primarily constituted by read only memories (ROM) which work as look-up tables. More specifically, the operational circuit 221a converts the distance measuring data LR into angle data DR, the value of which corresponds to a revolving angle Sr (shown in FIG. 7) at a joint of a right shoulder of the player. Similarly, the operational circuit 221b converts the distance measuring data LL into angle data DL, the value of which corresponds to a revolving angle Sl at a joint of a left shoulder of the player.

As shown in FIG. 7, Ar represents a distance between a revolving center Or at the joint of the right shoulder of the player and a portion where the ultrasonic transmitter 202a is mounted, and Br represents a distance between the revolving center Or and a portion where the ultrasonic receiver 203a is mounted. In this case, the revolving angle Sr can be obtained from the following formula (1) based on a cosine theorem.

$$Sr = \cos^{-1}[(Ar^2 + Br^2 - r^2)/(2 \cdot Ar \cdot Br)] \quad (1)$$

In the case where the values of the distances Ar and Br are set to predetermined constant values in the above formula (1), the value of the revolving angle Sr can be obtained by putting the value of the distance measuring data LR in the place of the distance R. More specifically, the operational circuit 221a provides the ROM which pre-stores the angle data DR therein, and the operational circuit 221a reads out the angle data DR corresponding to the distance measuring data LR which are inputted into the operational circuit 221a as an address for the ROM. Thus, the operation represented by the formula (1) will be performed in the operational circuit 221a.

Similarly, Al represents a distance between a revolving center 0l at the joint of the left shoulder of the player and a portion where the ultrasonic transmitter 202b is mounted, and a portion where the ultrasonic receiver 203b is mounted. In this case, the revolving angle Sl can be obtained from the following formula (2) based on the cosine theorem.

$$Sl = \cos^{-1}[(Al^2 + Bl^2 - L^2)/(2 \cdot Al \cdot Bl)] \quad (2)$$

In the case where the values of the distances Al and Bl are set to predetermined constant values in the above formula (2), the revolving angle Sl can be obtained by putting the value of the distance measuring data LL in the place of the distance L. More specifically, the operational circuit 221b provides the ROM which pre-stores the angle data DL therein, and the operational circuit 221b reads out the angle data DL corresponding to the distance measuring data LL which are inputted into the operational circuit 221b as an address for the ROM. Thus, the operation represented by the formula (2) will be performed in the operational circuit 221b.

In addition, the operational circuits 221a and 221b put the respective distance measuring data LR and LL outputted from the counters 216a and 216b therein at leading edge timings of the signals $Sa_1$ and $Sb_1$, i.e., at timings when the R-S flip-flops 212a and 212b are reset. Slightly thereafter, the operational circuits 221a and 221b output respective reset pulses RPa and RPb to reset input terminals R of the counters 216a and 216b so that the counters 216a and 216b are reset. The angle data DR and DL outputted from the operational circuits 221a and 221b are supplied to respective digital-to-analog (D/A) converters 222a and 222b wherein the angle data DR and DL are converted into analog voltage signals VR and VL. These voltage signals VR and VL are supplied to respective differentiation circuits 223a and 223b wherein the voltage signals VR and VL are differentiated so as to obtain signals $VR_1$ and $VL_1$. These signals $VR_1$ and $VL_1$ are supplied to a musical tone signal generating circuit 224.

Since the values of the voltage signals VR and VL correspond to the revolving angle Sr at the joint of the right shoulder and the revolving angle Sl at the joint of the left shoulder respectively, the values of the differentiated signals $VR_1$ and $VL_1$ of the voltage signals VR and VL correspond to the respective revolving angles Sr and Sl.

The musical tone signal generating circuit 224 generates percussive tones (such as a drum tone, a cymbal tone and the like) in accordance with a predetermined rhythm pattern having a performance speed corresponding to the values of the signals $VR_1$ and $VL_1$ outputted from the respective differentiation circuits 223a and 223b. In this case, the performance speed is increased in response to the value of the signal $VR_1$, and the performance speed is decreased in response to the value of the signal $VL_1$. In the present embodiment, the performance speed can be increased approximately to =90. In other words, the performance speed can be increased such that a quarter note can be generated by ninety times in one minute. The musical tone signal generated in the musical tone signal generating circuit 224 is supplied to a speaker 225, whereby the speaker 225 generates the percussive tone in accordance with the predetermined rhythm pattern having the performance speed corresponding to revolving angular velocities of the right and left arms of the player. Incidentally, 226 designates a transmitter circuit which transmits the musical tone signal outputted from the musical tone signal generating circuit 226 via an antenna 227 by a radio communication.

As described heretofore, the present embodiment measures the distance R between the ultrasonic transmitter 202a and the ultrasonic receiver 203a and calculates the revolving angle Sr of the right arm with respect to the direction of the player's body based on the measured distance R. Then, the value of the revolving angle Sr is differentiated in the differentiation circuit 223a, so that the value of the revolving angular velocity of the right arm can be obtained. Similarly, the present embodiment measures the distance L between the ultrasonic transmitter 202b and the ultrasonic receiver 203b and calculates the revolving angle Sl of the left arm with respect to the direction of the player's body based on the measured distance L. Then, the value of the revolving angle Sl is differentiated in the differentiation circuit 223b, so that the value of the revolving angular velocity of the left arm can be obtained. Accordingly, it is possible to vary the performance speed of the musical tones in accordance with the revolving angular velocities of the right and left arms of the player.

Next, description will be given with respect to another embodiment of the musical tone generating apparatus employing the angular velocity detector according to the present invention in conjunction with FIG. 8.

Figure 8:
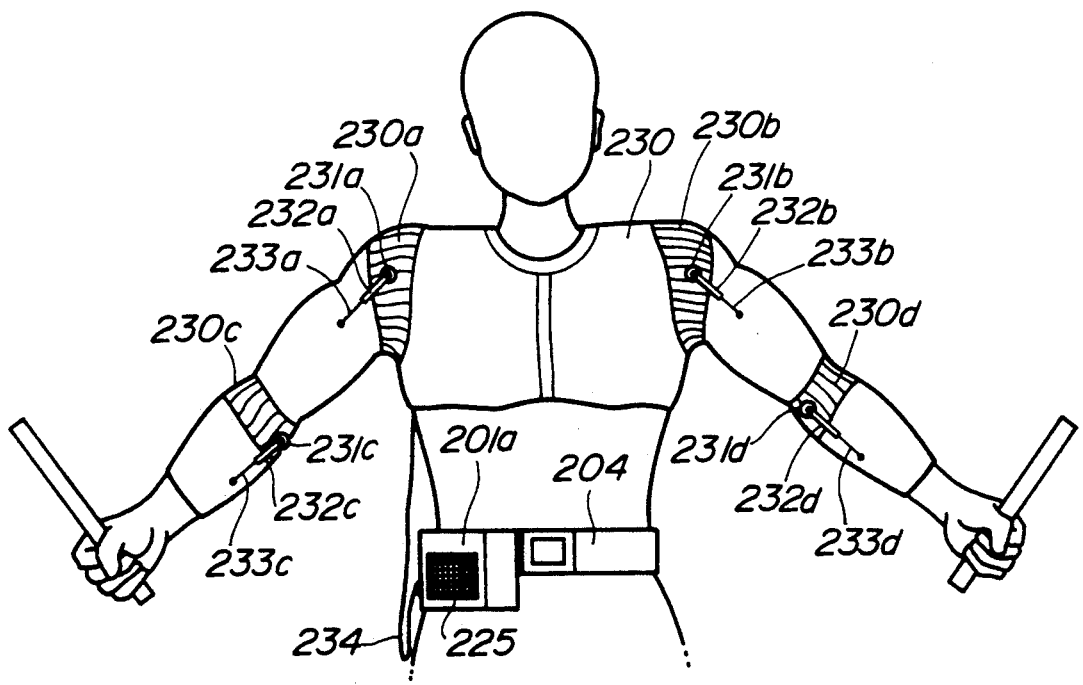
FIG. 8 shows another appearance of a player who is mounted by a modified embodiment of the angular velocity detector according to the present invention.

In FIG. 8, 230 designates a mounting wear covering a breast, shoulders and elbows at an upper half of the player's body. Similar to an ordinary jacket, the mounting wear 230 can be taken off. In addition, shoulder portions 230a and 230b, and elbow portions 230c and 230d of the mounting wear 230 are made of a flexible fiber material. Furthermore, thin type absolute rotary encoders 231a to 231d are mounted respectively in the shoulder portions 230a and 230b, and the elbow portions 230c and 230d. These rotary encoders 231a to 231d have respective shafts fixed with levers 232a to 232d, the tip end portions of which are mounted on the mounting wear 230 via absorber members 233a to 233d. Therefore, when the player revolves his right or left hand, the rotary encoder 231a directly detects the revolving angle of the joint of the right shoulder, or the rotary encoder 231b directly detects the revolving angle of the joint of the left shoulder. On the other hand, in the case where the player bends his right or left elbow, the rotary encoder 231c directly detects the bending angle of the joint of the right elbow, or the rotary encoder 231d directly detects the bending angle of the joint of the left elbow.

Thus, the rotary encoders 231a to 231d output respective angle data (i.e., respective digital signals each having a predetermined bit number) to a musical tone generating unit 201a via a cable 234. The musical tone generating unit 201a is constituted by four digital-to-analog (D/A) converters, four differentiation circuits (both not shown), and the musical tone signal generating circuit 224, the speaker 225 and the transmitter circuit 226 shown in FIG. 6. The above four D/A converters convert the respective angle data (supplied from the rotary encoders 231a to 231d) into analog voltage signals, and these analog voltage signals are differentiated respectively in the four differentiation circuits. In this case, the musical tone signal generating circuit 224 generates a musical tone signal representing a percussive tone having a predetermined rhythm pattern and the performance speed corresponding to the values of voltage signals supplied from the four differentiation circuits.

Therefore, the performance speed will be increased in response to the revolving angular velocity of the joint of the right shoulder, and the performance speed will be decreased in response to the revolving angular velocity of the joint of the left shoulder. In this case, the performance speed can be increased approximately to =90 in response to the revolving angular velocities of the joints of these shoulders. In addition, the performance speed can be increased in response to the revolving angular velocity of the joint of the right elbow, and the performance speed can be decreased in response to the revolving angular velocity of the joint of the left elbow. In this case, the performance speed can be increase approximately to =150 to 180 in response to the revolving angular velocities of the joints of these elbows.

According to another embodiment described above, it is possible to arbitrarily vary the performance speed of the percussive tones generated from the speaker 225 of the musical tone generating unit 201a in response to the revolving angular velocities of the joints of the shoulders and the elbows. In addition, the rotary encoders 231a and 231b detect the revolving angular velocities of the joints of the right and left shoulders, even when the player revolves his right and left arms in right and left directions or in forward and backward directions. Hence, the player can move freely, so that it is possible to raise the degree of freedom for a dance composition of the player and the like. Furthermore, the rotary encoders 231a to 231d are mounted within the mounting wear 230 like the ordinary jacket, hence, the mounting wear 230 can be made fashionably so that the mounting wear 230 is prevented from damaging the appearance of the player.

In the above-mentioned embodiments, the angle data (digital data) DR and DL are converted into respective analog voltage signals VR and VL, which are differentiated so as to obtain the analog signals $VR_1$ and $VL_1$ the values of which correspond to the revolving angular velocities. Thereafter, these analog signals $VR_1$ and $VL_1$ are supplied to the musical tone signal generating circuit 224 as musical tone control signals. However, it is possible to constitute the musical tone generating apparatus so that different data are directly obtained from the angle data DR and DL and such different data (the values of which corresponds to the revolving angular velocities) are supplied to the musical tone signal generating circuit as the musical tone control data. In addition, it is possible to constitute the musical tone generating apparatus so that data of detected revolving angular velocities can be applied to the musical tone control data or predetermined musical tone control data can be formed based on the detected revolving angular velocities.

Meanwhile, the performance speed is varied in response to the revolving angular velocities of player's arms or in response to the revolving angular velocities of the joints of the player's shoulders and the player's elbows in the above-mentioned embodiments. However, it is possible to constitute the present invention such that the tone pitch, the volume, a tone length, the tone color or the like is varied in response to the above revolving angular velocities. In addition, it is possible to constitute the present invention such that musical tone parameters can be controlled by the above revolving angular velocities or the musical tone parameters can be revolving angular velocities.

In addition, the revolving angular velocities of the player's shoulders and the player's elbows are detected in the present embodiments. However, it is possible to detect revolving angular velocities of player's knees in the present invention.

Furthermore, it is unnecessary to provide the musical tone signal generating circuit and the speaker within the musical tone generating unit. Hence, it is possible to constitute the musical tone generating unit such that the musical tone generating unit outputs the musical tone control data therefrom based on the known MIDI (Musical Instrument Digital Interface) standard, for example. In this case, such musical tone control data are supplied to an external musical tone signal generating circuit.

(4) ANGLE SENSOR

FIGS. 9 to 13 show an embodiment of an angle sensor 301 according to the present invention.

Figure 9:
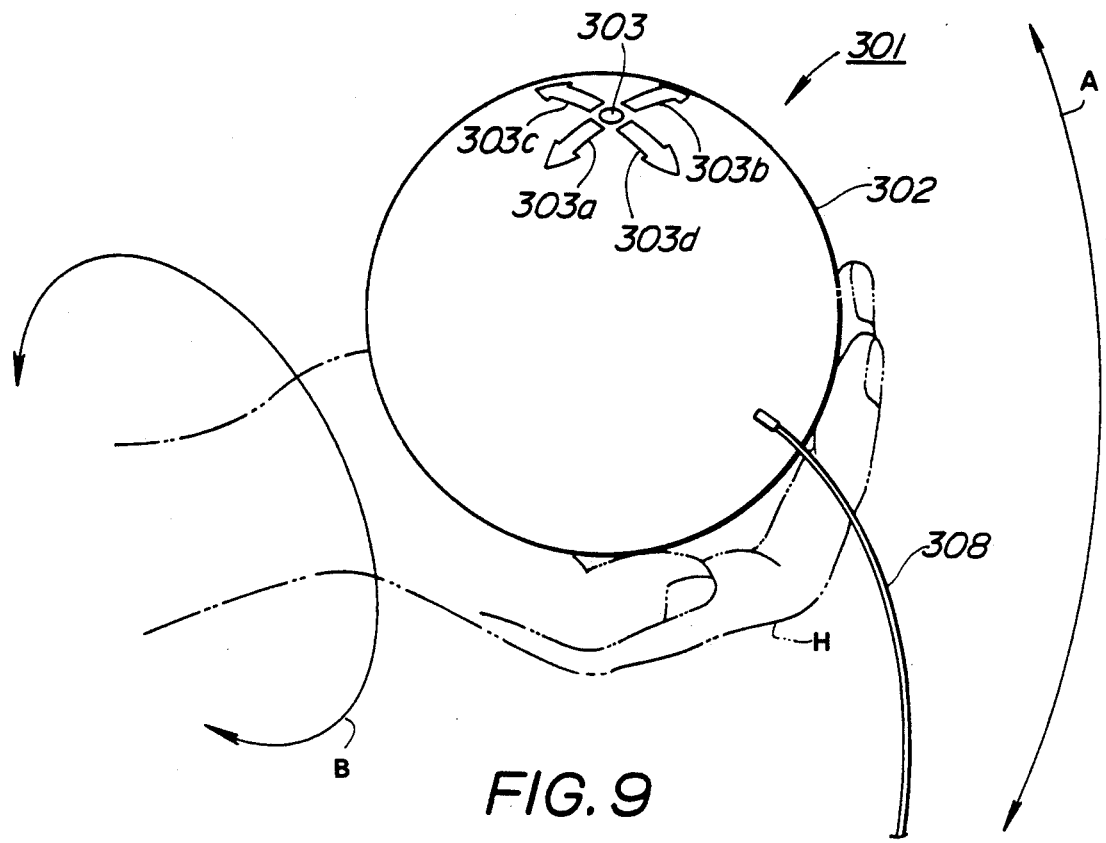
FIG. 9 is a perspective view showing an appearance of an embodiment of an angle sensor 301 according to the present invention.
Figure 10:
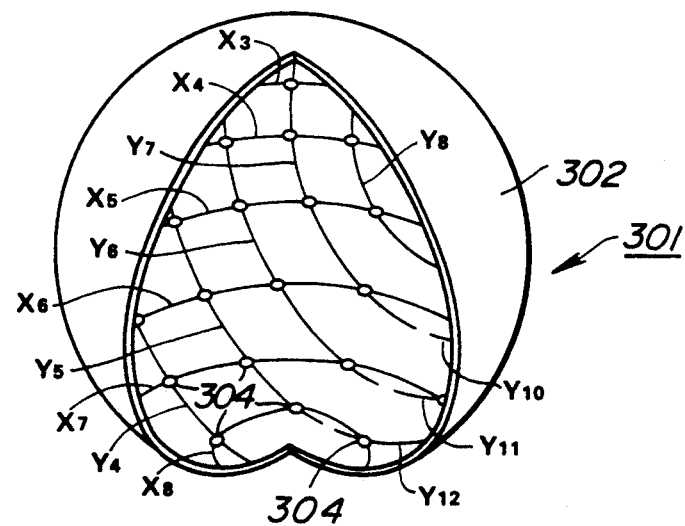
FIG. 10 is a partially cutaway view in perspective of the angle sensor 301.
Figure 11:
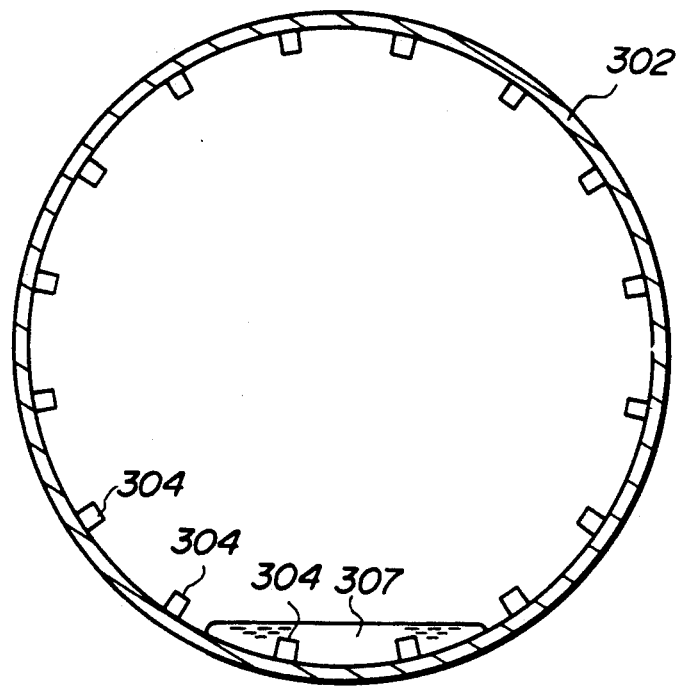
FIG. 11 is a sectional view of the angle sensor 301.
Figure 12:
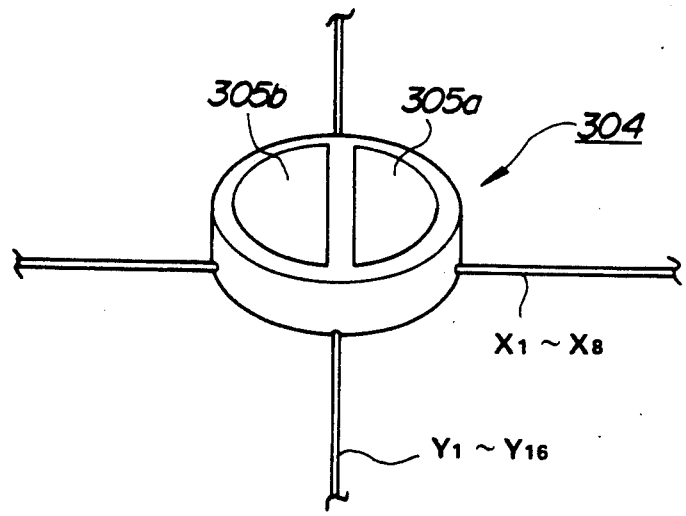
FIG. 12 is a perspective view showing detector 304 arranged in the inside of the angle sensor 301.
Figure 13:
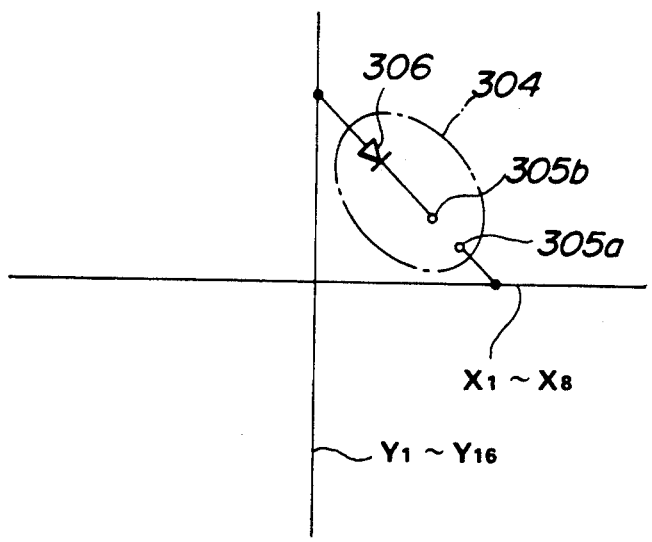
FIG. 13 is a circuit diagram showing an electric constitution of the detector 304.
Figure 14:
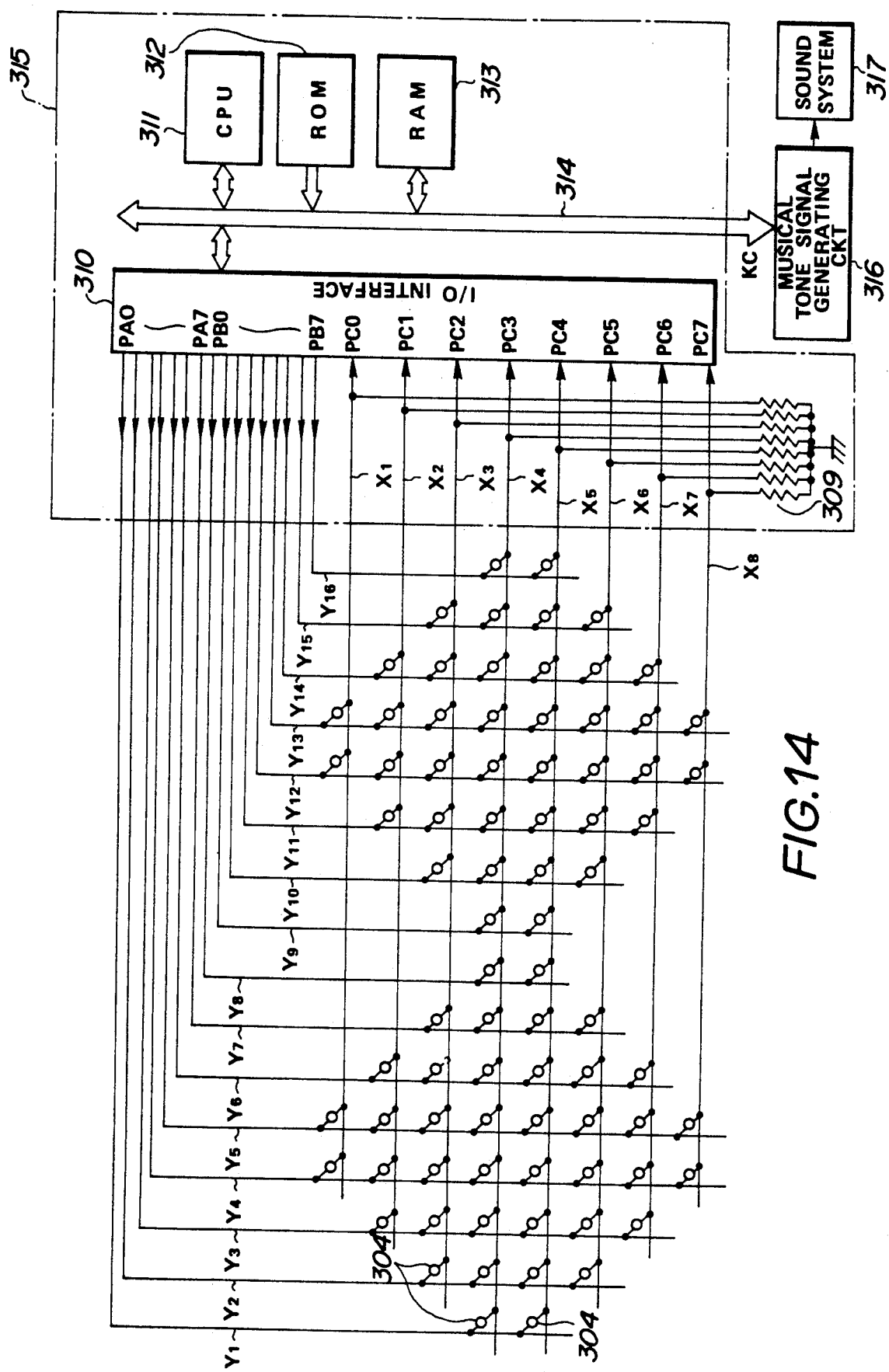
FIG. 14 is a block diagram showing an embodiment of an electronic musical instrument employing the angle sensor 301.

In these FIGS. 9 to 13, 302 designates a ball-shaped hollow case. On an outside peripheral surface of the case 302, a circle mark 303 is written as a center position, and arrow marks 303a to 303d are written such that the arrow marks 303a to 303d indicate outer directions from the center position 303. On the other hand, lines $X_1$ to $X_8$ in a X-axis direction and lines $Y_1$ to $Y_{16}$ in a Y-axis direction are wired in a matrix in the inside surface of the case 302 (as shown in FIG. 14). Detectors 304 are provided at intersection points where the lines $X_1$ to $X_8$ cross the lines $Y_1$ to $Y_{16}$. As shown in FIG. 12, the detector 304 has a pair of contacts 305a and 305b on an outside surface thereof and a diode (not shown) in the inside thereof. As shown in FIG. 13, the contact 305a is connected to the lines $X_1$ to $X_8$ directly, and the contact 305b is connected to the lines $Y_1$ to $Y_{16}$ via a diode 306. As shown in FIG. 11, mercury fluid 307 is enclosed within the case 302, hence, the contact 305a can be connected to the contact 305b via the mercury fluid 307 (i.e., the detector 304 is turned on). The lines $X_1$ to $X_8$ and the lines $Y_1$ to $Y_{16}$ are connected to an external device (not shown) via a cable 308 (as shown in FIG. 9).

As shown in FIG. 9, the angle sensor 301 having the above-mentioned constitution is held by a hand H. In the case where the hand H is moved up and down in a direction A or the hand H is twisted in a direction B, the mercury fluid 307 must always move downward within the case 302. In this case, an inclination of the angle sensor 301 varies the detector 304 which is turned on by the mercury fluid 307. Therefore, an inclination angle of the angle sensor 301 in the direction A and an inclination angle thereof in the direction B can be detected by detecting a combination of turn-on detectors 304 based on a turn-on state among the lines $X_1$ to $X_8$ and the lines $Y_1$ to $Y_{16}$.

Next, description will be given with respect to an electronic musical instrument employing the above-mentioned angle sensor 301 in conjunction with FIG. 14.

In FIG. 14, 309 designates resistors which pull down the lines $X_1$ to $X_8$, and 310 designates an I/O interface having output ports PA and PB connected to the lines $Y_1$ to $Y_{16}$ and an input port PC connected to the lines $X_1$ to $X_8$. In addition, 311 designates a central processing unit (CPU), 312 designates a read only memory (ROM) for storing predetermined programs used for the CPU 311, 313 designates a random access memory (RAM) used for a work area, and 314 designates a bus line. The above-mentioned elements 309 to 314 constitute a musical tone control circuit 315.

The CPU 311 sequentially selects one bit from bits PA0 to PA7 within the output port PA and bits PB0 to PB7 within the output port PB, and the CPU 311 sets a level of the selected one bit to the high (H) level. The "H" level signal is supplied to one of bits PC0 to PC7 within the input port PC via a certain line among the lines $X_1$ to $X_8$ which corresponds to a certain line having the H level among the lines $Y_1$ to $Y_{16}$. Hence, the the CPU 311 can detect that which detector 304 is turned on by monitoring the "H" level signal supplied to the bits PC0 to PC7. In addition, the CPU 311 can determine the inclination angle of the angle sensor 301 in the directions A and B based on the turn-on states of the detectors 304. Accordingly, the CPU 311 generates musical tone control data KC, the content of which corresponds to the inclination angle. The musical tone control data KC are supplied to a musical tone signal generating circuit 316 via the bus line 314. The musical tone signal generating circuit 316 generates a musical tone signal having a tone pitch corresponding to the value of the supplied musical tone control data KC. Such musical tone signal is supplied to a sound system 317 wherein a musical tone corresponding to the musical tone signal is generated.

In the case where the circle mark 303 can be seen at a top position of the angle sensor 301 as shown in FIG. 9, the sound system 317 generates a musical tone having a predetermined reference tone pitch. Thereafter, when the hand H is moved up and down in the direction A or the hand H is twisted in the direction B, the tone pitch of the musical tone generated from the sound system 317 must be varied in response to the moving direction of the angle sensor 301.

As described heretofore, the electronic musical instrument employing the angle sensor 301 can generate musical tones having various tone pitches which corresponds to the inclination of the angle sensor 301. For instance, when the angle sensor 301 held by the player's hand is moved, it is possible to generate various musical tones in response to the movement of the player's hand. Thus, it is possible to enjoy a musical performance based on a brand-new performance method which can not be realized by the conventional electronic musical instrument.

Incidentally, it is possible to constitute the present embodiment such that the tone pitch is varied in response to the inclination angle of the angle sensor 301 in the direction A and the tone volume is varied in response to the inclination angle of the angle sensor 301 in the direction B. Furthermore, it is possible to constitute the present embodiment such that the tone color and the like are varied in response to the inclination angle of the angle sensor 301.

Figure 15:
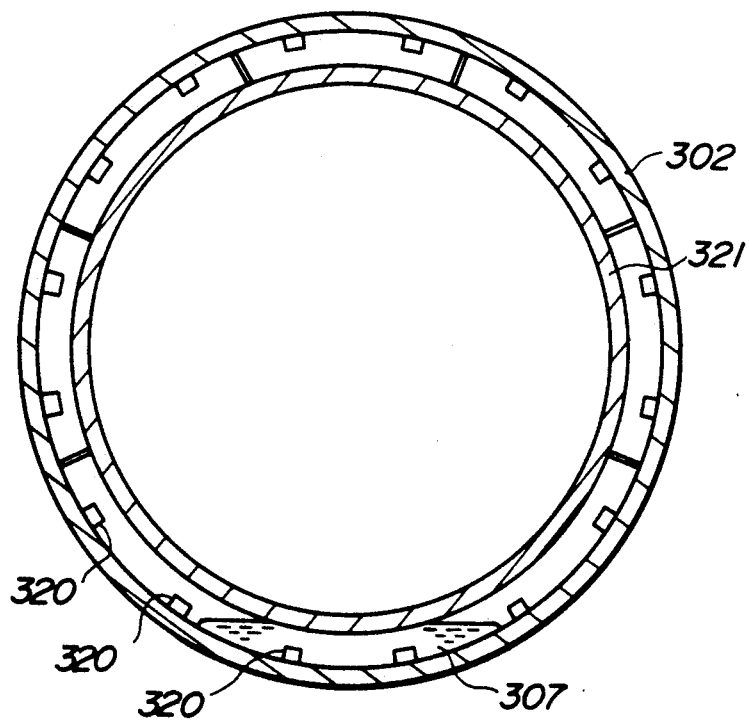
FIG. 15 is a sectional view showing a modified embodiment of the angle sensor according to the present invention.

Next, description will be given with respect to a modified embodiment of the present embodiment in conjunction with FIG. 15. In FIG. 15, contacts 320 are provided on the inside surface of the case 302 instead of the detectors 304, and a ball-shaped common electrode 321 is provided in a hollow inside portion of the case 302. Hence, the inclination angle of the case 302 varies a combination of contacts 320 which are connected to the common electrode 321 via the mercury fluid 307.

In the above-mentioned embodiments, the case 302 is shaped like a ball. However, the shape of the case 302 is not limited to the ball shape. Instead, it is possible to form the case as a cylindrical shape.

[II] MUSICAL TONE CONTROL APPARATUS

Next, description will be given with respect to embodiments of the musical tone control apparatus according to the present invention.

(A) FIRST EMBODIMENT

(1) CONSTITUTION OF FIRST EMBODIMENT

Figures 16, 17:
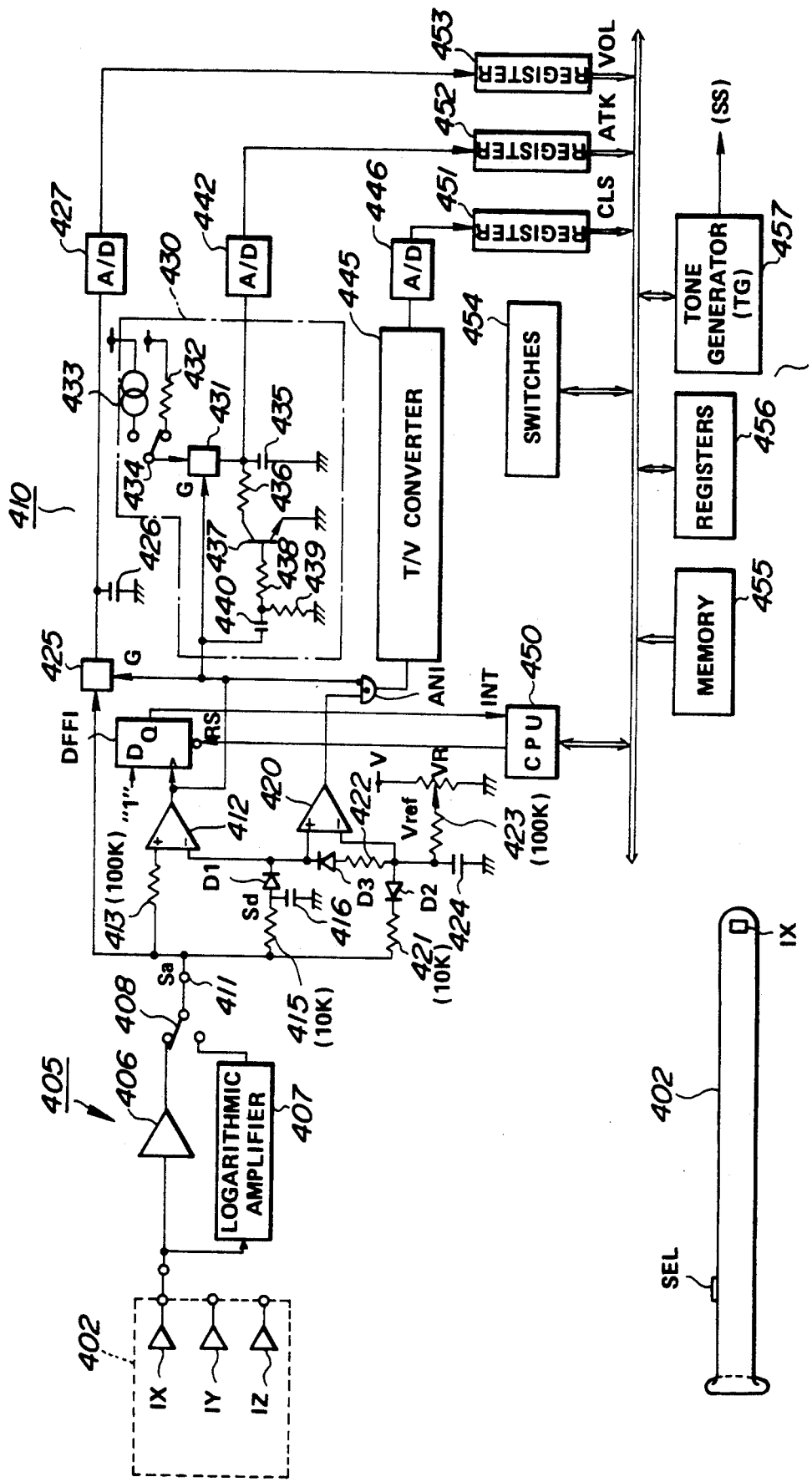
FIG. 16 is a block diagram showing a first embodiment of a musical tone generating apparatus according to the present invention.
FIG. 17 shows an appearance of a drum stick used in the musical tone generating apparatus shown in FIG. 16.

FIG. 16 is a block diagram showing a first embodiment of the musical tone control apparatus according to the present invention. In FIG. 16, 1X, 1Y and 1Z designate acceleration sensors which respectively detect accelerations in a X-axis direction, a Y-axis direction and a Z-axis direction. For example, these acceleration sensors 1X to 1Z are constructed by strain gauges which output acceleration signals corresponding to the above predetermined directions. In the first embodiment, these acceleration sensors 1X to 1Z are respectively attached to an edge portion of a drum stick 402 as shown in FIG. 17. Another edge portion of this drum stick 402 is held by the player's hand, hence, a musical tone corresponding to the swing movement will be generated when the player swings the drum stick 402. In addition, a tone color selecting switch SEL is mounted at the other edge portion of the drum stick 402. When the player depresses such switch SEL, a desirable tone color is selected.

Next, description will be given with respect to a circuit for generating a musical tone based on output signals of the acceleration sensors 1X to 1Z. However, since each of the acceleration sensors 1X to 1Z has the same circuit for generating the musical tone, description of the acceleration sensors 1Y and 1Z will be omitted.

In FIG. 16, 405 designates an amplifier section which is constituted by a parallel circuit of a linear amplifier 406 and a logarithmic amplifier 407, and the amplifier section 405 amplifies the output signal of the acceleration sensor 1X. One of the linear amplifier 406 and the logarithmic amplifier 407 is selected by a select switch 408, hence, one of output signals of the linear amplifier 406 and the logarithmic amplifier 407 is supplied to an input terminal 411 of an acceleration peak detecting circuit 410 via the select switch 408. This acceleration peak detecting circuit 410 detects a peak value of the acceleration detected by the acceleration sensor 1X and also detects an acceleration increasing/attenuating duration.

Next, detailed description will be given with respect to the acceleration peak detecting circuit 410. A non-inverting input terminal of a comparator 412 is connected to an input terminal 411 via a resistor 413 (having a resistance of 100 Kilo-Ohm). A resistor 415 (having a resistance of 10 Kilo-Ohm) and a capacitor 416 constitute an integration circuit for delaying an acceleration signal Sa inputted into the input terminal 411, and an output signal of such integration circuit is supplied to an inverting input terminal of the comparator 412 and a non-inverting input terminal of a comparator 420 via a diode D1 in a forward direction. A variable resistor VR divides a voltage V so as to set a reference voltage Vref, and the reference voltage Vref is supplied to an inverting input terminal of the comparator 420 via a resistor 423 (having a resistance of 100 Kilo-Ohm). The value of the reference voltage Vref varies due to a charging or a discharging of a capacitor 424 which grounds the inverting input terminal of the comparator 420. The inverting input terminal of the comparator 420 is connected to the non-inverting input terminal thereof via a resistor 422 and a diode D3 in forward direction, and such inverting input terminal is also connected to the input terminal 411 via a diode D2 in forward direction and via a resistor 421 (having a resistance of 10 Kilo-Ohm).

Next, the output signal of the comparator 412 is supplied to a clock input terminal of a delay flip-flop DFF1, the data input terminal D of which is supplied with a "1" signal. The output signal of the delay flip-flop DFF1 is supplied to a CPU 450 as an interrupt signal INT. The CPU 450 supplies a reset signal RS to the delay flip-flop DFF1.

The output signal of the comparator 412 turns on or off a switching element 431. When the switching element 431 is turned on, a capacitor 435 is charged via a first path comprising a resistor 432 and a switch 434 or via a second path comprising a constant current source 433 and the switch 434. In other words, the capacitor 435 is charged in a period when the output signal of the comparator 412 is identical to the "1" signal, and such period is converted into a charging voltage of the capacitor 435. In this case, a desirable charging characteristic of the capacitor 435 can be selected by selecting the switch 434. The charging voltage of the capacitor 435 is converted into a digital signal in an analog-to-digital (A/D) converter 442.

Next, a resistor 436 and a transistor 437 constitute a discharging path (or a reset path) of the capacitor 435. A base of transistor 437 is grounded via resistors 438 and 439, and the base of transistor 437 is also connected to the output terminal of the comparator 412 via the resistor 438 and a capacitor 440. Hence, when a base current is supplied to the base of transistor 437 via the capacitor 440 and the resistor 438 at a leading edge timing of the output signal of the comparator 412, the transistor 437 is turned on. Thus, a time-to-voltage (T/V) converter 430 is constituted as described heretofore.

The output signal of the comparator 412 is supplied to a negative input terminal of an AND gate AN1, and the output signal of the comparator 420 is supplied to a positive input terminal of the AND gate AN1. The output signal of such AND gate AN1 is supplied to a T/V converter 445 which has the same circuit constitution of the T/V converter 430. This T/V converter 445 converts a period when the AND gate AN1 outputs the "1" signal into a voltage. The output signal of the T/V converter 445 is converted into a digital signal in an A/D converter 446.

As described heretofore, the acceleration peak detecting circuit 410 is constituted.

Next, description will be given with respect to a musical tone processing circuit 460. This musical tone processing circuit 460 controls an operation for generating several kinds of musical tones based on output signals of A/D converters 427, 442 and 446. More specifically, the musical tone processing circuit 460 is constituted by registers 451, 452 and 453 for storing respective output data of the A/D converters 446, 442 and 427, the CPU 450 for controlling several portions within the circuit 460, a memory 455 for storing programs used in the CPU 450, registers 456 for once storing several kinds of data, switches 454 (including the select switch SEL shown in FIG. 17) for designating several kinds of commands and modes, and a tone generator 457 for generating a musical tone signal. The musical tone signal generated in the tone generator 457 is supplied to a sound system SS (not shown) wherein a musical tone corresponding to the supplied musical tone signal is generated.

(2) OPERATION OF FIRST EMBODIMENT

Next, description will be given with respect to the operation of the first embodiment. Hereinafter, the switches 408 and 434 are connected as shown in FIG. 16.

(a) Operations of Comparators 412 and 420

First, description will be given with respect to the operations of the comparators 412 and 420.

When the player holds the drum stick 402 (shown in FIG. 17) and swings the drum stick 402 once in a predetermined direction, the acceleration sensor 1X detects an acceleration of the drum stick 402 corresponding to the swing movement of the player, so that the acceleration sensor 1X outputs the acceleration signal to the input terminal 411 of the acceleration peak detecting circuit 410 as the acceleration signal Sa having a curve shown in FIG. 18(a). In general, the swing movement of the player may have an acceleration characteristic where an acceleration is once given to the drum stick 402 in an inverting direction of the desirable swing direction (in a pre-movement period) and the acceleration is thereafter increased in the desirable swing direction. Thereafter, the value of the acceleration reaches to a peak value, and then the value of the acceleration attenuates so as to reach a "0" value.

In this case, the pre-movement period is started at a time $t_{10}$ (shown in FIG. 18(a)), and the swing movement in the desirable swing direction will be started at a time $t_{11}$. The value of the acceleration signal Sa is smaller than that of the reference voltage Vref (as shown by a dashed line in FIG. 18(a)) in a period between the times $t_{10}$ and $t_{11}$. In addition, a value of an output signal Sd (as shown by a dotted line in FIG. 18(a)) of the integration circuit constituted by the resistor 415 and the capacitor 416 is smaller than that of the reference voltage Vref. As a result, the diode D1 (shown in FIG. 16) is turned off, and the diodes D2 and D3 are turned on. Hence, the reference voltage Vref is supplied to the inverting input terminal of the comparator 412 via the resistor 422 and the diode D3 in series, while the capacitor 424 starts to discharge its electric charge via the diode D2. Thus, the value of the reference voltage Vref is lowered so that the value of the reference voltage Vref becomes equal to that of the acceleration signal Sa at the time $t_{11}$. Since the value of a forward voltage drop of the diode D3 is quite small, it can be considered that the reference voltage Vref is directly supplied to the inverting input terminal of the comparator 412. Therefore, the voltage supplied to the inverting input terminal of the comparator 412 is higher than the voltage supplied to the non-inverting input terminal thereof until the time $t_{11}$, whereby the output signal of the comparator 412 becomes identical to the "0" signal as shown in FIG. 18(b).

Next, a relation between the values of the acceleration signal Sa and the reference voltage Vref can be expressed as the following inequality (3) during a period between the times $t_{11}$ and $t_{12}$.

$$Sa > Vref > Sd \qquad (3)$$

As a result, the diodes D1 and D2 are turned off, and the diode D3 is turned on, whereby the comparator 412 performs a comparing operation for comparing the level of the acceleration signal Sa with that of the reference voltage Vref. Due to this comparing operation, the output signal of the comparator 412 turns up to the "1" signal at the time $t_{11}$ as shown in FIG. 18(b). In addition, since the diode D2 is turned off at the time $t_{11}$, the discharge path of the capacitor 424 is cut off. Hence, the capacitor 424 is charged via the variable resistor VR and the resistor 423. Thus, the value of the reference voltage Vref increases gradually after the time $t_{11}$, and thereafter, the level of the reference voltage Vref reaches at a predetermined initial voltage.

Next, the level of the signal Sd exceeds that of the reference voltage Vref at a time $t_{12}$. As a result, the diode D1 is turned on and the diode D3 is turned off, hence, the comparator 412 performs the comparing operation thereof. Comparing to the signal Sa, the phase of the signal Sd is delayed by a minute time and the inclination of the curve of the signal Sd is slightly small. Therefore, a relation such as Sa > Sd is maintained until the value of the acceleration signal Sa reaches at the peak value, whereby the output level of the comparator 412 is maintained at the "1" level after the time $t_{12}$. Thereafter, at the time $t_{12}$ when the level of the signal Sd exceeds that of the reference voltage Vref, the output signal of the comparator 420 rises up to the "1" signal as shown in FIG. 18(c).

Next, the level of the signal Sd exceeds that of the acceleration signal Sa at a time $t_{13}$, whereby the output signal of the comparator 412 falls down to the "0" signal as shown in FIG. 18(b). After the time $t_{13}$, the level of the acceleration signal Sa does not exceed that of the signal Sd and that of the reference voltage Vref. As a result, the output level of the comparator 412 is maintained at the "0" level.

During a period between times $t_{13}$ and $t_{14}$, the level of the signal Sd is higher than that of the reference voltage Vref, whereby the output level of the comparator 420 is maintained at the "1" level. At the time $t_{14}$, the level of the reference voltage Vref exceeds that of the signal Sd, whereby the output signal of the comparator 420 falls down to the "0" signal. Since the level of the signal Sd is maintained lower than that of the reference voltage Vref after the time $t_{14}$, the output level of the comparator 420 is maintained at the "0" level.

The above-mentioned output signal of the comparator 420 is supplied to the positive input terminal of the AND gate AN1, while the output signal of the comparator 412 is inverted at the negative input terminal of the AND gate AN1. As a result, the output level of the AND gate AN1 becomes the "1" level during a period between the times $t_{13}$ and $t_{14}$ as shown in FIG. 18(d).

(b) Meanings of Output Signals of Comparator 412 and AND Gate AN1

Next, description will be given with to the period when the comparator 412 outputs the "1" signal.

Figure 18:
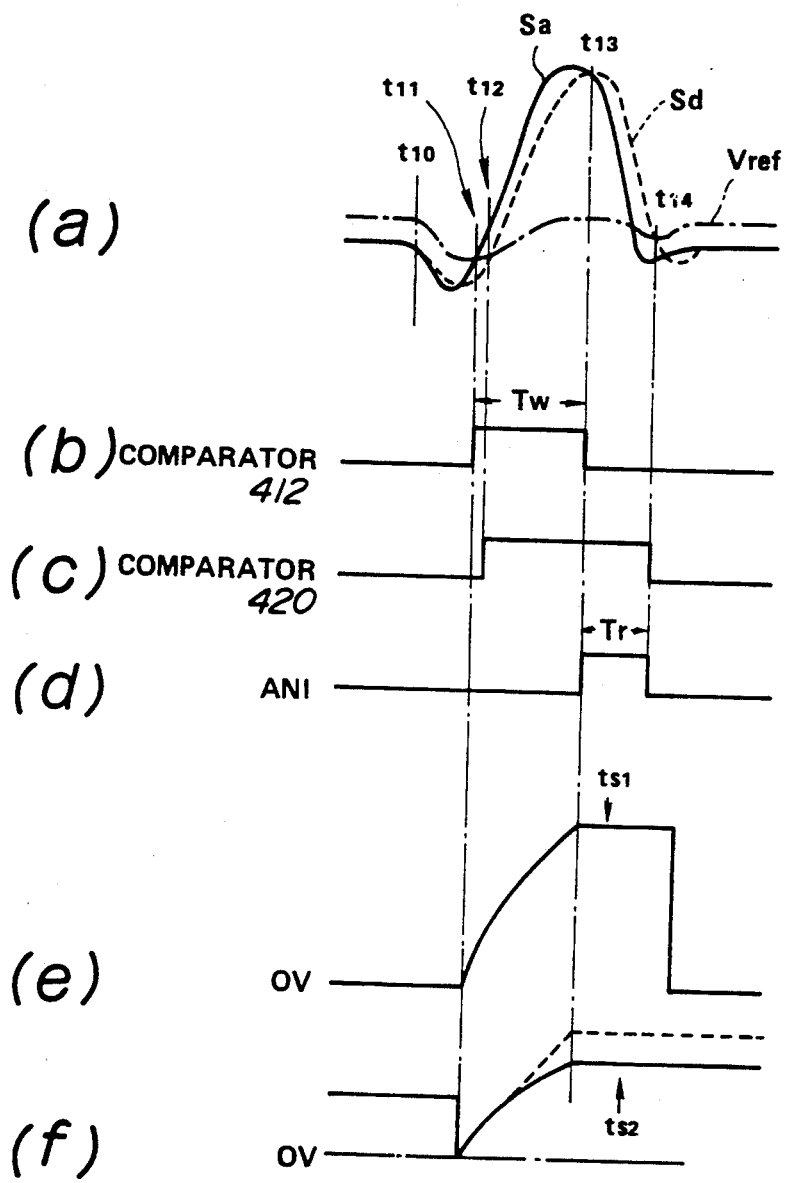
FIGS. 18(a) to 18(f) show waveforms at several points within the musical tone generating apparatus shown in FIG. 16.

The output level of the comparator 412 becomes the "1" level at the period between the times $t_{11}$ and $t_{13}$ as shown in FIG. 18(a). It is apparent from FIG. 18 that the time $t_{11}$ can be identified as a time when the level of the acceleration signal Sa is inverted from the negative level to the positive level.

Figure 19:
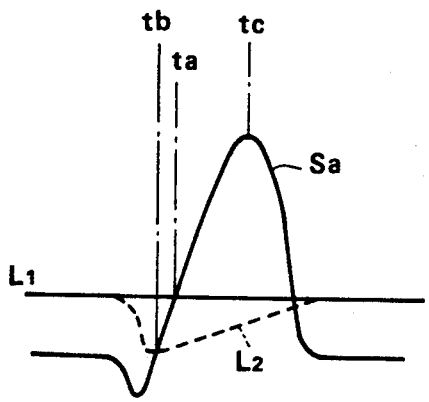
FIG. 19 shows a waveform for explaining a detecting principle in an acceleration increasing period.
Figure 21:
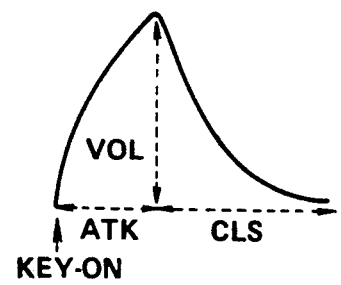
FIG. 21 shows a waveform for explaining a musical tone control of the musical tone processing circuit 460.

Next, description will be given with respect to a detection principle for detecting such inverting time $t_{11}$. When such inverting time is detected by use of a fixed reference level $L_1$ as shown in FIG. 19, a time ta will be detected as the inverting time. However, this time ta must be later than the real inverting time. On the other hand, in the case where a reference level $L_2$ (corresponding to the reference voltage Vref) varies in response to the level variation of the acceleration signal Sa in a negative side as described in the present embodiment, the detected inverting time will be identical to a time tb, whereby a detection accuracy must be raised reasonably.

In addition, the time $t_{13}$ is approximately identical to a peak time when the value of the acceleration signal Sa reaches the peak value. According to the detecting principle as shown in FIG. 18(a), the level of the acceleration signal Sa (as an original signal) is compared with that of the delayed acceleration signal Sd, and a time when the level of the signal Sd exceeds that of the acceleration signal Sa is judged as the above peak time. Therefore, such detecting principle can detect the peak time with accuracy by properly selecting the delay time of the signal Sd.

As is apparent from the above description, a period between the times $t_{11}$ and $t_{13}$ shown in FIG. 18 (i.e., a period Tw when the comparator 412 outputs the "1" signal) corresponds to a period when the acceleration is increasing.

Meanwhile, a time $t_{14}$ when the output signal of the comparator 420 falls down is identical to a time when the level of the delay signal Sd becomes lower than that of the reference voltage Vref. As a result, a period Tr when the AND gate AN1 outputs the "1" signal corresponds to a period when the acceleration of the drum stick 402 is attenuating in the desirable swing direction.

(c) Operations of Output Signals of Comparator 412 AND AND Gate AN1

As described above, the high level period of the signal of the comparator 412 means the acceleration increasing period. Such output signal of the comparator 412 is supplied to a terminal G of the switching element 425 and the T/V converter 430.

As a result, the switching element 425 is subject to an open state in the acceleration increasing period, whereby the acceleration signal Sa is supplied to the capacitor 426 in the period Tw. Thus, a terminal voltage of the capacitor 426 will be increasing in the period was shown in FIG. 18(e). Thereafter, the switching element 425 is turned off at the time $t_{13}$ (i.e., the peak time of the signal Sa). As a result, a peak voltage of the signal Sa is held in the capacitor 426. At a predetermined timing $T_{s1}$ slightly delayed from the time $t_{13}$, the holding voltage of the capacitor 426 is sampled in the A/D converter 427 wherein the holding voltage is converted into a digital signal.

Meanwhile, the base current is flown into the base of transistor 437 via a differentiation circuit comprising the capacitor 440 and the resistor 438 at the time $t_{11}$ when the output signal of the comparator 412 supplied to the T/V converter 430 rises up to the "1" signal. Hence, the electric charge of the capacitor 435 is discharged via the resistor 436 and the transistor 437. In other words, the terminal voltage of the capacitor 435 is reset to zero-volt (0 V) as shown in FIG. 18(f) at the time $t_{11}$. In addition, the switching element 431 is turned on at the leading edge timing $t_{11}$ of the output signal of the comparator 412, whereby the capacitor 435 is charged via the resistor 432. Therefore, the terminal voltage of the capacitor 435 will be increasing in accordance with a predetermined charging characteristic (shown by a full line in FIG. 18(f)) from the reset time $t_{11}$. On the other hand, when the switch 434 is connected to the constant current source 433, the terminal voltage of the capacitor 435 will be increasing in accordance with a predetermined charging characteristic shown by a dotted line in FIG. 18(f).

On the contrary, when the output signal of the comparator 412 falls down to the "0" signal, the switching element 431 is turned off so that the charging of the capacitor 435 is stopped. At this time, the transistor 437 has been already turned off so that the terminal voltage of the capacitor 435 will be held after the time $t_{13}$. The value of the holding voltage of the capacitor 435 must be determined based on a charging period of the capacitor 435, hence, such holding voltage corresponds to the period Tw shown in FIG. 18. As shown in FIG. 18(f), such holding voltage is sampled and converted into a digital signal in the A/D converter 442 at a timing $t_{s2}$ which is slightly delayed after the time $t_{13}$ Next, the AND gate AN1 outputs the output signal having the high level period Tr (i.e., the attenuating period Tr of the acceleration signal Sa) to the T/V converter 445 wherein a voltage corresponding to the period Tr is generated in a manner similar to that of the T/V converter 430. The output voltage of the T/V converter 445 is converted into a digital signal in the A/D converter 446 at a predetermined timing.

(d) Operation of Musical Tone Processing Circuit 40

Next, description will be given with respect to the operation of the musical tone processing circuit 460.

Figures 20A, 20B:
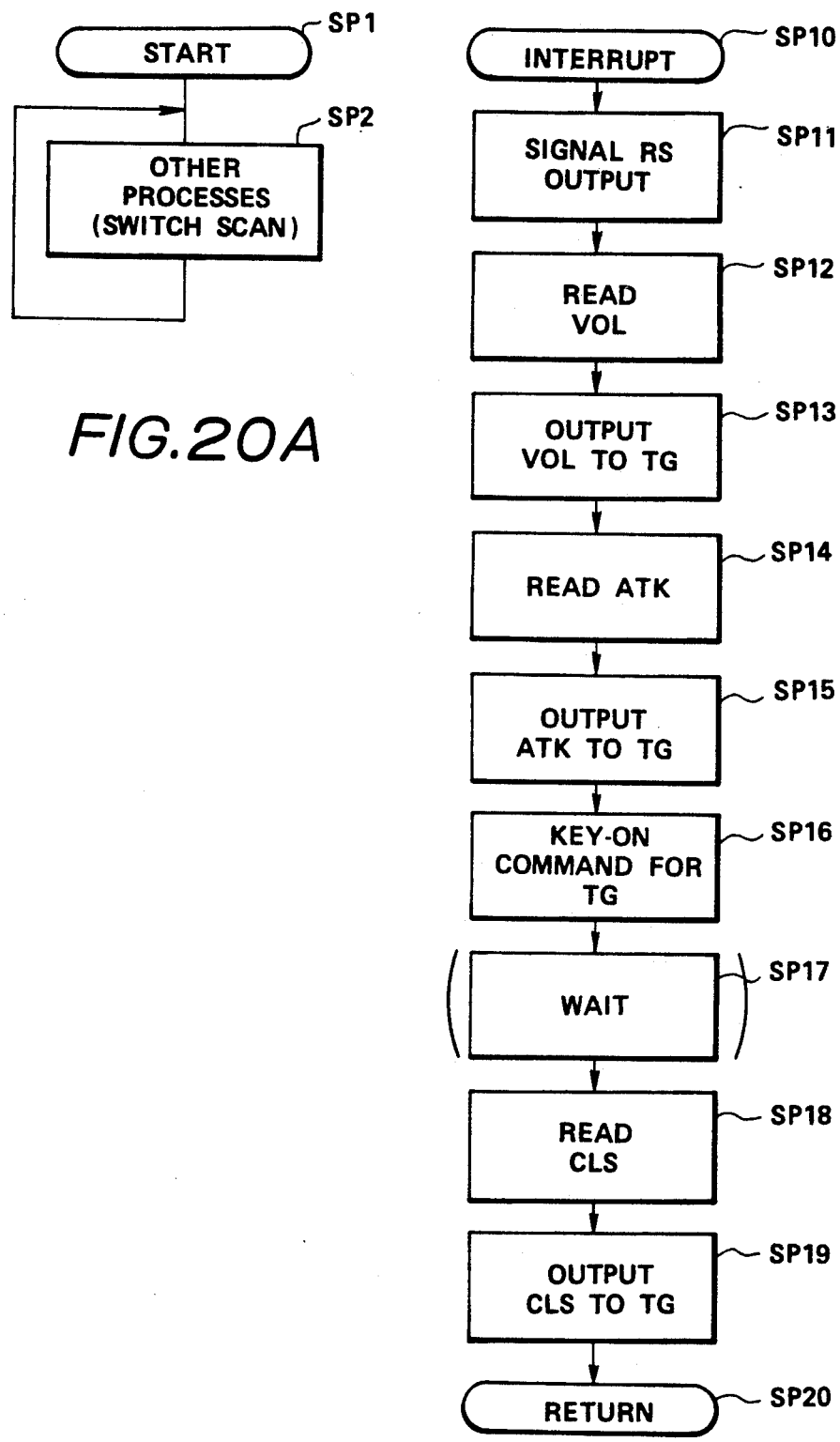
FIGS. 20A and 20B are flowcharts for explaining operations of a musical tone processing circuit 460 shown in FIG. 16.

The CPU 450 controls the musical tone processing circuit 460 in accordance with the flowcharts shown in FIGS. 20A and 20B which are performed based on the programs stored in the memory 455.

First, the CPU 450 starts the operation thereof at a step SP1 and then performs processes other than the process for generating musical tones at a step SP2 as shown in FIG. 20A. According to the processes in the step SP2, the CPU 450 scans the respective switches in the switches 454 so as to detect whether the tone color is changed or not, and the CPU 450 changes the tone color of the tone generator 457 so as to generate a musical tone having a selected tone color, for example. In this case, the CPU 450 repeatedly performs the processes in the step SP2 until the D flip-flop DFF1 (shown in FIG. 16) outputs the interrupt signal INT.

When the CPU 450 receives the interrupt signal INT from the D flip-flop DFF1, the CPU 450 executes the processes in steps SP10 etc. shown in FIG. 20B. First, the CPU 450 outputs the reset signal RS so as to reset the D flip-flop DFF1 in a step SP11. This reset signal RS stops the D flip-flop DFF1 outputting the interrupt signal INT. In a next step SP12, the CPU 450 reads the data stored in the register 453 as volume data VOL. In the present embodiment, the A/D converters 427, 442 and 446 output respective digital signals corresponding to the peak value of the acceleration signal Sa, the increasing period Tw and the attenuating period Tr to the registers 453, 452 and 451, and these digital signals are used as the musical tone control data. More specifically, the data stored in the register 453 are used as the volume data VOL for controlling the tone volume, the data stored in the register 452 are used as attack data ATK for designating a rising timing when the musical tone is started to be generated, and the data stored in the register 451 are used as close (or decay) data CLS for designating an attenuating period of the musical tone.

When the CPU 450 reads the volume data VOL in the step SP12, the CPU 450 supplies such volume data VOL to the tone generator 457 so as to set the tone volume value of the musical tone signal in a step SP13. Next, the CPU 450 reads the attack data ATK from the register 452 and supplies such attack data ATK to the tone generator 457 so as to set the rising timing of the musical tone signal in steps SP14 and SP15. Thereafter, the CPU 450 supplies a key-on command to the tone generator 457 in a step SP16. As a result, the tone generator 457 starts to generate the musical tone based on the attack data ATK and the volume data VOL. After a desirable wait time has been passed in a step SP17, the CPU 450 reads the close data CLS from the register 451 in a step SP18. In a next step SP19, such close data CLS are supplied to the tone generator 457 wherein the level of the musical tone signal is attenuated so that the musical tone signal has an attenuating envelope the value of which corresponds to that of the attenuating period designated by the close data CLS. At this time, a first process for generating the musical tone is completed. After the step SP19, the operation of the CPU 450 returns to a main routine (i.e., the step SP2) of the interrupt process via a step SP20. Thereafter, such interrupt process (i.e., the process for generating the musical tone) will be repeatedly performed every time when the D flip-flop DFF1 outputs the interrupt signal INT.

Incidentally, the wait time in the step SP17 can be omitted in response to the kinds of the musical tones to be generated, if necessary.

(3) EFFECTS

The first embodiment of the musical tone control apparatus can obtain the following specific effects.

In order to detect the characteristics (i.e., the increasing period, the attenuating period, the peak value and the like) of the varying input signal such as the acceleration signal Sa, the conventional apparatus employs a first method for comparing the level of the input signal with a predetermined level, or the conventional apparatus employs a second method for converting the input signal into the digital signal and detecting the above periods and the peak value by use of a software process.

Since a dynamic range is relatively small, it is difficult that the above first method extracts (or detects) a slow movement and a rapid movement of a human body as well. In the above second method, it is difficult to detect a rapid variation of the input signal with accuracy because of an executing speed of the CPU. More specifically, a large quantity of information must be required for detecting the characteristics of the input signal, hence, the general CPU can not follow up the rapid variation of the input signal. In addition, in the case where the apparatus is constituted so that the characteristics of the acceleration are detected in the X-axis direction, the Y-axis direction and the Z-axis direction, the CPU in each direction must be required in order to raise the processing speed and the processing accuracy. Thus, the conventional apparatus suffers problems in that the constitution thereof must be complicated and the cost thereof must be raised.

On the contrary, the peak time of the input signal (the acceleration signal Sa) is detected by comparing the level of the input signal with that of the delayed input signal in the first embodiment. Hence, the first embodiment can detect the peak time and the peak value of the input signal based on a real time and with accuracy without using the CPU. In addition, the first embodiment can detect the acceleration increasing period and the acceleration attenuating period with accuracy because the level of the reference voltage Vref varies in response to that of the input signal.

(4) Modified Embodiments of First Embodiment

Next, description will be given with respect to modified embodiments of the first embodiment.

(a) First Modified Embodiment

The digital signals respectively outputted from the A/D converters 427, 442 and 446 can be used for controlling other parameters of the musical tone such as the tone pitch, the tone color, the regist, the performance speed (or the tempo) of an automatic rhythm performance apparatus and the like.

(b) Second Modified Embodiment

It is possible to constitute the first embodiment such that a musical tone generation due to the acceleration sensor 1X corresponds to a snare drum tone and a high hat open tone, and a musical tone generation due to the acceleration sensor 1Y corresponds to a bass drum tone and a high hat close tone. Accordingly, it is possible to generate a rhythm tone by swinging the drum stick 402 in horizontal and vertical directions. Thus, it is possible to generate two kinds of rhythm tones in a short time by rapidly changing the swing direction of the drum stick 402 from the horizontal direction to the vertical direction, for example.

(c) Third Modified Embodiment

According to a third modified embodiment, a various musical tone control can be done by use of the musical tone control apparatus combined with the angle sensor for detecting angles of the player's arm and the like.

Figure 22A:
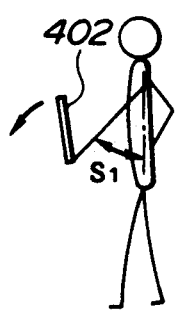
FIGS. 22A and 22B respectively show examples of playing states of a player.
Figure 22B:
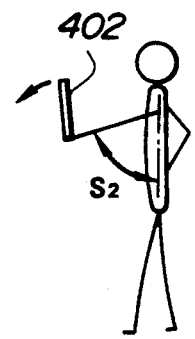

For example, the angle of the player's arm controls the key code for designating the tone pitch, and the swing movement of the drum stick 402 controls the key-on timing (i.e., the start timing for generating the musical tone) and the envelope of the musical tone in an attack portion, a peak portion and a decay portion. FIG. 22A shows the player who swings the drum stick 402 downward by an arm angle of $S_1$, and FIG. 22B shows the player who swings the drum stick 402 downward by an arm angle of $S_2$. Thus, the player can generate the musical tone having a desirable tone pitch and a desirable tone volume envelope which corresponds to his arm angle and the swing direction of the drum stick 402. Therefore, it is possible to realize a brand-new performance operation and a brand-new performance effect which could not been obtained by the conventional apparatus.

Next, description will be given with respect to the angle sensor for detecting the arm angle.

Figure 23:
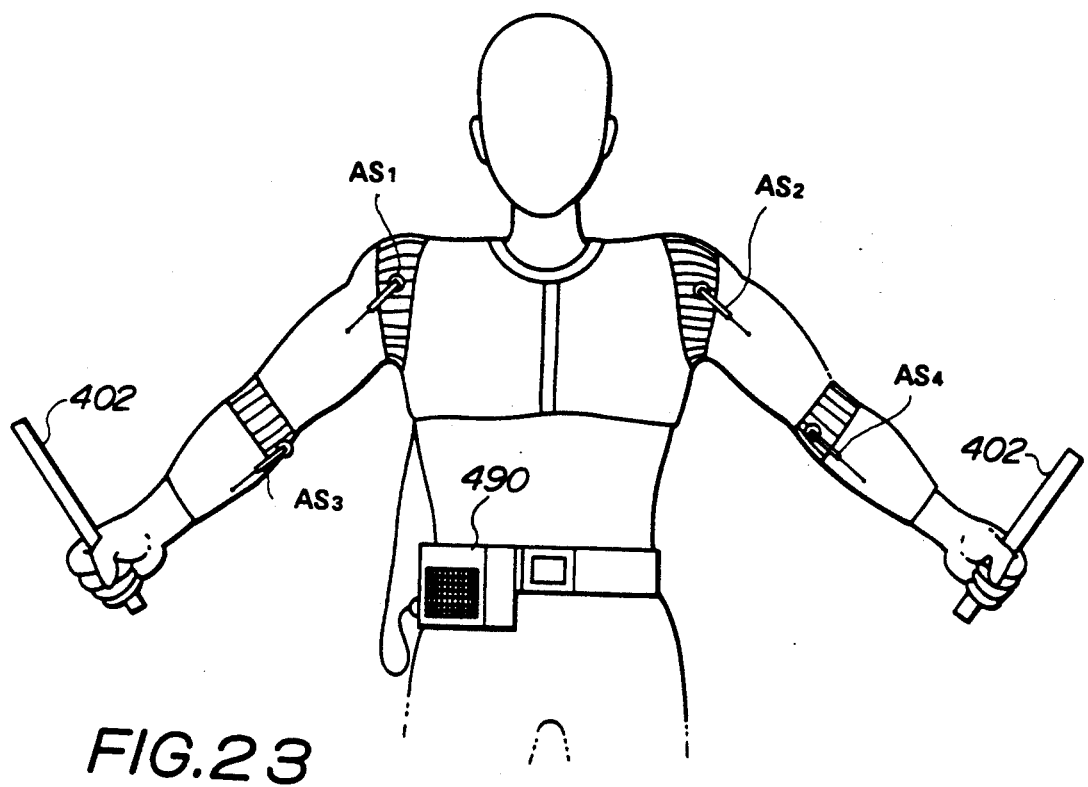
FIG. 23 shows an example of appearance of the player who is mounted with the musical tone generating apparatus using the angle sensor.
Figure 24:
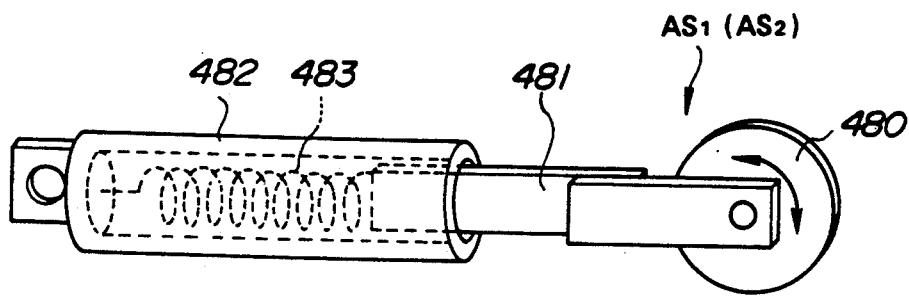
FIG. 24 is a perspective view showing an example of a mechanical constitution of the angle sensor.

FIG. 23 shows an example of the angle sensor which is mounted at a predetermined position of a specific wearer. In FIG. 23, $AS_1$ and $AS_2$ designate angle sensors for detecting angles between the arm and the body of the player. As shown in FIG. 24, each of the angle sensors $AS_1$ and $AS_2$ is constituted by a rotary type potentiometer 480, an actuator 481 interlocked with a moving terminal of the potentiometer, a receiving member 482 for receiving the actuator 481 which can be slid freely and a spring 483 for pressing the actuator 481 against the receiving member 482. When a relatively revolving movement exists between the receiving member 482 and the potentiometer 480, the actuator 481 must revolve by a revolving number corresponding to the revolving movement with respect to the potentiometer 480. Thus, the angle signal can be obtained from the potentiometer 480.

In FIG. 23, the potentiometer 480 is fixed at the shoulder of the player, and the receiving member 482 is fixed at an upper arm portion. Hence, the potentiometer 480 outputs an angle signal corresponding to the arm angle in the right and left directions of the player's body. As shown in FIG. 22, it is possible to detect the arm movement in the forward and backward directions of the player's body by changing the mounted positions of the angle sensors $AS_1$ and $AS_2$.

Figure 25:
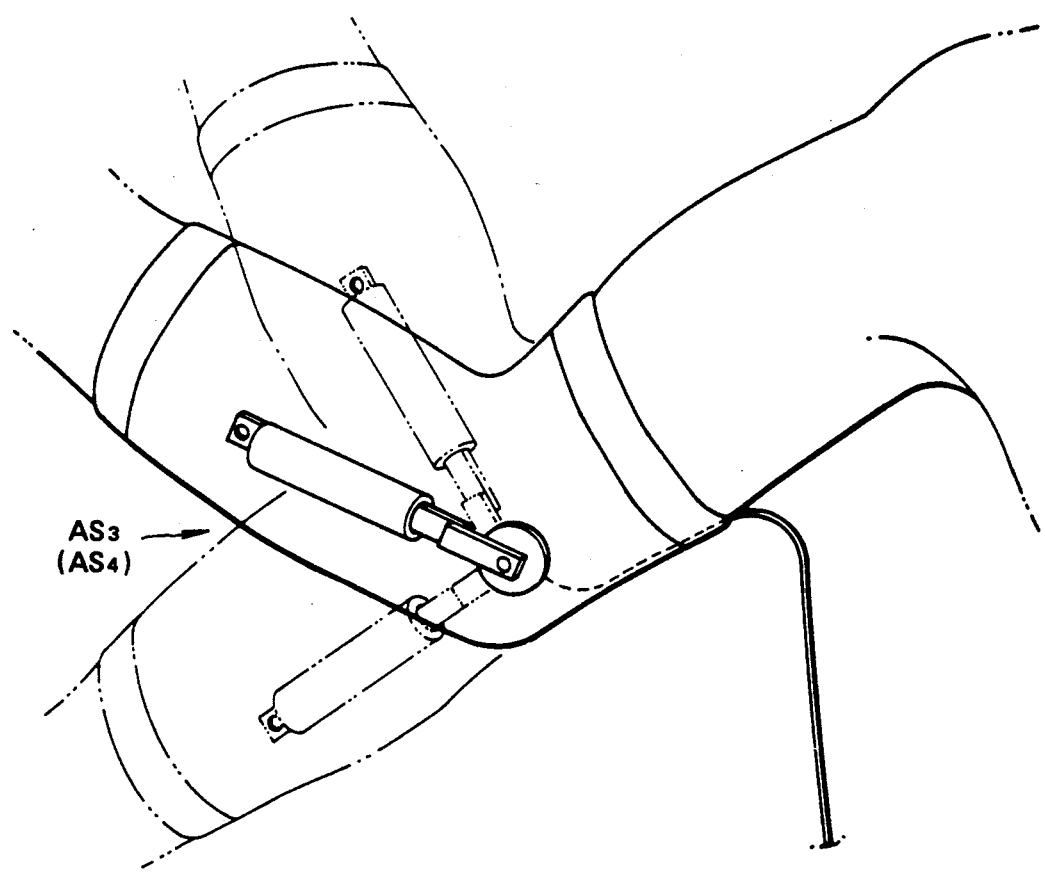
FIG. 25 shows an appearance of the angle sensor which is mounted at a player's elbow.

In addition, as shown in FIG. 23, angle sensors $AS_3$ and $AS_4$ are further provided so that the key code can be determined based on the combination of the output signals of the angle sensors $AS_1$ to $AS_4$. In this case, it is possible to select the key code in a wide tone range, and it is also possible to rapidly vary the key code. Thus, a brand-new performance effects can be obtained. As an example, FIG. 25 shows a movement of the angle sensor $AS_3$ (or $AS_4$) mounted at the player's elbow.

Incidentally, 490 shown in FIG. 23 designates a case which provides the circuit shown in FIG. 16 and the sound system therein. When such case is mounted to the player as shown in FIG. 23, it becomes functional to operate such case. In this case, the tone generator, the sound system and the like can be provided to the case externally.

Figure 26:
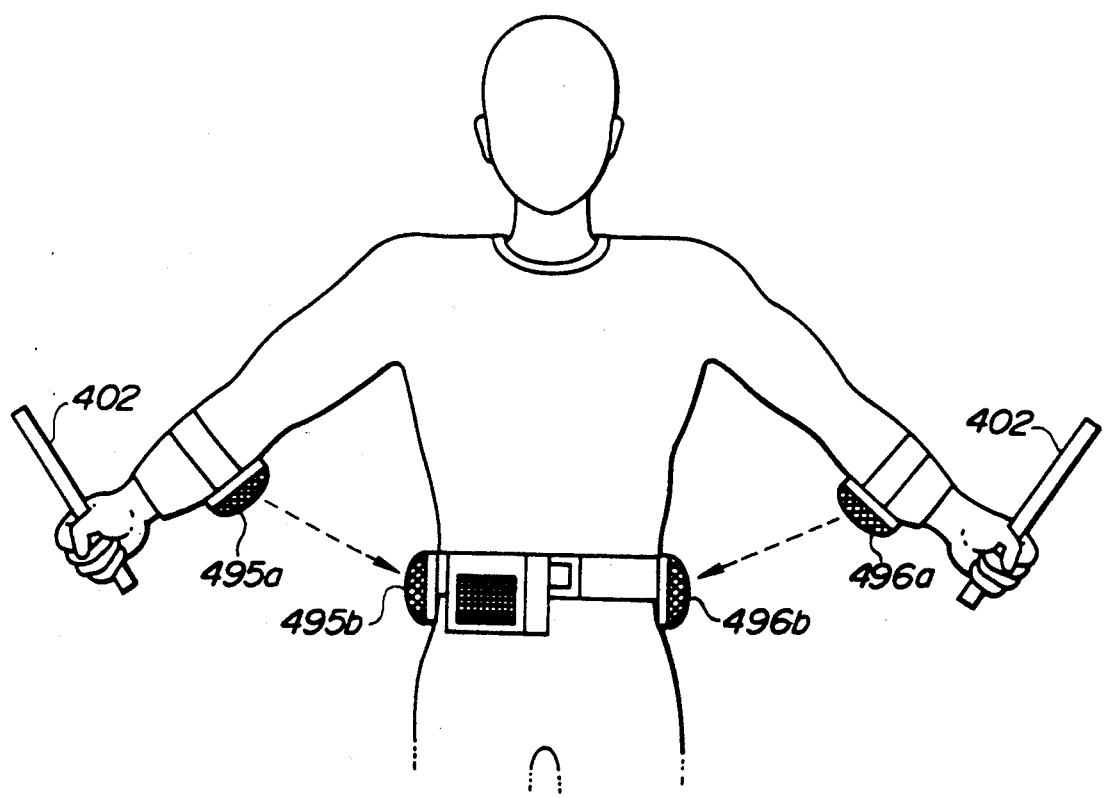
FIG. 26 shows another example of appearance of the player who is mounted with a modified musical tone generating apparatus using another angle sensor.

As another example of the angle sensor, it is possible to use ultrasonic transmitters 495*a* and 496*a* and ultrasonic receivers 495*b* and 496*b* as shown in FIG. 26. In this case, the arm angle can be detected based on the transmitting time of the ultrasonic waves which are transmitted between the ultrasonic transmitters 495*a* and 496*a* and the ultrasonic receivers 495*b* and 496*b*.

(d) Fourth Modified Embodiment

In the first embodiment shown in FIG. 16, the acceleration sensors 1X, 1Y and 1Z are provided within the drum stick 402. Instead, acceleration sensors can be mounted directly or indirectly at several portions of the player's body such as hands, feet, a neck, arms and the like. In this case, the accelerations at the above portions of the player's body will be detected.

Figure 27:
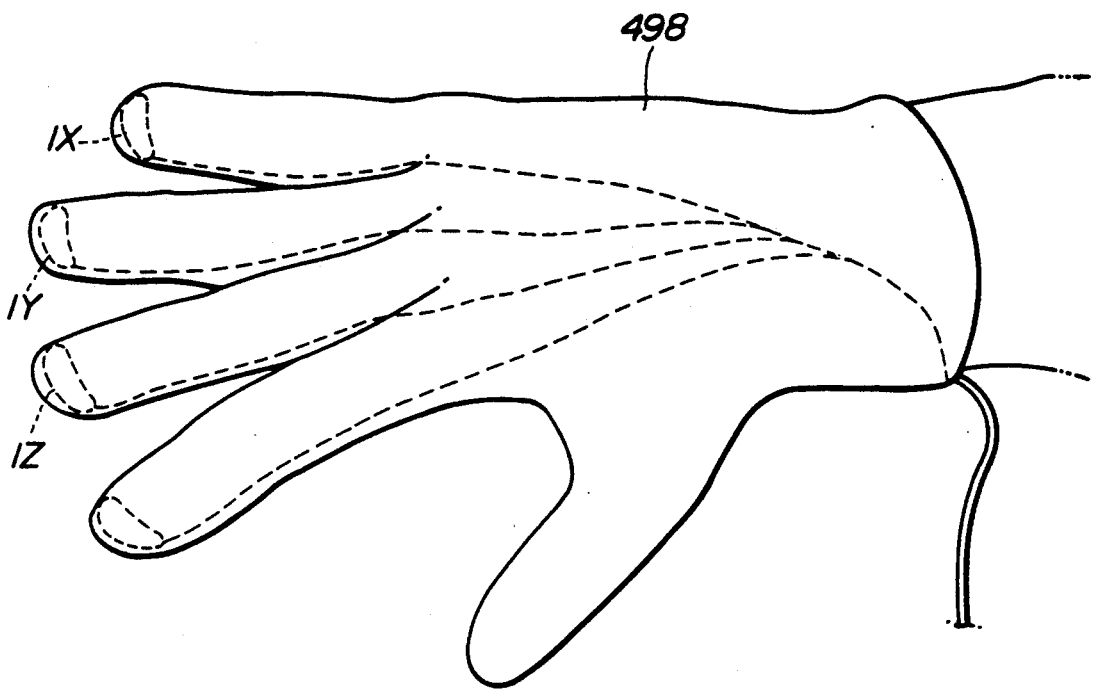
FIG. 27 is a perspective view of a still another angle sensor which is mounted in a glove.
Figure 28:
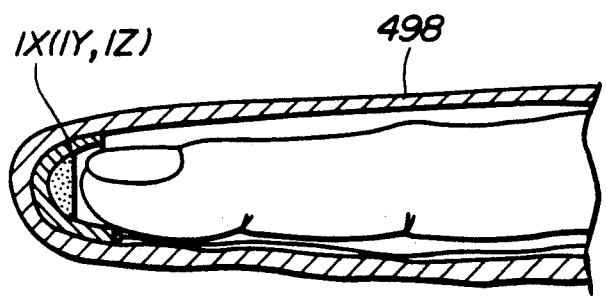
FIG. 28 is a sectional view showing the angle sensor shown in FIG. 27 which is mounted at a finger tip portion of the glove.

FIG. 27 shows an example of such acceleration sensor which is mounted at the glove for the player's hand. As shown in FIGS. 27 and 28, the acceleration sensors 1X, 1Y and 1Z and the like are mounted at respective finger tip portions of a glove 498. Due to such constitution, it is possible to detect several accelerations in response to the swing movement of the player's hand etc. Hence, the player can perform several kinds of performances by his daily movement without using the musical instruments such as the drum stick 402.

(B) Second Embodiment

Figure 29:
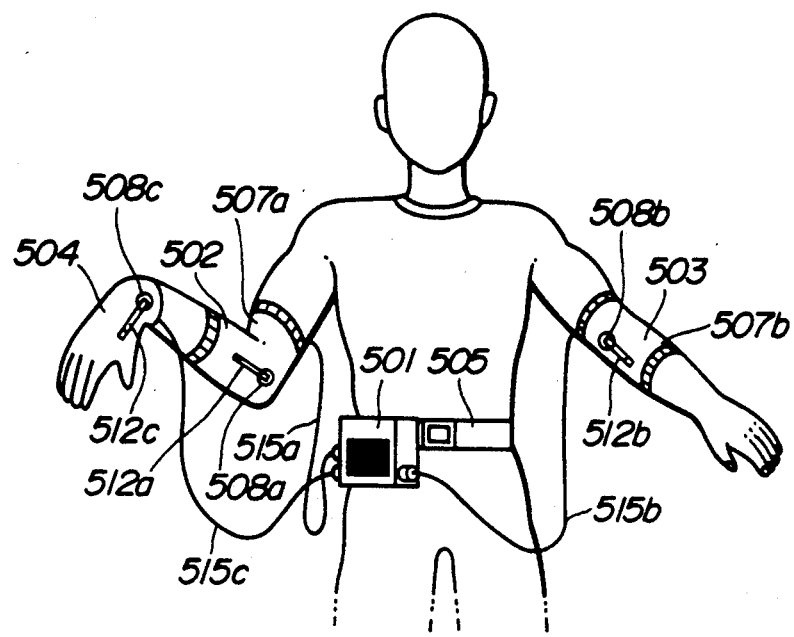
FIG. 29 shows an appearance of the player who is mounted with a second embodiment of a musical tone generating apparatus according to the present invention.
Figure 30:
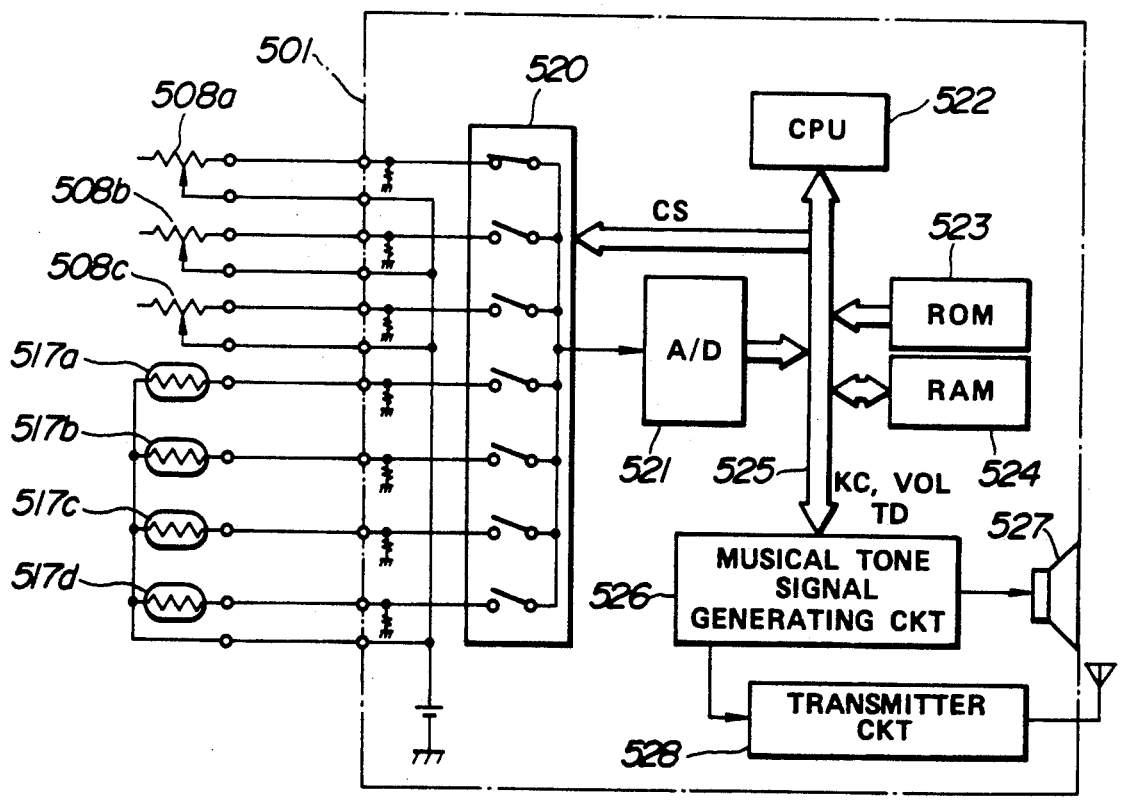
FIG. 30 is a block diagram showing an electric constitution of the second embodiment shown in FIG. 29.

FIG. 29 shows an appearance of a player who is mounted with a second embodiment of the musical tone control apparatus according to the present invention, and FIG. 30 is a block diagram showing an electric constitution of the second embodiment. The second embodiment is constituted by a control unit 501, a detecting section 502 for the player's right elbow, a detecting section 503 for the player's left elbow and a detecting section 504 for the player's right hand. The control unit 501 is mounted at the player's waist by a belt 505. The detecting sections 502, 503 and 504 are respectively mounted at the right elbow, the left elbow and the right hand of the player. The control unit 501 includes a musical tone control apparatus, a musical tone generating circuit (which is controlled by the musical tone control apparatus) and a speaker.

Figure 31:
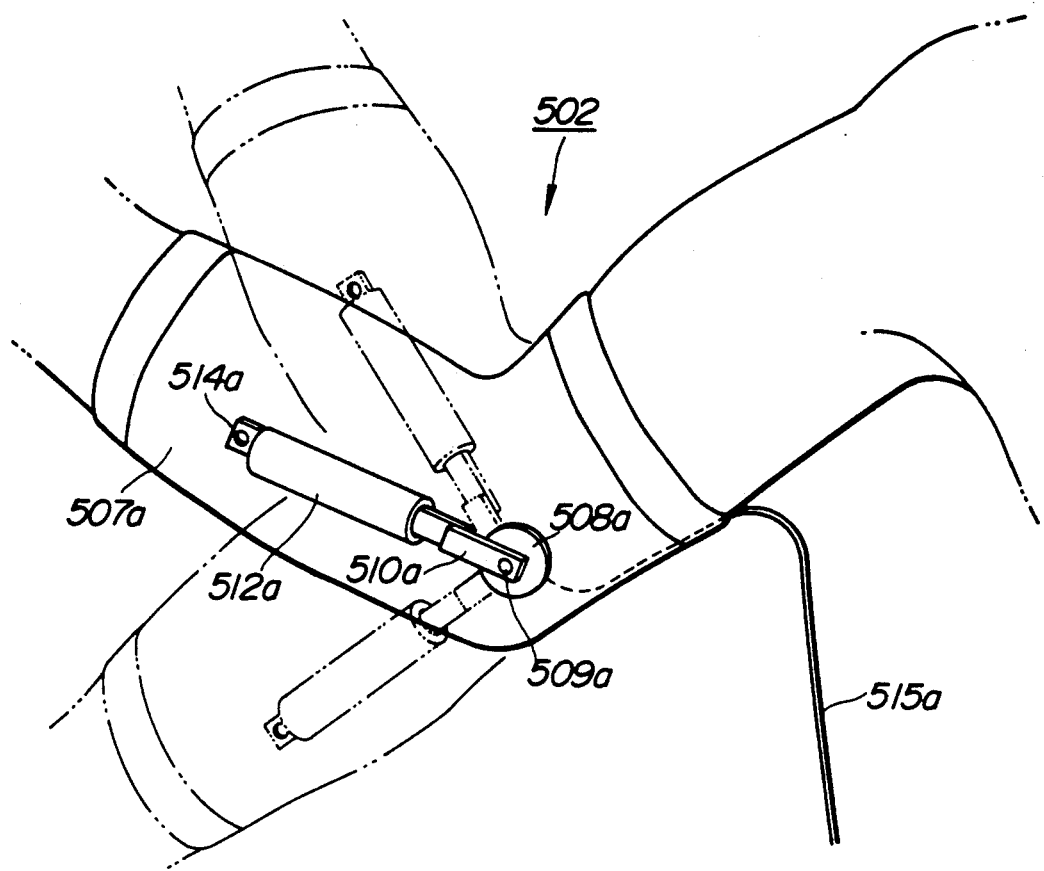
FIG. 31 is a perspective view showing an appearance of a detecting portion 502 for a right elbow of the player.
Figure 32:
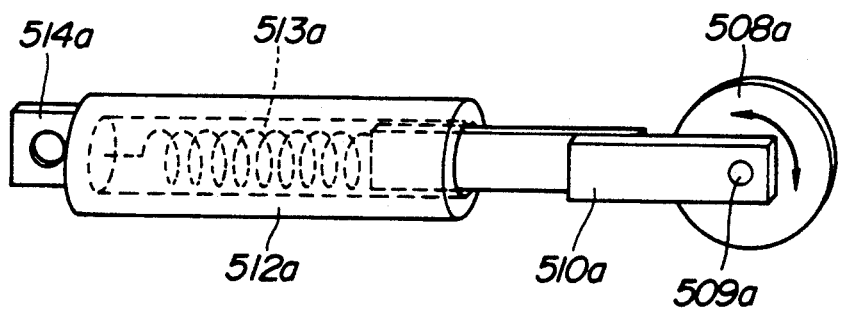
FIG. 32 is a perspective view showing a mechanical constitution of the detecting portion 502.

Next, description will be given with respect to respective constitutions of the detecting sections 502, 503 and 504. The detecting section 502 is constructed as shown in FIG. 31. In FIG. 31, 507*a* designates a mounting member such as a supporter made of flexible fiber materials, and this mounting member 507*a* has a shape which is fitted for the right elbow. A thin type potentiometer 508*a* is mounted at a predetermined portion of the mounting member 507*a* covering the joint of the player's right elbow. A lever 510*a* is fixed at a shaft 509*a* of the potentiometer 508*a*, and the tip end portion of the lever 510*a* can be freely put out and put in a cylinder 512*a* as shown in FIG. 32. Within the cylinder 512*a*, a spring 513*a* for pulling the lever 510*a* is provided. In addition, a fixing portion 514*a* is formed at an edge portion of the cylinder 512*a*, and this fixing portion 514*a* is mounted at the center of the arm portion of the mounting member 507*a*. When the above-mentioned mounting member 507*a* is worn at the player's right elbow as shown in FIG. 31 and the player stretches and bends his right elbow, the lever 510*a* and the cylinder 512*a* are vibrated in response to the stretching and bending movement of the player's right elbow so that the shaft 509*a* is revolved. As a result, a detection signal (a voltage signal) corresponding to the revolving angle of the shaft 509*a* (i.e., the bending angle of the player's right elbow) is generated in the potentiometer 508*a*, and such detection signal is supplied to the control unit 501 via a cable 515*a*. On the other hand, the detecting section 503 is constructed by elements 507*b* to 515*b* which are similar to the elements 507*a* to 515*a* of the detecting section 502, hence, the detailed description of the construction of the detecting section 503 will be omitted.

Figure 33:
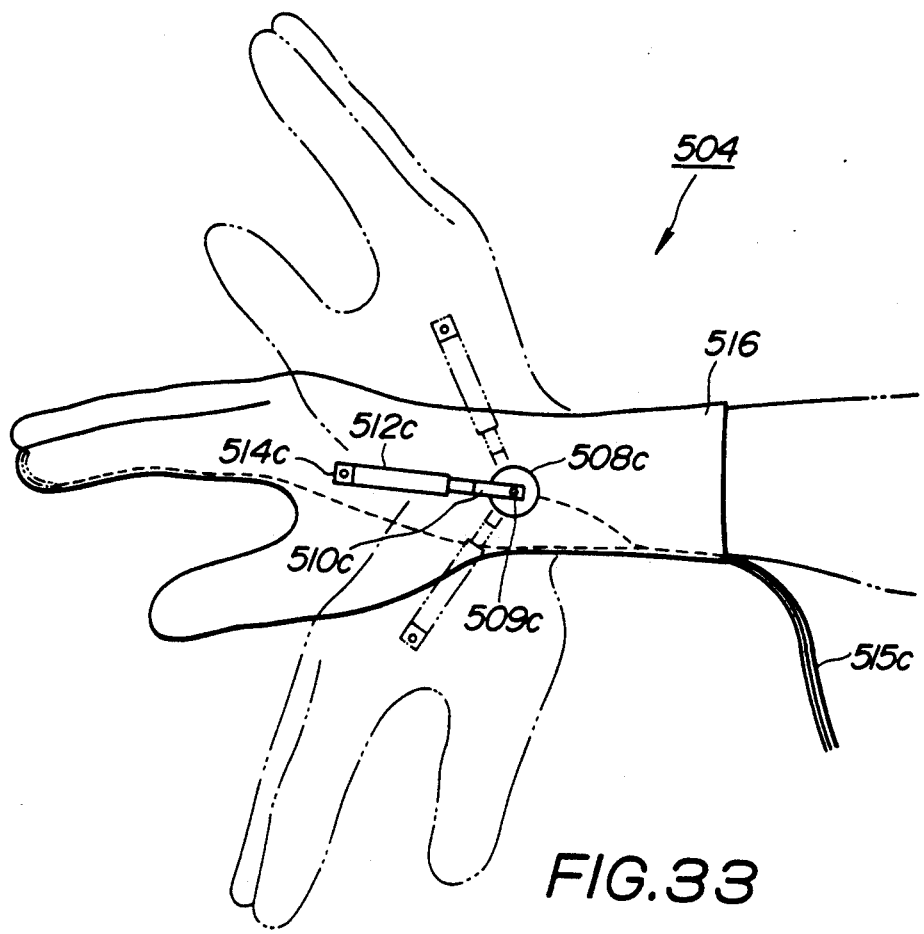
FIG. 33 is a perspective view showing a detecting portion 504 for a right hand of the player.
Figure 34:
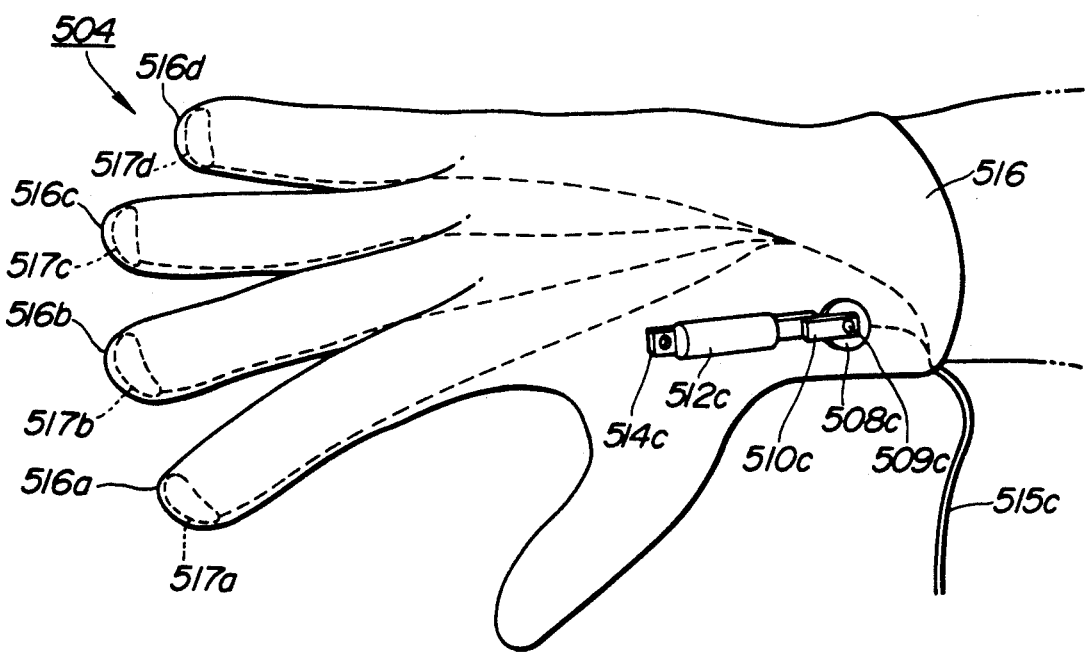
FIG. 34 is a perspective view showing an internal constitution of the detecting portion 504.
Figure 35A:
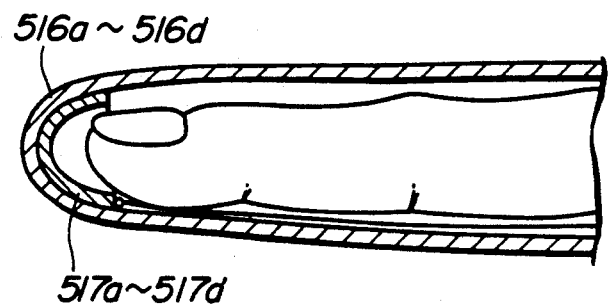
FIGS. 35A and 35B are sectional views respectively showing the internal constitution of the detecting portion 504.
Figure 35B:
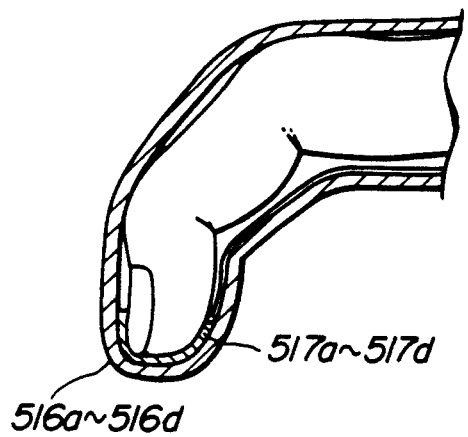

Next, description will be given with respect to the construction of the detecting section 504 in conjunction with FIGS. 33 and 34. In FIGS. 33 and 34, 516 designates a glove made of flexible fiber materials, and a potentiometer 508*c* is mounted at a portion of the glove 516 covering the joint of the player's right hand. Similar to the detecting section 502, a lever 510*c* is fixed at the edge portion of the shaft 509*c* of the potentiometer 508*c*, and the lever 510*c* can be freely put out and in a cylinder 512*c*. In addition, a fixing portion 514*c* is formed at an edge portion of the cylinder 512*c*, and the fixing portion 514*c* is attached at the base of fingers of the glove 516. When the player wears the glove 516 mounted with the detecting section 504 as shown in FIG. 33 and the player bends his right hand up and down, the shaft 509*c* will be revolved and the potentiometer 508*c* generates a detection signal (a voltage signal), the value of which corresponds to a bending angle of the player's right hand. Such detection signal is supplied to the control unit 501 via a cable 515*c*. Meanwhile, pressure sensitive elements 517*a* to 517*d* are provided in the inside of the finger tip portions 516*a* to 516*d* of the glove 516. Each of these pressure sensitive elements 517*a* to 517*d* has a specific resistance which varies in response to the pressure given by each finger of the player's right hand. As shown in FIG. 35A, there is provided a small space in each of the finger tip portions 516a to 516d of the glove 516 when the player stretches his fingers of his right hand, hence, the pressure is not given to each of the pressure sensitive elements 517a to 517d at this state. On the contrary, when the player bends his fingers of his right hand as shown in FIG. 35B, the pressure in response to the bending angle of each finger tip must be worked on each of the pressure sensitive elements 517a to 517d, the specific resistance of which will be varied. Thus, each pressure sensitive element generates the detection signal having a value corresponding to the bending angle of each finger tip, and such detection signal will be supplied to the control unit 501 via the cable 515c. Incidentally, it is possible to use a piezoelectric element for generating a voltage corresponding to the given pressure thereof as the pressure sensitive element.

Next, 520 shown in FIG. 30 designates an analog multiplexer having seven channels. Such analog multiplexer 520 selects one of the detection signals from the potentiometers 508a to 508c and the detection signals from the pressure sensitive elements 517a to 517d based on a channel select signal CS which is supplied to a select terminal of the analog multiplexer 520. Then the analog multiplexer 520 supplies the selected detection signal to an A/D converter 521 wherein the selected detection signal is converted into digital detection data of predetermined bits. In addition, 522 designates a CPU, 523 designates a ROM for storing programs used in the CPU 522, and 524 designates a RAM which is used as a work area. The CPU 522 generates the channel select signal CS, the value of which is sequentially varied. Such channel select signal CS is supplied to the analog multiplexer 520, whereby the analog multiplexer 520 scans the output signals of the potentiometers 508a to 508c and the pressure sensitive elements 517a to 517d with a relatively high speed. Hence, the CPU 522 judges the bending angles of the player's right elbow and the player's left elbow in accordance with predetermined four angles based on the detection data outputted from the A/D converter 521. Then, the CPU 522 generates key code data KC in response to a combination of the bending angles of the player's right elbow and the player's left elbow based on the above judging result. In addition, the CPU 522 judges the bending angle of the player's right hand in accordance with predetermined three angles based on the detection data corresponding to the detection signal from the potentiometer 508c. More specifically, the CPU 522 generates the tone volume data VOL representative of the tone volume (which can be classified by large, medium and small tone volumes) in response to the bending angle of the player's right hand. Furthermore, the CPU 522 judges whether each of an index finger, a middle finger, a third finger and a little finger of the player's right hand is bent or not based on the detection data corresponding to the detection signals from the pressure sensitive elements 517a to 517d. Based on this judging result, the CPU 522 generates tone color select data TD for selecting a tone color (such as a tone color of the piano, the organ, a flute, a saxophone, a clarinet or the like) in response to a combination of bent fingers.

The CPU 522 supplies the above-mentioned key code data KC, the volume data VOL and the tone color select data TD (i.e., the musical tone control data) to a musical tone signal generating circuit 526. Hence, the musical tone signal generating circuit 526 generates a musical tone signal having a tone pitch corresponding to the key code data KC, a tone volume corresponding to the tone volume data VOL and a tone color corresponding to the tone color select data TD. Thus, a speaker 527 generates a musical tone corresponding to a musical tone signal generated in the musical tone signal generating circuit. Meanwhile, a transmitter circuit 528 transmits the musical tone signal outputted from the musical tone signal generating circuit 526 by wireless.

According to the above-mentioned second embodiment, it is possible to vary the tone pitch of the musical tone generated from the speaker 527 of the control unit 501 in response to the combination of the bending angles of the joints of the player's right and left elbows. In addition, it is possible to vary the tone volume of the musical tone by the three predetermined tone volumes in response to the bending angle of the joint of the player's right wrist. Furthermore, it is possible to vary the tone color of the musical tone in response to the combination of the bending fingers within the index finger, the middle finger, the third finger and the little finger of the player's right hand.

Figure 36:
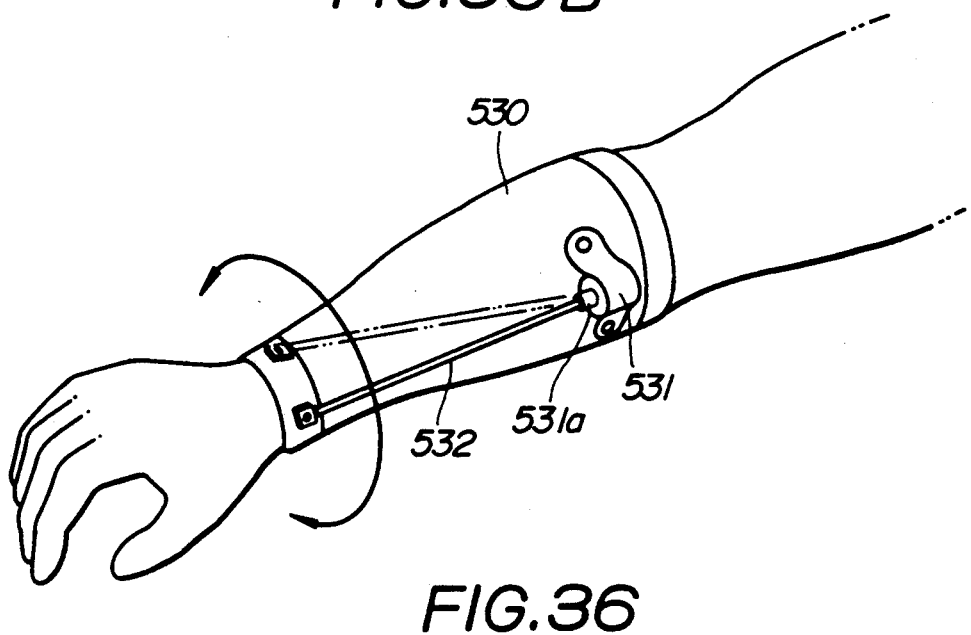
FIG. 36 is a perspective view showing a partial view of a first modified embodiment of the second embodiment shown in FIG. 29.

In the second embodiment, the tone pitch and the like are controlled based on the detection result of the potentiometer 508a to 508c which detect the bending angles of the joints of the player's elbows and the player's wrist. As shown in FIG. 36, it is possible to modify the second embodiment such that a potentiometer 531 is mounted at the inside of a mounting member 530 such as a supporter covering the player's arm; a certain bending is given to a shaft 531a of the potentiometer 531; an edge portion of the shaft 531a is fixed at an edge portion of a rod 532 made of plastics having a small twist characteristic; another edge portion of the rod 532 is attached to the inside of wrist portion of the mounting member 530. Thus, a twist angle of the player's arm (or a revolving angle of the player's wrist) is detected, whereby the tone pitch, the tone color and the tone volume are controlled based on such detecting result.

(1) First Modified Embodiment of Second Embodiment

Next, description will be given with respect to a first modified embodiment of the second embodiment in conjunction with FIG. 37.

Figure 37:
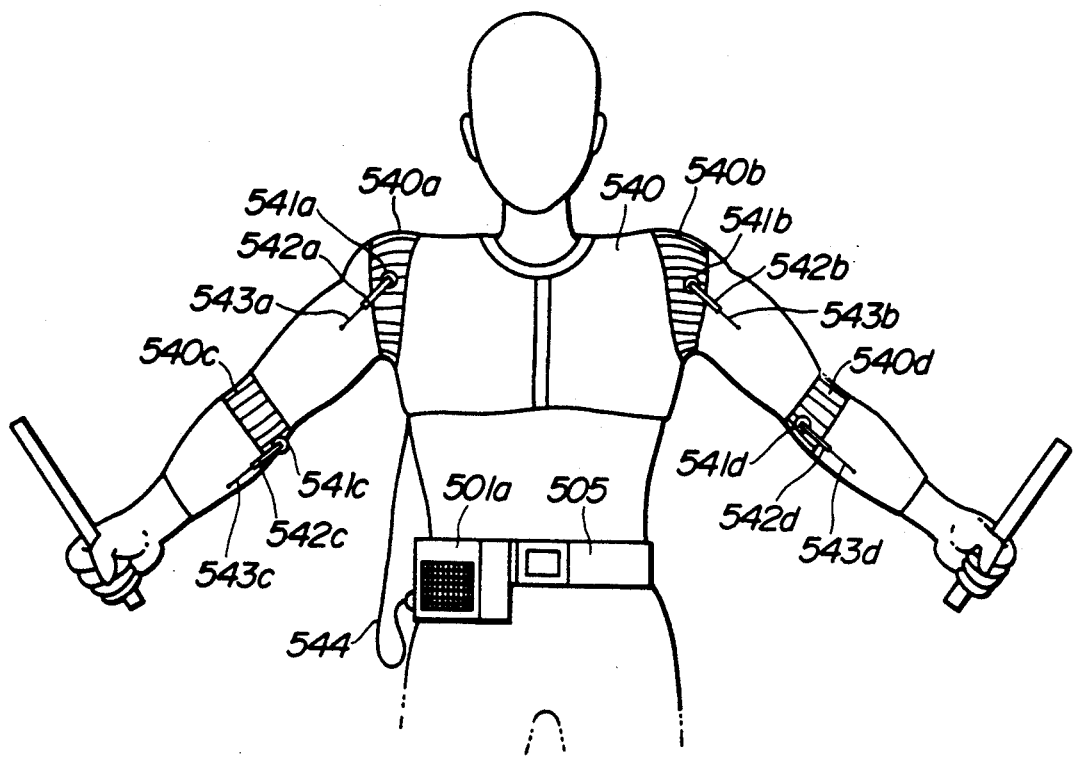
FIG. 37 shows an appearance of the player who is mounted with the first modified embodiment.

In FIG. 37, 540 designates a mounting wear covering the breast, shoulders and elbows of the upper half of the layer's body. Similar to the ordinary wear, this mounting wear 540 can be taken off. In such mounting wear 540, shoulder portions 540a and 540b, and elbow portions 540c and 540d are made of flexible fiber materials. In addition, thin type absolute rotary encoders 541a to 541d are mounted respectively at the shoulder portions 540a and 540b, and the elbow portions 540c and 540d. These rotary encoders 541a to 541d have respective shafts, the edge portions of which are fixed to levers 542a to 542d. The edge portions of the levers 542a to 542d are mounted to a mounting member 540 via respective absorber members 543a to 543d made of flexible materials such as a rubber and the like. When the player revolves his right or left arm in his body direction, the rotary encoder 541a detects the revolving angle at the joint of the player's right shoulder, and the rotary encoder 541b detects the revolving angle of the joint of the player's left shoulder. In addition, when the player bends his right or left elbow, the rotary encoder 541c detects the bending angle of the joint of the player's right elbow, and the rotary encoder 541d detects the bending angle of the joint of the player's left elbow. These rotary encoders 541a to 541d generate angle detecting signals based on the detecting results thereof, and these angle detecting signals are supplied to the control unit 501a mounted at the player's waist by the belt 505 via a cable 544. Similar to the control unit 501 shown in FIG. 30, the control unit 501a comprises the CPU 522, the ROM 523, the RAM 524, the bus line 525, the musical tone signal generating circuit 526, the speaker 527, the transmitter circuit 527 further comprises registers for once storing the angle detecting signals outputted from the rotary encoders 541a to 541d.

According to the above first modified embodiment, the CPU 522 sequentially reads the angle detecting signals stored in the above registers so as to generate tempo data representing the performance speed of the generated musical tones. Such tempo data are supplied to the musical tone signal generating circuit 526 via the bus line 525. Hence, the musical tone signal generating circuit 526 generates the musical tone signal (for generating a percussive tone such as the drum tone, the cymbal tone and the like) having the performance speed corresponding to the tempo data and also having the predetermined rhythm pattern. In this case, the CPU 522 judges the revolving angles of the joints of the player's shoulders in accordance with predetermined five angles, and the performance speed can be raised approximately to $= 90$ based on the judging result of the CPU 522. In addition, the CPU 522 judges the bending angles of the joints of the player's elbows in accordance with predetermined four an and the performance speed can be raised approximately to $= 150$ to $180$ based on the judging results of the CPU 522.

According to the above first modified embodiment, the performance speed of the percussive tone generated from the speaker 527 can be freely varied in response to the revolving angles of the joints of the player's shoulders and the bending angles of the joints of the player's elbows. Similar to the second embodiment described before, this first modified embodiment can be constituted such that the key code data KC, the tone volume data VOL and the tone color select data TD can be generated based on the angle detecting data obtained by the rotary encoders 541a to 541d, and the tone pitch, the tone volume and the tone color can be controlled based on these respective data.

(2) Second Modified Embodiment

Figure 38:
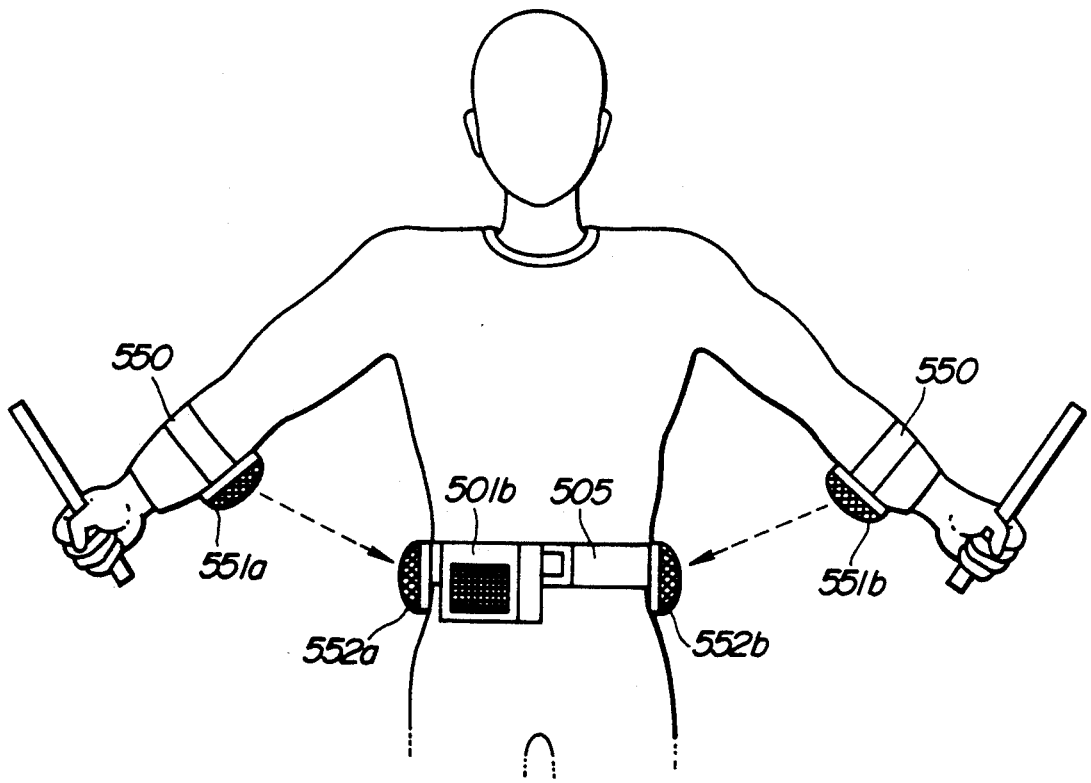
FIG. 38 shows an appearance of the player who is mounted with a second modified embodiment of the second embodiment shown in FIG. 29.
Figures 39A, 39B, 39C:
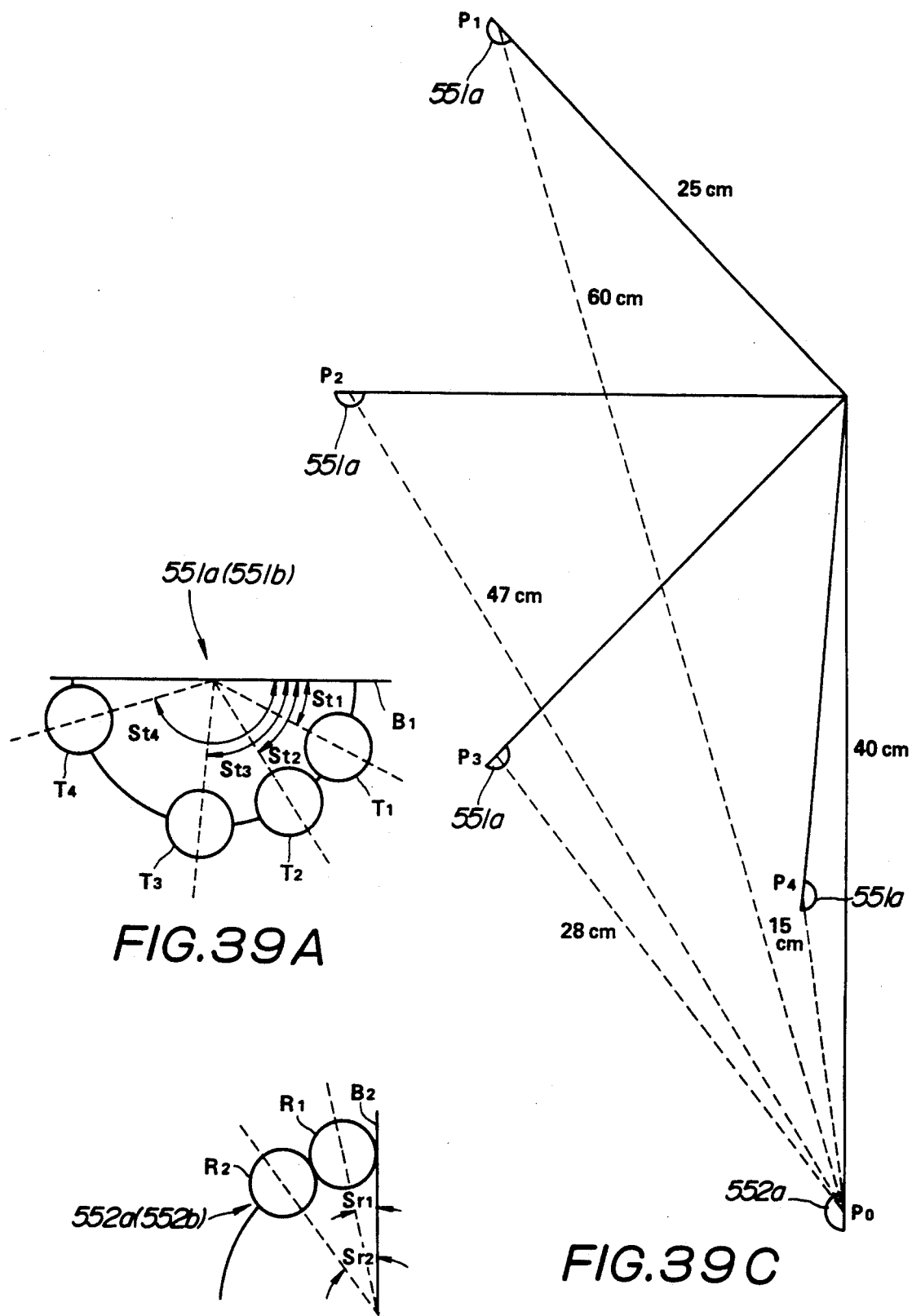
FIGS. 39A to 39C show drawings for explaining an example of an arrangement of piezoelectric elements provided within the ultrasonic transmitter and the ultrasonic receiver.

Next, description will be given with respect to a second modified embodiment of the second embodiment. As shown in FIG. 38, the apparatus according to the second modified embodiment comprises ultrasonic transmitters 551a and 551b, ultrasonic receivers 552a and 552b, and a control unit 501b. Theses ultrasonic transmitters 551a and 551b are respectively mounted to insides of the player's right and left arms by a mounting member 550 such as a supporter, and the ultrasonic receivers 552a and 552b are mounted at the player's waste by the belt 505. In addition, these transmitters 551a and 551b and receivers 552a and 552b are constructed by the piezoelectric elements such as barium titanate vibrators. When the high frequency voltage is supplied to the transmitters 551a and 551b, the transmitters 551a and 551b generate the ultrasonic waves. When the receivers 552a and 552b receives the ultrasonic waves, the receivers 552a and 552b generate the high frequency voltages. As shown in FIG. 39A, each of the transmitters 551a and 551b is constructed by four transmitting piezoelectric elements $T_1$ to $T_4$ which are arranged by respective angles $St_1$ to $St_4$ with respect to a base plane $B_1$. On the other hand, as shown in FIG. 39B, each of the receivers 552a and 552b is constructed by two receiving piezoelectric elements $R_1$ and $R_2$ which are arranged by respective angles $Sr_1$ and $Sr_2$ with respect to a base plane $B_2$.

Thus, as shown in FIG. 39C, a position of the transmitter 551a is changed as shown by positions $P_1$, $P_2$, $P_3$ and $P_4$ with respect to a position $P_0$ of the receiver 552a which is mounted at the player's waist while the player swings down his right arm. In this case, the ultrasonic wave transmitted from the transmitter 551a must be reached at the receiver 552a, regardless of a relative position relation between the transmitter 551a and the receiver 552a. For example, in the case where a distance between the player's right shoulder and the transmitter 551a is set to 25 cm and a distance between the player's right shoulder and the receiver 552a is set to 40 cm, the angle $St_1$ to $St_4$ and $Sr_1$ and $Sr_2$ must be set as $St_1 = 28$ degrees, $St_2 = 58$ degrees, $St_3 = 97$ degrees, $St_4 = 165$ degrees, $Sr_1 = 13$ degrees and $Sr_2 = 38$ degrees. In this case, a distance between the positions $P_0$ and $P_1$ is equal to 60 cm, a distance between the positions $P_0$ and $P_2$ is equal to 47 cm, a distance between the positions $P_0$ and $P_3$ is equal to 28 cm, and a distance between the positions $P_0$ and $P_4$ is equal to 15 cm.

Figure 40:
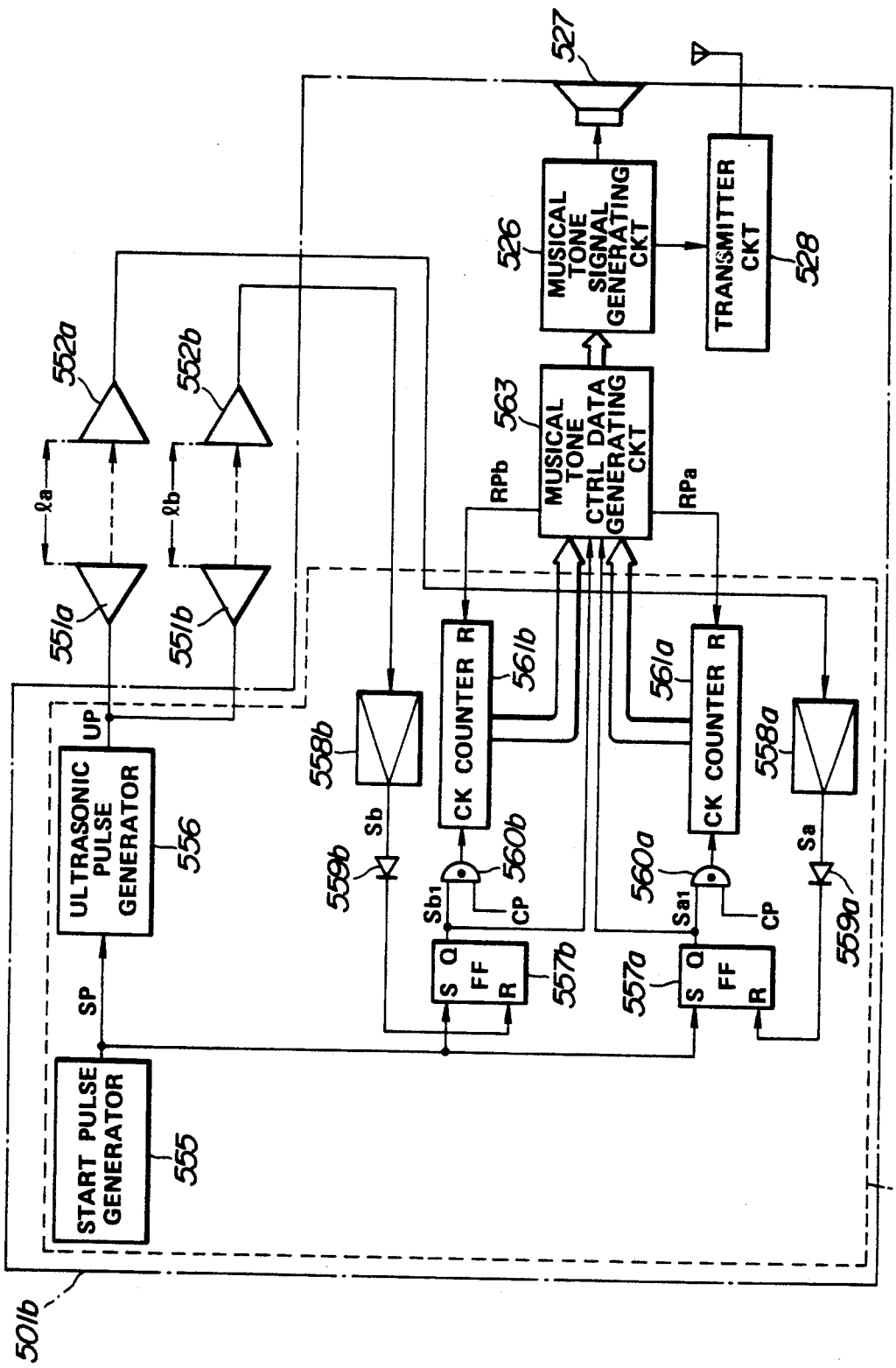
FIG. 40 is a block diagram showing an electric constitution of the second modified embodiment of the second embodiment.

Next, description will be given with respect to an electric constitution of the apparatus according to the second modified embodiment in conjunction with FIG. 40. In FIG. 40, a start pulse generator 555 generates a start pulse SP having a constant cycle. Such start pulse SP is supplied to an input terminal of an ultrasonic pulse generator 556, and set input terminals S of R-S flip-flops 557a and 557b. The above start pulse SP triggers the ultrasonic pulse generator 556 so that the ultrasonic pulse generator 556 outputs an ultrasonic pulse UP to the transmitters 551a and 551b. Thus, the transmitters 551a and 551b transmit respective ultrasonic waves each having a constant cycle to the receivers 552a and 552b wherein the high frequency voltages are generated. The receiver 552a outputs the high frequency voltage to an amplifier 558a wherein the high frequency voltage is amplified, and an amplified signal $S_a$ is rectified in a diode 559a and then supplied to a reset input terminal R of a R-S flip-flop 557a. Hence, the R-S flip-flop 557a is set by the start pulse SP and reset by an output signal of the diode 559a. Therefore, the R-S flip-flop 557a outputs an output signal $S_{a1}$ from an output terminal Q thereof, and such output signal $S_{a1}$ has a pulse width the value of which corresponds to a distance la between the transmitter 551a and the receiver 552a. This output signal $S_{a1}$ is supplied to one input terminal of an AND gate 560a, whereby the AND gate 560a is subject to an open state so that a clock pulse CP is supplied to a clock input terminal CK of a counter 561a via the AND gate 560a in a pulse width period of the signal $S_{a1}$. Hence, the counter 561a counts up the clock pulse CP so as to output the count value thereof. Such count value corresponds to the distance 1a between the transmitter 551a and the receiver 552a. In other words, such count value corresponds to the revolving angle of the player's right arm which is swung down to his body.

On the other hand, the high frequency voltage outputted from the receiver 552b is amplified in an amplifier 558b, and an amplified signal S_b is rectified in a diode 559b and then supplied to a reset input terminal R of a R-S flip-flop 557b. Similar to the R-S flip-flop 557a, the R-S flip-flop 557b is set by the start pulse SP and reset by an output signal of the diode 559b. Therefore, the R-S flip-flop 557b outputs an output signal $S_{b1}$ from an output terminal Q thereof, and such output signal $S_{b1}$ has a pulse width the value of which corresponds to a distance lb between the transmitter 551b and the receiver 552b. This signal $S_{b1}$ is supplied to one input terminal of an AND gate 560b, whereby the AND gate 560b is subject to the open state so that the clock pulse CP is supplied to a clock input terminal CK of a counter 561b via the AND gate 560b in a pulse width period of the signal $S_{b1}$. The counter 561b counts up the clock pulse CP so as to output a count value thereof. Such count value corresponds to the distance lb between the transmitter 551b and the receiver 552b. In other words, such count value corresponds to the revolving angle of the player's left arm which is swung down to his body.

An ultrasonic measuring circuit 570 is constituted as described heretofore. The above-mentioned count values of the counters 561a and 561b are supplied to a musical tone control data generating circuit 563. The count value of the counter 561a is inputted into the musical tone control data generating circuit 563 at a trailing edge timing of the signal $S_{a1}$ (i.e., a timing when the R-S flip-flop 557a is reset). Slightly thereafter, the musical tone control data generating circuit 563 supplies a reset pulse RPa to a reset input terminal R of the counter 561a so that the counter 561a is reset. Similarly, the count value of the counter 561b is inputted into the musical tone control data generating circuit 563 at a trailing edge timing of the signal $S_{b1}$ (i.e., a timing when the R-S flip-flop 557b is reset). Slightly thereafter, the musical tone control data generating circuit 563 supplies a reset pulse RPb to a reset input terminal R of the counter 561b so that the counter 561b is reset.

Next, the musical tone control data generating circuit 563 generates and outputs musical tone control data (i.e., the data KC, VOL and TD described before) to the musical tone signal generating circuit 526. Thus, the musical tone signal generating circuit 526 generates the musical tone signal whose tone pitch, tone color and tone volume (or a performance speed) are varied based on the value of the musical tone control data. Such musical tone signal is outputted to the speaker 527. Hence, the speaker 527 generates a musical tone corresponding to the revolving angles of the player's right and left arms which are swung down to his body.

According to the second modified embodiment described above, it is possible to detect the revolving angle of the player's right arm which is swung to his body based on a period for transmitting the ultrasonic wave between the transmitter 551a mounted at his right arm and the receiver 552a mounted at his right waste. In addition, it is possible to detect the revolving angle of the player's left arm which is swung down to his body based on a period for transmitting the ultrasonic wave between the transmitter 551b mounted at his left arm and the receiver 552b mounted at his left waist. Thus, it is possible to generate the musical tone corresponding to the revolving angles of the player's right and left arms.

Incidentally, it is possible to further modify the second modified embodiment such that the tone pitch, the tone color and the tone volume of the musical tone or the performance speed are varied in response to the revolving angles of the player's right and left arms. In addition, it is possible to vary the performance speed in response to the bending angles of the player's elbows and it is also possible to vary the tone pitch of the musical tone in response to the bending angles of the player's fingers in the second modified embodiment. As described heretofore, it is possible to combine the second modified embodiment and other embodiments described before so as to realize a flexible musical tone control system.

(C) THIRD EMBODIMENT

Figure 41:
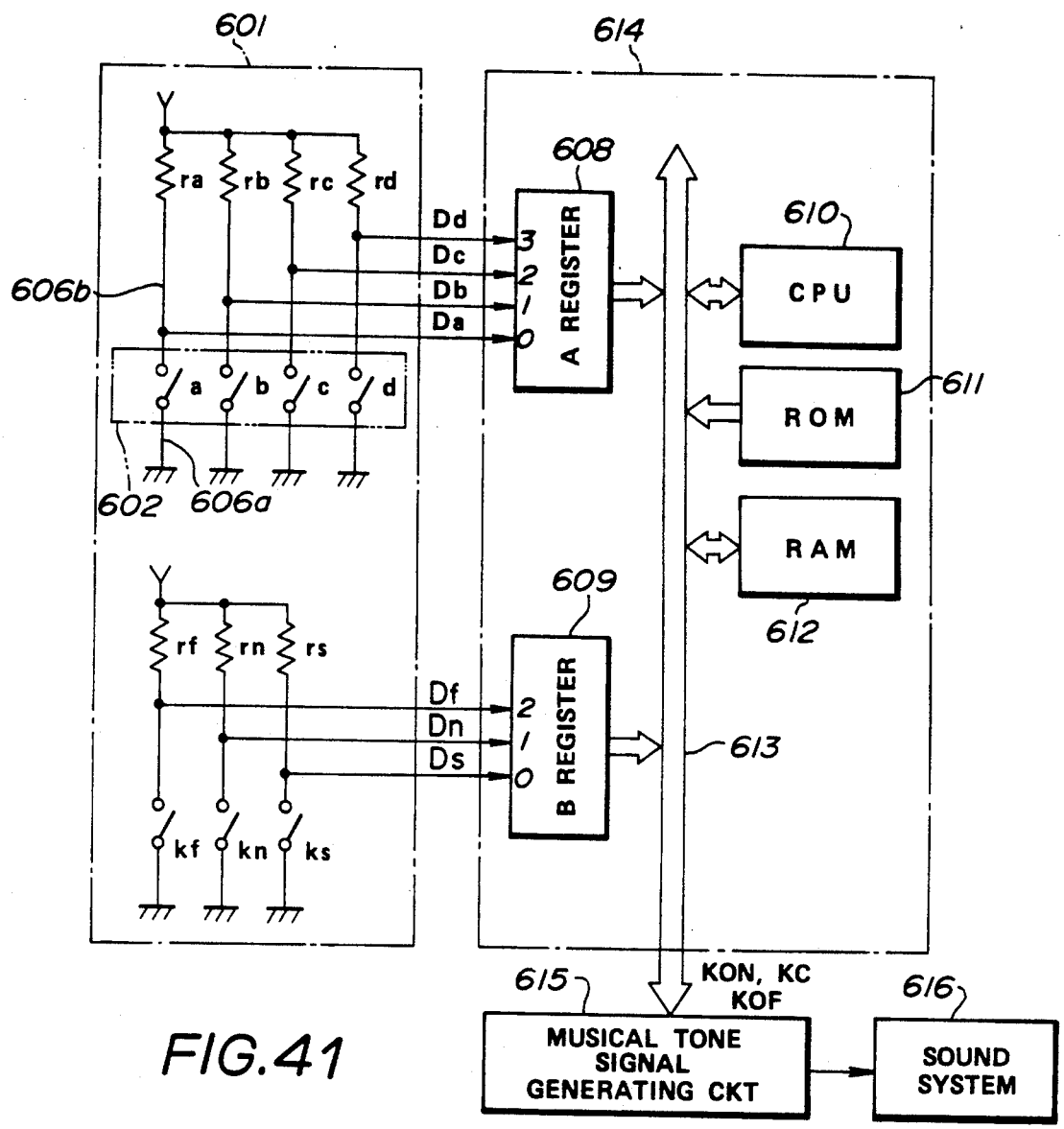
FIG. 41 is a block diagram showing a third embodiment of the present invention.
Figure 42:
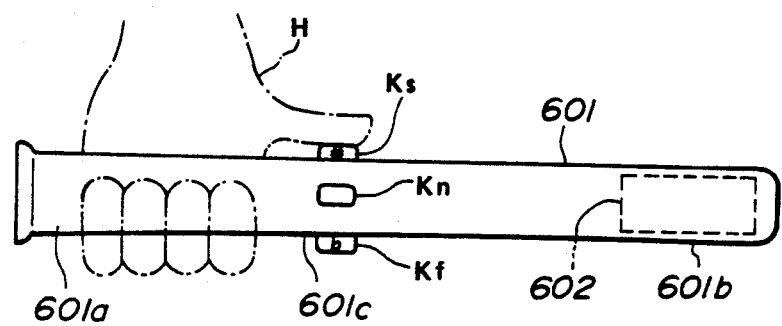
FIG. 42 shows an appearance of a stick 601 used in the third embodiment.

FIG. 41 is a block diagram showing a third embodiment of the musical tone control apparatus according to the present invention, and FIG. 42 shows an appearance of a stick 601 used in this third embodiment.

First, description will be given with respect to the constitution of the stick 601. As shown in FIG. 42, a base portion of the stick 601 has a shape which can be held by the player's hand H, and an angle detector 602 is provided in the inside of a tip edge portion 601b of the stick 601. In addition, a # (sharp) key-on switch Ks, a key-on switch Kn and a b (flat) key-on switch Kf are mounted on a center portion 601c of the stick 601. These switches Ks, Kn and Kf can be depressed by a thumb or an index finger of the player's hand H which holds the base portion 601a.

As shown in FIG. 43, the angle detector 602 is constituted by a supporting plate 603 and four detecting switches a to d attached to the supporting plate 603. These detecting switches a to d are arranged by respective angles of 22.5 degrees, 67.5 degrees, 112.5 degrees and 157.5 degrees with respect to a reference line L. As shown in FIG. 44, each of the detecting switches a to d is constructed by a glass tube 604, mercury fluid 605 and a pair of electrodes 606a and 606b. The glass tube 604 is closely packed and enclosed by a certain volume of the mercury fluid 605, and the electrodes 606a and 606b are inserted through an edge wall of the glass tube 604. In a state as shown in FIG. 44, the electrode 606a is not connected to the electrode 606b, hence, this detecting switch is turned off. When the edge portion of the glass tube 604 inserted by the electrodes 606a and 606b is inclined downward in a direction as shown by an arrow in FIG. 44, the electrode 606a will be connected to the electrode 606b via the mercury fluid 605 so that this detecting switch will be turned on. In the case where the angle detector 602 shown in FIG. 43 is revolved around the reference point 0, the on/off states of the detecting switches a to d becomes as shown by FIG. 45. More specifically, all of the detecting switches a to d are turned off in the state shown in FIG. 43. When the angle detector 602 revolves around the reference point 0 in a direction Y (i.e., in a counter-clockwise direction) by 45 degrees, only the detecting switch a is turned on. By further revolving the angle detector 602 by 45 degrees, the detecting switches a and b are turned on. Hence, as the revolving angle of the angle detector 602 advances by every 45 degrees, the detecting switches which are turned on are identified as the detecting switches a, b and c; the detecting switches a, b, c and d; the detecting switches b, c and d; the detecting switches c and d; the detecting switch d.

Next, description will be given with respect to an electric constitution of the apparatus shown in FIG. 41. In FIG. 41, the electrode 606a of each of the detecting switches a to d mounted in the stick 601 is grounded, and the electrodes 606b of the detecting switches a to d are respectively connected to one terminals of pull-up resistors ra to rd and also connected to 0-bit to 3-bit of an A register 608. Thus, these 0-bit to 3-bit of the A register 608 store respective detection data Da to Dd corresponding to on/off states of the detecting switches a to d. Meanwhile, one terminals of the # key-on switch Ks, the key-on switch Kn and the b key-on switch Kf mounted on the stick 601 are grounded, and other terminals thereof are connected to respective one terminals of pull-up resistors rs, rn and rf and also connected to a B register 609 of three bits. Hence, 0-bit to 2-bit of the B register 609 store respective operation data Ds, Dn and Df corresponding to on/off states of the key-on switches Ks, Kn and Kf. In this case, each value of the above detection data Da to Dd and the operation data Ds, Dn and Df becomes identical to "0" when each of the detecting switches a to d and the key-on switches Ks, Kn and Kf is turned on. On the other hand, each value of such data becomes identical to "1" when each of such switches is turned off.

Meanwhile, a musical tone control circuit 614 is constituted by the registers 608 and 609, a CPU 610, a ROM 611 for storing predetermined programs used in the CPU 610, a RAM 612 used as a work area and a bus line 613. By executing processes which will be described later, the CPU 610 generates key code data KC, a key-on signal KON and a key-off signal KOF based on the detecting data Da to Dd stored in the A register 608 and based on the operation data Ds, Dn and Df stored in the B register 609. Such key code data KC, key-on signal KON and key-off signal KOF are supplied to a musical tone signal generating circuit 615 via the bus line 613.

Based on the above key code data KC, the key-on signal KON and the key-off signal KOF, the musical tone signal generating circuit 615 generates a musical tone signal. More specifically, the musical tone signal generating circuit 615 generates the musical tone signal having the tone pitch corresponding to the value of the key code data KC and the predetermined tone color. This musical tone signal is supplied to a sound system 616 wherein a musical tone corresponding to the musical tone signal is generated.

Figure 47:
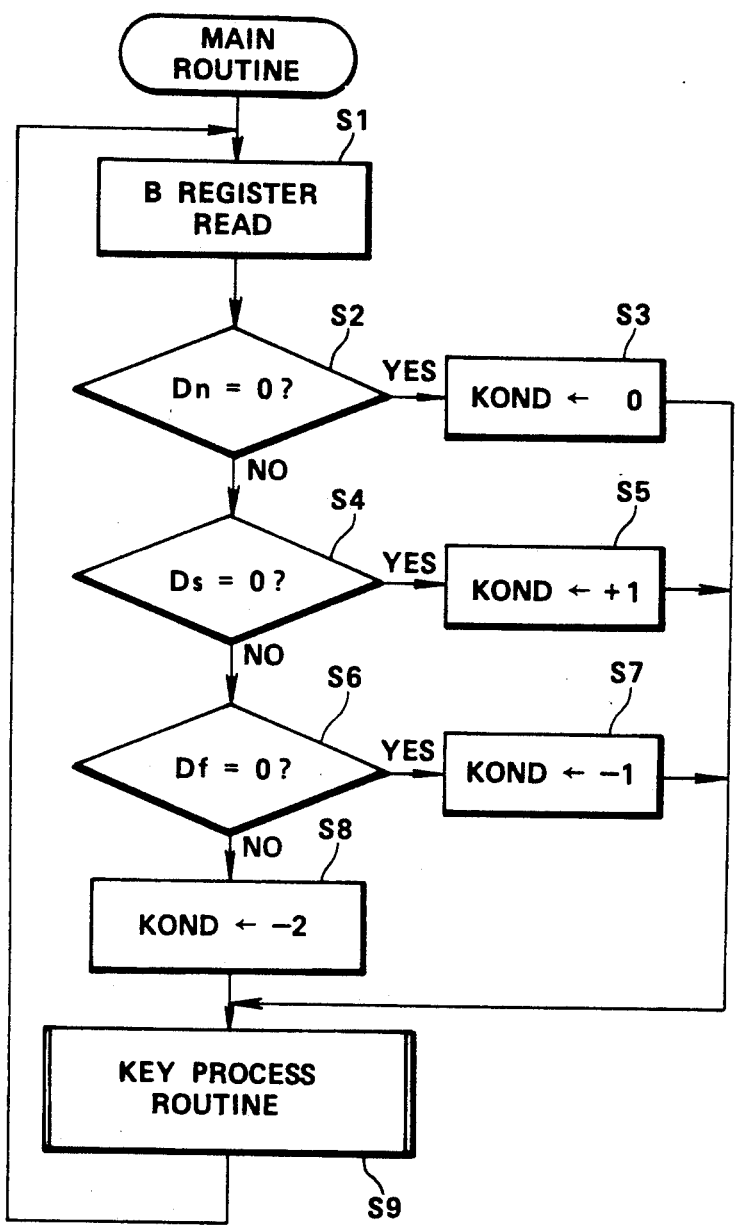
FIGS. 47 and 48 are flowcharts showing operations of a CPU 610 used in the third embodiment.

Next, description will be given with respect to operations of the above-mentioned third embodiment by use of flowcharts shown in FIGS. 47 and 48. FIG. 47 shows a flowchart of a main routine which will be repeatedly performed by the CPU 610 in a normal mode.

In FIG. 47, the CPU 610 reads the operation data Ds, Dn and Df stored in the B register 609 in a step S1. Next, the CPU 610 judges whether the key-on switch Kn is depressed or not based on the operation data Dn in a step S2. In this case, the CPU 610 judges that the key-on switch Kn is depressed when the value of the operation data Dn is equal to "0", and the process advances to a next step S3. On the other hand, the CPU 610 judges that the key-on switch Kn is not depressed when the value of the operation data Dn is equal to "1", and the process advances to a next step S4. In this step S4, the CPU 610 judges whether the # key-on switch Ks is depressed or not based on the operation data Ds. In this case, the CPU 610 judges that the # key-on switch Ks is depressed when the value of the operation data Ds is equal to "0", and the process advances to a next step S5. On the other hand, the CPU 610 judges that the # key-on switch is not depressed when the value of the operation data Ds is equal to "1", and the process advances to a next step S6. In this step S6, the CPU 610 judges whether the b key-on switch Kf is depressed or not based on the operation data Df. In this case, the CPU 610 judges that the b key-on switch Kf is depressed when the value of the operation data Df is equal to "0", and the process advances to a next step S7. On the other hand, the CPU 610 judges that the b key-on switch Kf is not depressed when the value of the operation data Df is equal to "1", and the process advances to a next step S8. In this step S8, a value of key-on data KOND stored in a predetermined area of the RAM 612 is set equal to "−2", and then the process advances to a next step S9. In addition, the value of the key-on data KOND is set equal to "0", "+1" or "−1" in the step S3, S5 or S7 independently, and the process advances to the step S9. This step S9 represents a key processing routine which will be described later. After the process in the step S9 is executed, the process returns to the step S1 again.

Next, description will be given with respect to the key processing routine in conjunction with FIG. 48.

Figure 48:
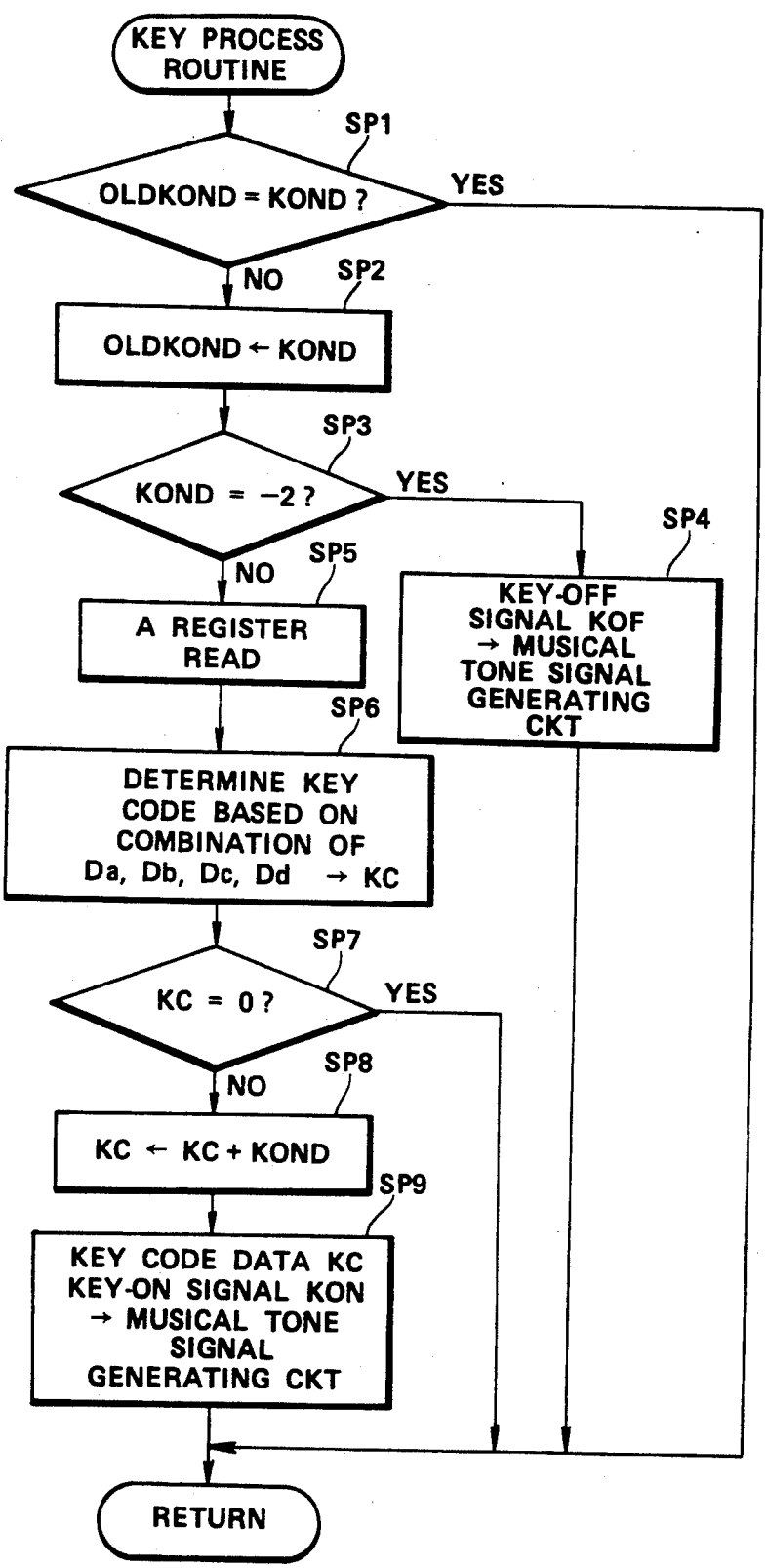

In FIG. 48, the CPU 610 judges whether old key-on data OLDKOND pre-stored in the predetermined area of the RAM 612 coincide with new key-on data KOND or not in step SP1. When the old key-on data OLDKOND coincide with the new key-on data KOND, the process returns to the main routine. On the other hand, when the old key-on data OLDKOND do not coincide with the key-on data KOND, the process advances to a next step SP2. In this step SP2, the old key-on data OLDKOND pre-stored in the RAM 612 are re-written by the new key-on data KOND. In step SP3, the CPU 610 judges whether the value of the key-on data KOND equals to "−2" or not. When the value of the key-on data KOND equals to "−2", the process advances to a step SP4. When the value of the key-on data KOND does not equal to "−2", the process advances to a step SP5. In this step SP5, the CPU 610 reads the detecting data Da to Dd stored in the A register 608. In a next step SP6, the CPU 610 determines the value of the key code data KC based on a combination of the detecting data Da, Db, Dc and Dd. In this case, FIG. 46 represents relations between the value of the key code data KC and the combination of the detecting data Da, Db, Dc and Dd. For example, when the position of the angle detector 602 is set as shown in FIG. 43, all of the detecting switches a to d are turned off so that all values of the detecting data Da to Dd become identical to "1". In this case, the value of the key code data KC is set equal to "60" which corresponds to a predetermined tone pitch $C_3$.

Next, the CPU 610 judges whether the value of the key code data KC is equal to "0" or not in a step SP7. When the value of the key code data KC equals to "0", the process returns to the main routine. When the value of the key code data KC does not equal to "0", the process advances to a next step SP8. In this step SP8, the key code data KC are added with the key-on data KOND so as to obtain an addition result, and such addition result is set identical to the new key code data KC. In the case where the # key-on switch Ks is depressed, the value of the key-on data KOND is set identical to "+1" in the step S5 within the main routine described before. Thus, the value of the old key code data $KC_{OLD}$ is added with the value "1" in the step SP8 so that the old key code data $KC_{OLD}$ are converted into new key code data KC having a tone pitch which is higher than that of the old key code data $KC_{OLD}$ by a chromatic semi-tone. In other words, the old key code data $KC_{OLD}$ (having the value "60") corresponding to the tone pitch $C_3$ are converted into the new key code data KC (having the value "61") corresponding to a tone pitch $C\#_3$, for example.

On the contrary, when the b key-on switch Kf is depressed, the value of the key-on data KOND is set equal to "$-1$" in the step S7 within the main routine. Thus, the value "1" is subtracted from the value of the old key code data $KC_{OLD}$ in the step S8 so that the old key code data $KC_{OLD}$ are converted into the new key code data KC having a tone pitch which is lower than that of the old key code data $KC_{OLD}$ by the chromatic semi-tone. In other words, the old key code data $KC_{OLD}$ (having the value "60") corresponding to the tone pitch $C_3$ are converted into the new key code data KC (having the value "59") corresponding to a tone pitch $Cb_3$ ($B_2$).

Next, the CPU 610 outputs the new key code data KC the value of which is calculated in the step SP8 in a step SP9, and then the CPU 610 outputs the key-on signal KON. Such data KC and the signal KON are sequentially supplied to the musical tone signal generating circuit 615 via the bus line 613. Thus, the musical tone signal generating circuit 615 starts to generate the musical tone signal, and such musical tone signal is supplied to the sound system 616 wherein the musical tone having the tone pitch corresponding to the key code data KC is generated.

Meanwhile, in the case where all of the switches Kn, Ks and Kf are not depressed, the value of the key-on data KOND is set equal to "$-2$" in the step S8 within the main routine described before. In this case, the CPU 610 judges that the value of the key-on data KOND equals to "$-2$" in the step SP3 within the key processing routine, and the process advances to the next step SP4. In this step SP4, the CPU 610 generates the key-off signal KOF, and this key-off signal KOF is supplied to the musical tone signal generating circuit 615 via the bus line 613. Thus, the musical tone signal generating circuit 615 stops generating the musical tone signal, whereby the sound system 616 stops generating the musical tone. Thereafter, the process of the CPU 610 returns to the main routine again.

As described heretofore, the third embodiment of the present invention performs the operation for generating the musical tone. According to the third embodiment, in the case where the player's hand H holding the stick 601 as shown in FIG. 41 is swung up and down and the key-on switch Kn is depressed by the thumb of the player's hand H, it is possible to generate the musical tone having the tone pitch corresponding to the moving direction of the player's hand H, i.e., corresponding to the movement of the player's arm and body. Similarly, the tone pitch can be raised by the chromatic semi-tone by depressing the # key-on switch Ks, and the tone pitch can be lowered by the chromatic semi-tone by depressing the b key-on switch Kf.

Next, description will be given with respect to the modified embodiment of the third embodiment in conjunction with FIGS. 49A to 49I. This modified embodiment is constituted such that the tone pitch and the tone generating timing can be controlled by using two sticks 601R and 601L each having the same constitution similar to the constitution of the stick 601. This modified embodiment further provides an A register 608a of four bits other than the A register 608 within the musical tone control circuit 614. In this case, the detecting data Da to Dd outputted from the stick 601R are stored in the A register 608, and other detecting data Da to Dd outputted from the stick 601L are stored in the A register 608a. In addition, respective operation data Ds outputted from the sticks 601R and 601L are combined into one operation data Ds under a logical AND operation. Similarly, respective operation data Dn and respective operation data Df outputted from the sticks 601R and 601L are combined into one operation data Dn and one operation data Df under the logical AND operation. Such combined operation data Ds, Dn and Df are stored in the B register 609. Hence, the performance is done by the player M who holds the sticks 601R and 601L in his right and left hands respectively as shown in FIG. 49A.

In the above-mentioned modified embodiment, each of the sticks 601R and 601 provides the key-on switches Ks, Kn and Kf. However, it is possible to constitute such modified embodiment such that one of the sticks 601R and 601L provides the key-on switches Ks, Kn and Kf. In addition, it is also possible to constitute the modified embodiment such that the stick 601R provides the switches Ks and Kf and the stick 601L provides the switch Kn, for example.

In the case where the stick 601L provides the switch Kn and the stick 601R provides the other switches, the tone pitch of the musical tone to be generated is determined by the combination of the respective detecting data Da to Dd outputted from the sticks 601R and 601L. In this case, the performance will be done as shown in FIGS. 49B to 49E, for example. As the player's right arm is rising from a bottom direction after the player's left arm is turned to a position $Z_1$ (shown in FIG. 49B) and the key-on switch Kn is depressed, the tone pitch will be varied in a sequence of $C_3$, $D_3$ and $E_3$, for example. Similarly, as the player's right arm is rising from the bottom direction after the player raises his left arm to a position $Z_2$ and depresses the key-on switch Kn, the tone pitch will be varied in a sequence of $F_3$, $G_3$ and $A_3$, for example. In addition, when positions of the player's right and left arms are set as show in FIG. 49C, a tone pitch $C_4$ can be obtained. Similarly, when the positions of the player's right and left arms are set as shown in FIG. 49D or 49E, a tone pitch $D_3$ or $G_4$ can be obtained.

Meanwhile, FIGS. 49F to 49I show other examples of performance. As the player raises his right arm from the bottom direction after the player's left arm is turned to the position $Z_1$ (shown in FIG. 49F) and the key-on switch Kn is $D_2$, $E_2$, $F_2$ and $G_2$, for example. Similarly, as the player's right arm is rising from the bottom direction after the player raises his left arm to a position $Z_2$ and depresses the key-on switch Kn, the tone pitch will be varied in a sequence of $G_2$, $A_2$, $B_2$, $C_3$ and $D_3$, for example. In addition, when the positions of the player's right and left arms are set as shown in FIG. 49G, a tone pitch $E_3$ can be obtained. Similarly, when the positions of the player's right and left arms are set as shown in FIG. 49H or 49I, a tone pitch $C_3$ or $F_4$ can be obtained.

According to the modified embodiment described heretofore, it is possible to perform various kinds of the musical tone controls by using both of the sticks 601R and 601L held by both hands of the player M.

Incidentally, it is possible to further modify the third embodiment such that the stick 601 provides an octave switch and this octave switch is turned on or off so as to raise or lower the tone pitch by one octave. In addition, the angle detector 602 is provided in the inside of the cylindrical stick 601 in the embodiments described heretofore. However, the shape of the stick is not limited to the cylindrical stick 601, and it is possible to construct the stick 601 in an arbitrary shape. Further, the tone pitch of the musical tone to be generated is varied in response to the force given to the angle detector 602 in the embodiments described heretofore. However, it is possible to vary the tone color and the tone volume in response to the force given to the angle detector 602, or it is possible to control the musical tone to be generated or not based on such force. Furthermore, it is possible to mount the angle detector 602 to the player's feet or body to thereby control the musical tone in response to the movement of the player's feet and the like.

(D) Fourth Embodiment

Figure 50:
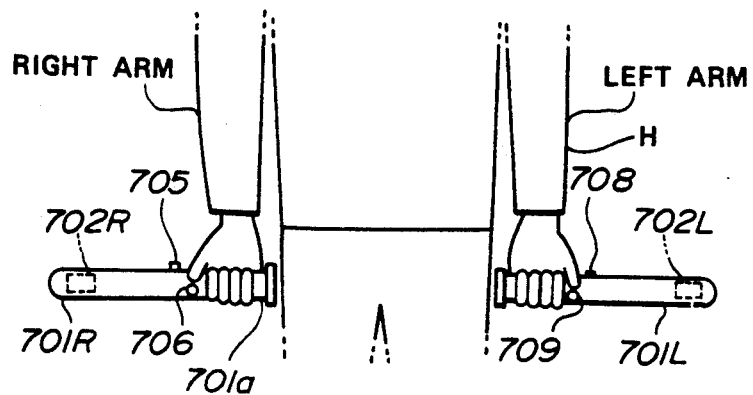
FIG. 50 shows a rhythm stick 701R for a right hand and a rhythm stick 701L for a left hand used in a fourth embodiment of the present invention.
Figure 51:
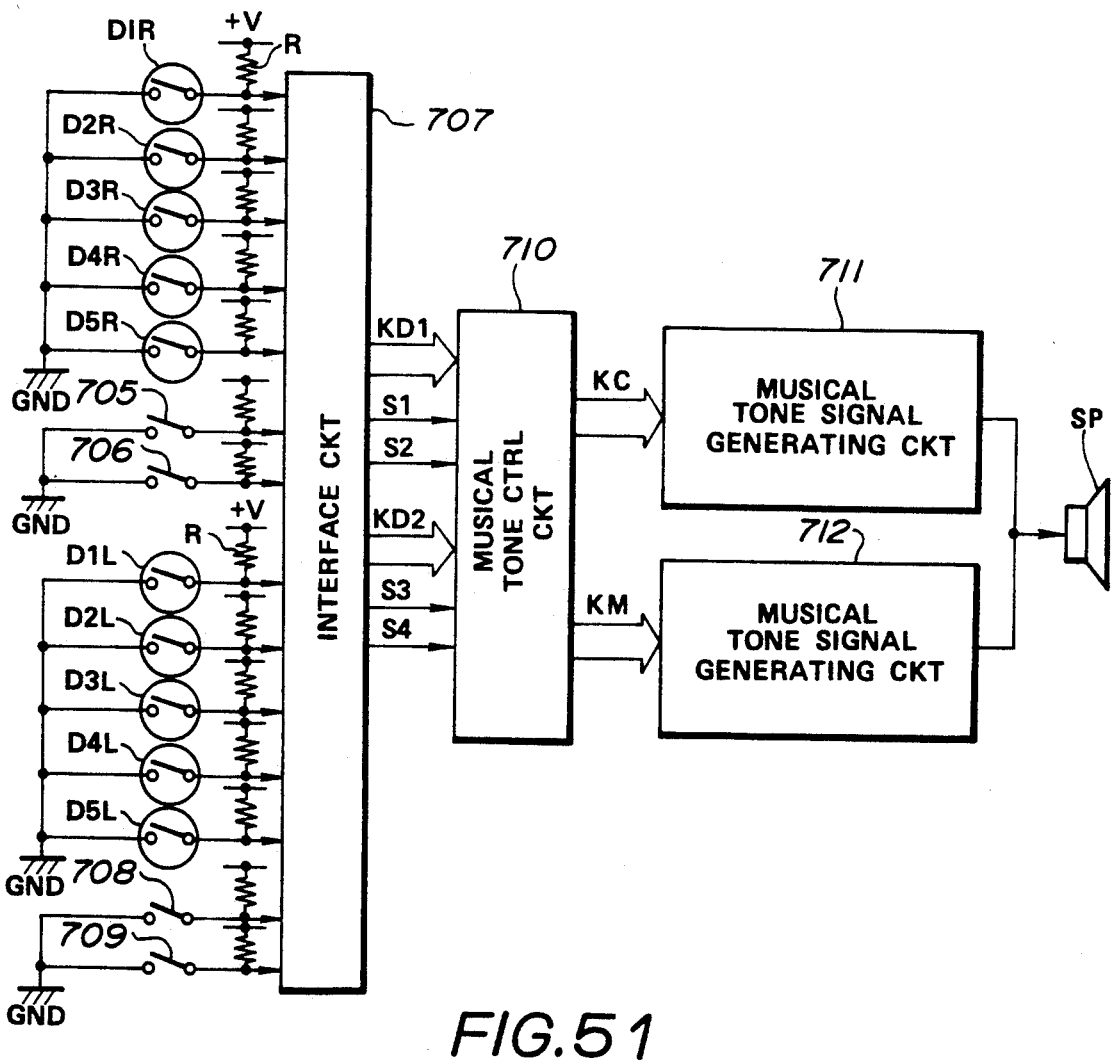
FIG. 51 is a block diagram for explaining a musical tone generating operation of the fourth embodiment.

FIG. 50 shows a rhythm stick 701R for the player's right hand and a rhythm stick 701L for the player's left hand according to a fourth embodiment of the musical tone control apparatus according to the present invention. In FIG. 50, 705 and 706 designate pushbutton switches of the stick 701R. The pushbutton switch 705 is mounted at a position where the thumb of the player's right hand can reach and the pushbutton switch 706 is mounted at a position where the index finger of the player's right hand can reach when the player holds a holding portion 701a of the stick 701R by his right hand. These switches 705 and 706 are respectively connected to an interface circuit 707 shown in FIG. 51. In addition, an angle detector 702R is mounted within a tip edge portion of the stick 701R. This angle detector 702R provides five mercury switches D1R to D5R each of which is connected to the interface circuit 707. Furthermore, respective one terminals of the switches 705, 706 and the mercury switches D1R to D5R are supplied with a constant voltage V via respective resistors (R), and respective other terminals thereof are grounded to (GND).

Similar to the stick 701R, the stick 701L provides pushbutton switches 708 and 709 (corresponding to the pushbutton switches 705 and 706) and also provides an angle detector 702L (corresponding to the angle detector 702R). In addition, the switches 708, 709, and mercury switches D1L to D5L mounted in the angle detector 702L (corresponding to the mercury switches D1R to D5R mounted in the angle detector 702R) are connected to the interface circuit 707 respectively. This interface circuit 707 detects angles of the player's right and left arms with respect to the plumb line based on output signals of the mercury switches D1R to D5R and the mercury switches D1L to D5L as well, and this interface circuit 707 generates angle data KD1 and KD2 based on the detecting result of the angles of the player's arms. Such angle data KD1 and KD2 are sequentially supplied to a musical tone control circuit 710. In addition, the interface circuit 707 detects on/off states of the switches 705, 706, 708 and 709 so as to generate respective signals S1, S2, S3 and S4. Each of these signals S1 to S4 has a "H" (High) level when each of the switches 705, 706, 708 and 709 is depressed. On the other hand, each of these signals S1 to S4 has a "L" (Low) level when each of the switches 705, 706, 708 and 709 is released. These signals S1 to S4 are supplied to the musical tone control circuit 710. First, this musical tone control circuit 710 checks each value of the signals S1 and S2, and the musical tone control circuit 710 generates tone pitch data KC based on the angle data KD1 and KD2 when both of the signals S1 and S2 are identical to the "0" signal (i.e., when both of the switches 705 and 706 are turned off).

In FIG. 52, the upper row represents the swing angle of 0 degree to 180 degrees of the player's right arm, and the left column represents the swing angle of 0 degree to 180 degrees of the player's left arm. As shown in FIG. 52, the musical tone control circuit 710 generates the tone pitch data KC, the value of which corresponds to one of the tone pitches F2, G2, A2, ..., C5, D5, E5. In such process for determining the tone pitch, the value of the tone pitch data KC is raised by the chromatic semi-tone (#; sharp) when the signal S3 is identical to the "1" signal (i.e., when the switch 708 is turned on), and the value of the tone pitch data KC is lowered by the chromatic semi-tone (b; flat) when the signal S4 is identical to the "1" signal (i.e., when the switch 709 is turned on). Such tone pitch data KC are sequentially supplied to a musical tone signal generating circuit 711.

In addition, when both of or one of the signals S1 and S2 is identical to the "1" signal (i.e., when both of or one of the switches 705 and 706 is turned on), the musical tone control circuit 710 generates chord data KM in accordance with the on/off states of the switches 705, 706, and the values of the angle data KD1 and KD2. In FIG. 53, F2# to F3, F3# to F4 and F4# to E5 represent respective ranges of the tone pitches which are determined based on the swing angles of the player's right and left arms as shown in FIG. 52. In response to such tone pitch range and the on/off states of the switches 705 and 706 (shown in the upper rows in FIG. 52), the musical tone control circuit 710 generates the chord data KM corresponding to one of chord kinds of Major, 7th, miner, M7 (7th), m7 (7th), b5 (5th), M6 (6th), dim (diminution), Aug (Augmentation). In the case where the swing angles of the player's both arms are identical to 90 degrees, the tone pitch is determined to B3 as shown in FIG. 52. In this state, when the switch 705 is turned on and the switch 706 is turned off, the chord of M7 is selected in accordance with the tone pitch B3. In addition, when both of the switches 705 and 706 are turned on, the chord of B3-m7 is selected. Furthermore, when the switch 705 is turned off and the switch 706 is turned on, the chord of B3-b5 is selected. In each case, the musical tone control circuit 710 generates the chord data KM corresponding to the chord of M7, B3-m7 or B3-b5, and such chord data KM are sequentially supplied to a musical tone signal generating circuit 712 wherein a chord accompaniment signal corresponding to the chord data KM is generated. On the other hand, the musical tone signal generating circuit 711 generates a melody tone signal having the tone pitch corresponding to the tone pitch data KC which are outputted from the musical tone control circuit 710. Hence, a speaker SP is driven based on the chord accompaniment signal and the melody tone signal.

In the above-mentioned constitution, when the player swings up his arms holding the sticks 701R and 701L and releases the switches 705 and 706, the speaker SP generates a melody tone having the tone pitch corresponding to the swing angles of the player's arms and the on/off states of the switches 708 and 709. In this state, when the player depresses one of or both of the switches 705 and 706, the speaker SP generates the accompaniment tone corresponding to the swing angles of the player's arms and the on/off states of the switches 705, 706, 708 and 709.

Figures 54A, 54B:
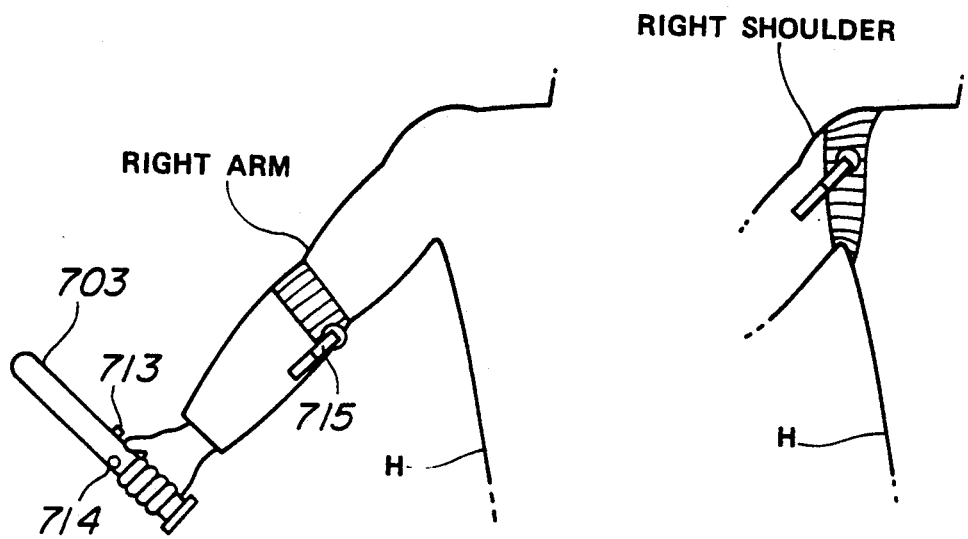
FIG. 54A shows an angle detector which is mounted at a right elbow of the player.
FIG. 54B shows an angle detector which is mounted on a right shoulder of the player.
Figure 55:
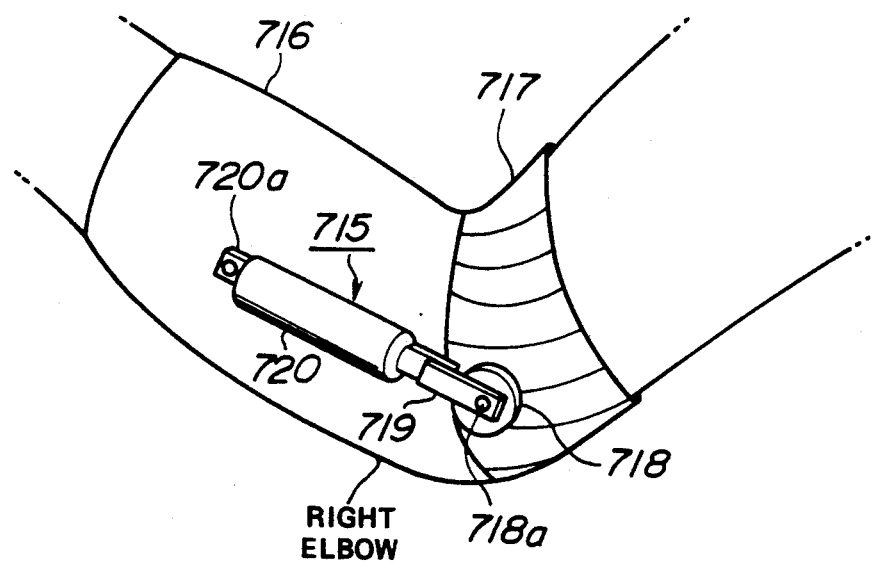
FIG. 55 shows a detailed appearance of the angle detector shown in FIG. 54A.

In the present fourth embodiment, the angle detectors 702R and 702L mounted within the sticks 701R and 701L are used for detecting the swing angles of the player's arms. Instead, it is possible to employ an angle detector 715 as shown in FIG. 54A. In FIG. 54A, the player holds a stick 703 mounted with switches 713 and 714 (corresponding to the switches 705 and 706), and the angle detector 715 is mounted at the player's right elbow in order to detect the bending angle of the player's right elbow. In this case, the player's left arm has the same constitution as shown in FIG. 54A, hence, the drawing thereof and the description thereof will be omitted. FIG. 55 shows a detailed constitution of the player's right elbow shown in FIG. 54A. In FIGS. 54A and 55, 716 designates a mounting wear covering the upper half of the player's body, and 717 designates a supporter which is made of flexible fiber materials such as the rubber material and which covers the joint portion of the player's right elbow. This supporter is mounted with a resistor 718 of the angle detector 715 at a portion covering the joint of the player's right elbow. This angle detector 715 is constituted such that a lever 719 is fixed at a shaft 718a of the resistor 718 and a tip edge portion of the lever 719 can be freely put out and in a cylinder 720. In addition, a spring is provided in the inside of the cylinder 720 in order to pull the lever 719. Furthermore, a fixing portion 720a is formed at an edge portion of the cylinder 720, and this fixing portion 720a is mounted at a certain portion of the mounting wear 716 which covers the player's right arm.

In the above-mentioned constitution, the lever 719 and the cylinder 720 vibrates in response to a movement for bending or stretching the player's right elbow so that the shaft 718a will be revolved. Hence, the resistor 718 outputs a detection signal the value of which corresponding to the revolving angle of the shaft 718a (i.e., the bending angle of the player's right elbow). Such detection signal is supplied to an A/D converter (not shown) wherein the level of the detection signal is converted into angle data KD1, and such angle data KD1 are supplied to the musical tone control circuit 710 shown in FIG. 51. Similarly, the angle data KD2 corresponding to angle detector for the player's left elbow (not shown) are supplied to the musical tone control circuit 710. Thus, the melody tone or the accompaniment tone will be generated in response to the bending angles of the player's elbows and the on/off states of the switches mounted on the sticks. In this case, the melody tone can not have the tone pitches described in the row and the column of 180 degrees in FIG. 52 because the player's elbow can not bend by 180 degrees. For this reason, the accompaniment tone can not have the chords of M6, dim and Aug in the row of the tone pitch range of F4# to E5 shown in FIG. 53. In the above-mentioned embodiment, the angle detectors are mounted at the player's elbows, however, it is possible to mount such angle detectors at the player's shoulders as shown in FIG. 54B.

In these embodiments, the angle detectors 702R and 702L or the angle detector 715 is used as angle detecting means, however, the angle detecting means is not limited to such angle detectors. Furthermore, in FIG. 54A, the switches mounted on the sticks held by the player's arms are used instead of the switches 705, 706, 708 and 709 shown in FIG. 51, however, these switches are not necessarily mounted to the sticks.

(E) Fifth Embodiment

Figure 56:
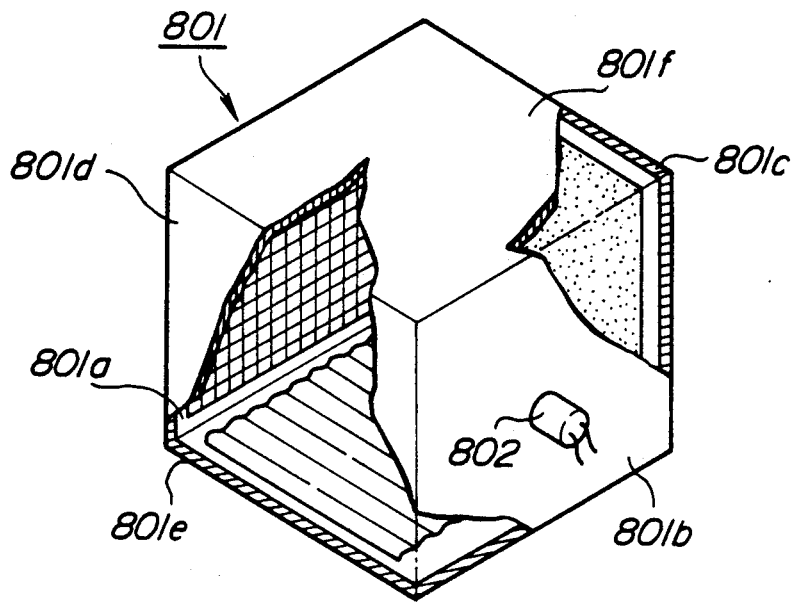
FIG. 56 is a perspective view showing a noise generator used in a fifth embodiment of the present invention.

FIG. 56 is a perspective side view showing a noise generator used in a musical tone control apparatus according to a fifth embodiment of the present invention. In FIG. 56, 801 designates the noise generator constructed as a box made of synthetic resin, and such noise generator 801 has a shape which can be held by one hand of the player. This noise generator 801 has six side plates 801a to 801f, and a plurality of flutes are formed on inside surfaces of the opposite plates 801a and 801b based on a network formation. In addition, numberless minute protrusions are formed on inside surfaces of the opposite plates 801c and 801d. Further, a plurality of protrusions are formed on inside surfaces of the opposite plates 801e and 801f based on a wave formation. The side plate 801b provides a hole at a center portion thereof, and a microphone 802 is inserted in and fixed at such hole. Furthermore, a small amount of sand is enclosed in the noise generator 801.

Figure 57:
FIG. 57 shows a waveform of an output signal of a microphone provided in the noise generator shown in FIG. 56.
Figure 58:
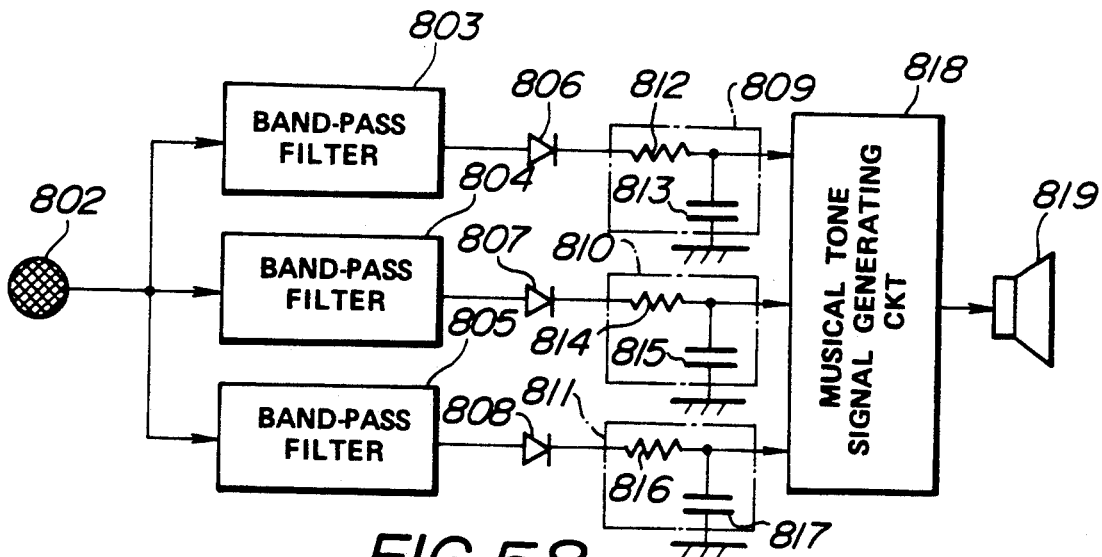
FIG. 58 is a block diagram showing a circuit constitution of the fifth embodiment of the present invention.

Next, when the player holds and vibrates the above-mentioned noise generator 801 by his hand, a noise is generated due to a collision between the sand and the inside surfaces of the side plates 801a to 801f. In this case, the generated noise can be varied in response to the shapes of the inside surfaces of the side plates 801a to 801f and in response to the intensities of the above collision, whereby an output signal of the microphone 802 can be varied. FIG. 57 shows a waveform of a noise signal outputted from the microphone 802, and a horizontal axis thereof represents the time and a vertical axis thereof represents the amplitude. In FIG. 57, a waveform portion (a) represents a waveform of the noise signal when the sand collides with the inside surfaces of the side plates 801a and 801b, a waveform portion (b) represents a waveform of the noise signal when the sand collides with the inside surfaces of the side plates 801c and 801d, and a waveform portion (c) represents a waveform of the noise signal when the sand collides with the inside surfaces of the side plates 801e and 801f. Such noise signal from the microphone 802 is supplied to a circuit shown in FIG. 58.

In FIG. 58, 803, 804 and 805 designate band-pass filters having respective frequency characteristics. These band-pass filters 803, 804 and 805 filter out signals having respective frequency band ranges from the noise signal. More specifically, the band-pass filter 803 filters out a specific frequency component corresponding to the noise generated when the sand collides with the inside surfaces of the side plates 801a and 801b. In addition, the band-pass filter 804 filters out a specific frequency component corresponding to the noise generated when the sand collides with the inside surfaces of the side plates 801c and 801d. Furthermore, the band-pass filter 805 filters out a specific frequency component corresponding to the noise generated when the sand collides with the inside surfaces of the side plates 801e and 801f.

Next, diodes 806, 807 and 808 rectify output signals of the band-pass filters 803, 804 and 805 respectively, and the output signals of the diodes 806, 807 and 808 are supplied to smoothing circuits 809, 810 and 811 respectively. The smoothing circuit 809 is constituted by a resistor 812 and a capacitor 813, the smoothing circuit 810 is constituted by a resistor 814 and a capacitor 815, and the smoothing circuit 811 is constituted by a resistor 816 and a capacitor 817. These smoothing circuits 809 to 811 smooth the output signals of the diodes 806 to 808, and the output signals of the smoothing circuits 809 to 811 are supplied to a musical tone signal generating circuit 818 as musical tone control data. This musical tone signal generating circuit 818 sequentially checks the levels of the output signals of the smoothing circuits 809 to 811 so as to generate a musical tone signal having a tone color and a tone volume depending on the checking result thereof. Such musical tone signal is supplied to the speaker 819.

For example, when the output level of the smoothing circuit 809 is higher than a predetermined level, the musical tone signal generating circuit 818 generates the musical tone signal having the tone color of the bass drum. The level of such musical tone signal is controlled by the output level of the smoothing circuit 809, and such musical tone signal is supplied to the speaker 819. Similarly, when the output level of the smoothing circuit 810 is higher than a predetermined level, the musical tone generating circuit 818 generates and outputs the musical tone signal having the tone color of the drum to the speaker 819. In addition, when the output level of the smoothing circuit 811 is higher than a predetermined level, the musical tone signal generating circuit 818 generates and outputs the musical tone signal having the tone color of the cymbal to the speaker 819. Furthermore, when two or three output levels among the output levels of the smoothing circuits 809 to 811 are higher than the predetermined levels at the same time, the musical tone signals having respective tone colors are mixed together and such mixed musical tone signal is supplied to the speaker 819.

In the fifth embodiment, the sand is enclosed within the noise generator 801. However, noise generating medium is not limited to the sand, and it is possible to enclose other noise generating medium such as balls or sticks. In addition, the inside surfaces of the noise generator 801 are shaped based on the network formation, a protrusion formation and the wave formation in the fifth embodiment. However, the shapes of the inside surfaces of the noise generator 801 are not restrictive as described above, and it is possible to shape such inside surfaces based on other shaping formations.

Meanwhile, the output signals of the band-pass filters are rectified and smoothed, and such rectified and smoothed voltages are used as musical tone control data. Then, the musical tone signal is controlled based on such musical tone control data in the fifth embodiment. However, it is possible to control the level of the musical tone signal in response to peak values of the output signals of the band-pass filters. In addition, the noise generator 801 has a shape which can be held by one hand of the player in the fifth embodiment. However, it is possible to construct such noise generator 801 to a wrist watch, a belt and a hair band and the like which can be mounted to respective portions of the player. Furthermore, the noise signal outputted from the microphone 802 is used for controlling the musical tone signal. However, it is possible to use such noise signal as a tone source signal.

In the fifth embodiment, the tone color and the tone volume of the musical tone signal are controlled based on the noise signal. However, it is possible to control the tone pitch, the tone volume and the like of the musical tone signal based on the noise signal, and it is also possible to control an operation for selecting a desirable preset content from preset contents of data corresponding to plural musical tone characteristics. In addition, it is possible to process the noise signal by use of the CPU based on a digital data processing operation and thereby generate the musical tone control data. Hence, it is possible to drive the electronic musical instrument employing the MIDI standard based on such musical tone control data. In addition, it is possible to control the performance speed of an automatic rhythm tone based on the musical tone control data.

Further, the means for detecting the characteristics of the tones is not limited to those of the fifth embodiment. For example, it is possible to detect a tone volume variation and a frequency variation of the noise signal outputted from the microphone 802 and thereby generate the musical tone control data based on the detecting result thereof. Furthermore, the tone to be detected is not limited to the noise tone of the noise generator 801. For example, it is possible to detect the other tones such as a tone generated by the player's feet, a tone generated by clapping hands and a whistle.

As described heretofore, this invention may be practiced or embodied in still other ways without departing from the spirit or essential characters thereof. Therefore, the preferred embodiments described herein are illustrative and not restrictive, the scope of the invention being indicated by the appended claims and all variations which come within the meaning of the claims are intended to be embraced therein.

What is claimed is:

1. A manual musical tone control apparatus comprising:
   (a) detecting means for detecting a swing motion of an object to be detected, wherein said detecting means detects one or more movement parameters;
   (b) means for outputting musical tone control data which control a musical tone signal based on a detecting result of said detecting means wherein said musical tone control data represent a start signal indicating a start timing for generating a particular musical tone;
   (c) sensor means for detecting a movement parameter other than that of said detecting means, a tone pitch or a tone color of said musical tone signal being controlled based on a detecting result of said sensor means; and
   (d) start timing means for generating a musical tone or an envelope of said musical tone based on the musical tone control data.

2. A musical tone control apparatus according to claim 1 wherein said detecting means is constituted by means for detecting an acceleration of moving object.

3. A musical tone control apparatus according to claim 1 wherein said detecting means detects a force of movement of said object.

4. A manual musical tone control apparatus comprising:
   (a) detecting means for detecting acceleration of an object to be detected, wherein said detecting means detects one or more movement parameters;
   (b) means for outputting musical tone control data which control a musical tone signal representing a particular tone to be generated based on a detecting result of said detecting means;
   (c) sensor means for detecting a movement parameter other than that of said detecting means, a tone pitch or a tone color of said musical tone signal being controlled based on a detecting result of said sensor means; and
   (d) start timing means for generating a musical tone or an envelope of said musical tone based on the detecting result of said detecting means.

5. A musical tone control apparatus according to claim 1 or 4 wherein said detecting means has a stick shape.

6. A musical tone control apparatus according to claim 1 or 4 wherein said musical tone control data represent data indicating a tone volume and/or a tone color.

7. A musical tone control apparatus comprising:
(a) acceleration sensor means for connection to a predetermined part of the human body and providing an output related to acceleration thereof;
(b) first detecting means for outputting a first detection signal when an output level of said acceleration sensor means becomes higher than a predetermined first level;
(c) second detecting means for outputting a second detection signal when a level of a higher harmonic component included in the output signal of said acceleration sensor means becomes higher than a predetermined second level;
(d) hold means for holding said higher harmonic component level when both of said first and second detection signals are outputted respectively from said first and second detecting means; and
(e) first means for generating first musical tone control data based on a detecting result of said first detecting means.

8. A musical tone control apparatus according to claim 7 further comprising changing means for changing or suppressing said first musical tone control data based on impulse data representative of a detected intensity of impulse corresponding to an output level of said hold means.

9. A musical tone control apparatus according to claim 7 further comprising control means for controlling said first musical tone control data based on impulse data representative of a detected intensity of impulse corresponding to an output level of said hold means.

10. A musical tone control apparatus according to claim 7 further comprising second means for generating second musical tone control data other than said first musical tone control data based on impulse data representative of a detected intensity of impulse corresponding to an output level of said hold means.

11. A musical tone control apparatus according to claim 10 wherein said second musical tone control data represent a tone volume, a tone color or a tone pitch of a musical tone.

12. A musical tone control apparatus comprising:
(a) acceleration sensor means being mounted at said predetermined part of the human body;
(b) first detecting means for outputting a first detection signal the level of which becomes a predetermined level while an output level of said acceleration sensor means becomes higher than a level of a first reference signal;
(c) amplifier means for amplifying a higher harmonic component included within the output signal of said acceleration sensor;
(d) second detecting means for outputting a second detection signal the level of which becomes a predetermined level while the output level of said amplifier means becomes higher than a level of a second reference signal;
(e) interrupt signal generating means for generating an interrupt signal representing that both levels of said first and second detection signals become identical to said predetermined level;
(f) hold means for holding a peak value of said higher harmonic component in response to a timing of said second detection signal;
(g) analog-to-digital converter means for converting said peak value of said higher harmonic component into digital data representing said intensity of impulse; and
(h) central processing means for converting said digital data into tone pitch data representing a tone pitch of a musical tone in response to the timing of said interrupt signal.

13. A musical tone control apparatus according to claim 12 wherein said acceleration sensor means has a vibrator which is made from an inorganic material such as a piezo-plastic having a piezoelectric characteristic.

14. A musical tone control apparatus according to claim 13 wherein said first detecting means comprises
(a) first lowpass filter means for extracting out a first signal from the output signal of said acceleration sensor means, said first lowpass filter means having a first time constant;
(b) second lowpass filter means for extracting out a second signal from the output signal of said acceleration sensor means, said second lowpass filter means having a second time constant which is larger than said first time constant;
(c) means for generating said first reference signal based on a predetermined first reference voltage and said second signal; and
(d) comparator means for comparing the level of said first signal and that of said first reference signal so as to output said first detection signal the level of which becomes said predetermined level while the level of said first signal becomes higher than that of said first reference signal.

15. A musical tone control apparatus according to claim 14 wherein said second time constant is set approximately ten times of said first time constant.

16. A musical tone control apparatus according to claim 12, 14 or 15 wherein said amplifier means comprises
(a) highpass filter means for extracting out said higher harmonic component from the output signal of said acceleration sensor means; and
(b) an amplifier for amplifying said higher harmonic component.

17. A musical tone control apparatus according to claim 16 wherein said second detecting means comprises
(a) third lowpass filter means for extracting a third signal from the output signal of said acceleration sensor means;
(b) means for generating said second reference signal based on a predetermined second reference voltage and said third signal; and
(c) comparator means for comparing the level of said second reference signal and that of the output level of said amplifier means so as to output said second detection signal the level of which becomes said predetermined level while the output level of said amplifier means becomes higher than that of said second reference signal.

18. A musical tone control apparatus according to claim 12 wherein said interrupt signal generating means comprises
(a) flip-flop means for storing said first detection signal in response to a timing of said second detection signal, said flip-flop means being reset by said central processing means when both levels of said first and second detection signals become identical to a level other that said predetermined level; and (b) AND gate means for generating said interrupt signal by use of said first detection signal and the output signal of said flip-flop means based on an AND operation.

19. A musical tone control apparatus according to claim 12 wherein said hold means comprises
   (a) analog switch means for passing through the output signal of said amplifier means at every time when the level of said second detection signal becomes identical to said predetermined level, said analog switch means being turned off while the level of said second detection signal becomes identical to a level other than said predetermined level; and
   (b) capacitor means for holding the output level of said analog switch means.

20. A musical tone generating apparatus for generating a musical tone based on an intensity of impulse generated at a time when a predetermined part of a human body collides with a certain object comprising:
   (a) acceleration sensor means being mounted at said predetermined part of the human body;
   (b) first detecting means for outputting a first detection signal the level of which becomes a predetermined level while an output level of said acceleration sensor means becomes higher than a level of a first reference signal;
   (c) amplifier means for amplifying a higher harmonic component included within the output signal of said acceleration sensor;
   (d) second detecting means for outputting a second detection signal the level of which becomes a predetermined level while the output level of said amplifier means becomes higher than a level of a second reference signal;
   (e) interrupt signal generating means for generating an interrupt signal representing that both levels of said first and second detection signals become identical to said predetermined level;
   (f) hold means for holding a peak value of said higher harmonic component in response to a timing of said second detection signal;
   (g) analog-to-digital converter means for converting said peak value of said higher harmonic component into digital data representing said intensity of impulse;
   (h) central processing means for converting said digital data into tone pitch data representing a tone pitch of a musical tone in response to the timing of said interrupt signal; and
   (i) musical tone generating means or generating a musical tone based on said tone pitch data.

21. A musical tone control apparatus comprising:
   (a) a first integration circuit for integrating an acceleration signal outputted from an acceleration sensor which detects an acceleration of an object so as to convert said acceleration signal into a speed signal representing a moving speed of said object;
   (b) a second integration circuit for integrating said speed signal so as to convert said speed signal into a distance signal representing a moving distance of said object;
   (c) control means for controlling integration actions of said first and second integration circuit based on a predetermined level of said acceleration signal in a predetermined period; and
   (d) generating means for generating a musical tone signal in accordance with said distance signal.

22. A musical tone control apparatus according to claim 21 wherein said predetermined period is identical to a period when said acceleration of said object is increasing.

23. A musical tone control apparatus according to claim 21 wherein said first integration circuit comprises a first operational amplifier, a first resistor and a first capacitor and said said second integration circuit comprises a second operational amplifier, a second resistor and a second capacitor, said acceleration signal being inputted into an inverting input terminal of said first operational amplifier via said first resistor, said first capacitor being connected between said inverting input terminal and an output terminal of said first operational amplifier whose non-inverting input terminal is grounded; said speed signal outputted from said output terminal of said first operational amplifier being inputted into an inverting input terminal of said second operational amplifier via said second resistor, said second capacitor being connected between said inverting input terminal and an output terminal of said second operational amplifier whose non-inverting input terminal is grounded, and said distance signal being outputted from said output terminal of said second operational amplifier.

24. A musical tone control apparatus according to claim 21 or 23 wherein said control means includes
   (a) means for outputting a pulse signal the pulse width of which corresponds to a period when said acceleration of said object is increasing;
   (b) delay means for delaying a trailing edge timing of said pulse signal so as to enlarge said pulse width of said pulse signal by a predetermined time; and
   (c) integration action control means for controlling the integration action of said first and second integration circuits, said first and second integration circuits performing the integration actions thereof during a pulse width period of an output signal of said delay means.

25. A musical tone control apparatus according to claim 24 wherein said integration action control means consists of first and second reed relays, said first capacitor being connected between both contacts of said first reed relay, said second capacitor being connected between both contacts of said second reed relay, the contacts of said first and second reed relays being opened in the pulse width period of the output signal of said delay means, the contacts of said first and second reed relays being closed in a period other than said pulse width period.

26. A musical tone control apparatus according to claim 24 wherein said integration action control means comprises
   (a) an integration circuit for delaying said acceleration signal; and
   (b) a comparator for comparing the level of said acceleration signal and that of a delayed acceleration signal outputted from said integration circuit so as to output said pulse signal the pulse width of which represents a period when the level of said acceleration signal is larger than that of said delayed acceleration signal.

27. A musical tone control apparatus for generating a musical tone corresponding to movement of an object to be detected comprising:
   (a) a first integration circuit for integrating an acceleration signal outputted from an acceleration sensor which detects an acceleration of said object so as to convert said acceleration signal into a speed signal representing a moving speed of said object;

(b) a second integration circuit for integrating said speed signal so as to convert said speed signal into a distance signal representing a moving distance of said object; and (c) control means for controlling integration actions of said first and second integration circuits based on a predetermined level of said acceleration signal in an acceleration increasing period when said acceleration of said object is increasing, said control means outputting an interrupt signal at a timing when said acceleration increasing period is ended;

(d) a central processing unit supplied with said interrupt signal;

(e) analog-to-digital converter means for converting said speed signal and said distance signal into respective digital data at a timing of said interrupt signal under a control of said central processing unit;

(f) register means for storing said digital data therein, said central processing unit reading out said digital data stored in said register means so as to output the digital data corresponding to said speed signal as volume data and also output the digital data corresponding to said distance signal as tone pitch data;

(g) sound generator means for generating a musical tone signal representing a musical tone having a volume corresponding to said volume data and a tone pitch corresponding to said tone pitch data; and (h) musical tone generating means for generating said musical tone based on said musical tone signal.

28. A musical tone control apparatus according to claim 27 wherein said control means includes (a) means for outputting a pulse signal the pulse width of which corresponds to said acceleration increasing period; and (b) a flip-flop for generating said interrupt signal at a trailing edge timing of said pulse signal.

29. A musical tone control apparatus comprising:

(a) detecting means for detecting plural frequency characteristics of a natural sound input thereto;

(b) analyzing means for analyzing said plural frequency characteristics of said natural sound to thereby output their analysis results as musical tone control data, wherein said musical tone control data controls the tone pitch of a musical tone to be generated; and (c) musical tone signal generating means for generating a musical tone signal having the tone pitch controlled by said musical tone control data when an output level of at least one of said analysis results is higher than a predetermined level.

30. A musical tone control apparatus according to claim 29 wherein said musical tone control data re further representative of a tone color or a tone volume of a musical tone to be generated.

31. A musical tone control apparatus as set out in claim 29, wherein said sound includes several frequency components, so that said analyzing means extracts and then analyzes one of said frequency components.

32. A musical tone control apparatus in accordance with claim 29 above, wherein said detecting means detects characteristics of a natural sound input thereto according to each of plural frequency ranges.

33. A musical tone control apparatus in accordance with claim 29 above, further comprising:

(c) natural sound generating means for generating a natural sound having plural frequency characteristics; and (d) musical tone signal generating means for generating a musical tone signal based on said musical tone control data from said analyzing means.

34. A musical tone control apparatus according to claim 29 wherein said musical tone signal generating means generates plural musical tone signals respectively having tone pitches corresponding to said plural frequency characteristics when said output level of said analysis results are respectively higher than the predetermined level.

35. A musical tone control apparatus comprising:

(a) detecting means for detecting plural frequency characteristics of a natural sound input thereto; and (b) analyzing means for analyzing said plural frequency characteristics of said natural sound to thereby output their analysis results as musical tone control data wherein said detecting means detects and separates at least a single tone generated by use of a predetermined material from mixed tones which are generated by use of several kinds of materials.

36. A musical tone control apparatus comprising:

(a) detecting means for detecting relative revolving angles of a predetermined portion of a player; and (b) means for generating musical tone control data which control a musical tone signal based on a detecting result of said detecting means.

37. A musical tone apparatus according to claim 46 wherein said detecting means judges whether said joint or said predetermined portion of said player is revolved or not.

38. A musical tone control apparatus according to claim 36 wherein said detecting means detects a bending angle based on predetermined bending degrees each representative of each of predetermined bending angles.

39. A musical tone control apparatus comprising:

(a) detecting means for detecting bending angles of a predetermined portion of a player; and (b) means for generating musical tone control data which control a musical tone signal based on a detecting result of said detecting means;

wherein said detecting means detects a bending angle based on predetermined bending degrees each representative of each of predetermined bending angle.

40. A musical tone control apparatus according to claim 36 or 39 wherein said detecting means comprises (a) an ultrasonic transmitter and an ultrasonic receiver each of which is mounted at a predetermined portion apart from a joint portion of said player; and (b) an ultrasonic detecting circuit for detecting said angle of said joint portion based on a time for transmitting a ultrasonic wave from said ultrasonic transmitter to said ultrasonic receiver.

41. A musical tone control apparatus according to claim 36 or 39 wherein said musical tone control data represent a tone pitch, a tone volume, a tone color or a tempo of a musical tone to be generated.

42. A musical tone control apparatus according to claim 39 wherein said detecting means is constituted by a pressure sensitive element which is mounted at a finer tip portion of a flexible glove, said pressure sensitive element detecting a bending angle of finger tip based on a pressure given to said pressure sensitive element.

43. A musical tone control apparatus according to claim 39 wherein said detecting means judges whether said predetermined portion of said player is bent or not.

44. A musical tone control apparatus comprising:
  (a) detecting means for detecting bending angles of a predetermined portion of a player, constituted by a potentiometer which is mounted at a joint portion of said player, said potentiometer detecting said angle of said joint portion; and
  (b) means for generating musical tone control data which control a musical tone signal based on a detecting result of said detecting means.

45. A musical tone control apparatus for controlling a musical tone generated from a musical tone generating apparatus comprising:
  (a) detecting means for detecting a position of at least a predetermined portion of a player's body with respect to a reference point; and
  (b) generating means for generating musical tone control data which control said musical tone based on a detecting result of said detecting means, said musical tone control data being supplied to said musical tone generating apparatus, wherein said detecting means detects respective positions of a right arm and a left arm of the player, said generating means generating said musical tone control data based on a combination of detecting results of said right and left arms of the player.

46. A musical tone control apparatus according to claim 45 wherein said detecting means is constituted by an angle sensor.

47. A musical tone control apparatus according to claim 46 wherein said angle sensor is mounted at a predetermined portion of said player's body.

48. A musical tone control apparatus according to claim 46 wherein said angle sensor has a shape which can be held by a player's hand.

49. A musical tone control apparatus according to claim 45 wherein said detecting means has a portable shape.

50. A musical tone control apparatus according to claim 45 wherein said musical tone control data represent a tone pitch, a tone volume or a tone color of a musical tone to be generated.

51. A musical tone control apparatus according to claim 45 wherein aid musical tone control data represent a musical information of an accompaniment.

52. A musical tone control apparatus according to claim 45 wherein said musical tone control data represent a tone pitch or a chord of the musical tone.

53. A musical tone control apparatus comprising:
  (a) detecting means, configured to be mounted on a player in the vicinity of a joint portion of the player, for detecting an angle of said joint portion;
  (b) means for detecting a revolving angular velocity of said joint portion based on a variation of the angle detected by said detecting means in lapse of time; and
  (c) generating means for generating a musical tone signal in accordance with a signal derived from said detected angle.

54. A musical tone control apparatus according to claim 53 wherein said detecting means measures a distance between two predetermined portions each of which is set apart from said joint portion, and said detecting means detects a relative angle between said two predetermined portions with respect to the center joint portion based on a measured distance thereof.

55. A musical tone control apparatus according to claim 54 wherein said detecting means measures said distance between two predetermined portions by use of an ultrasonic wave.

56. A musical tone control apparatus according to claim 53 wherein said detecting means provides a rotary encoder which is mounted at said joint portion.

57. A musical tone control apparatus according to claim 56 wherein said musical tone control data represent a tempo, a tone pitch, a volume or a tone color of the musical tone to be generated.

58. A musical tone control apparatus according to claim 53 wherein said joint portion indicates elbows or shoulders of the player.

59. A musical tone control apparatus according to claim 53 wherein said detecting means provides two detecting elements which are mounted on right and left arms of the player.

60. A musical tone control apparatus according to claim 59 wherein said two detecting elements independently control an external musical tone generating apparatus.

61. A musical tone control apparatus comprising:
  (a) a hollow case;
  (b) a plurality of contacts arranged into a matrix, such that plural contacts are electrically connected in rows and columns of said matrix, within the inside of said hollow case;
  (c) conductive fluid enclosed within said hollow case, said conductive fluid moving or flowing in response to an inclination of said hollow case so as to electrically connect between two contacts among said plural contacts, said hollow case generating an angle signal representative of said inclination of said hollow case in response to connected contacts; and
  (d) generating means for generating musical tone control data which control a musical tone based on said angle signal, said musical tone being generated from an external tone surface.

62. A musical tone control apparatus according to claim 61 wherein said musical tone control data represent tone parameters such as a tone pitch and a tone volume of the musical tone.

63. A musical tone control apparatus according to claim 62 wherein an inclination detection of said hollow case designates a specific tone parameter among said tone parameters.

64. A musical tone control apparatus comprising:
  (a) detecting means for detecting a degree of movement of an object, wherein said object is adapted to be swung and said degree of movement of said object is the degree of the swing movement of said object, said detecting means generating a continuously variable signal related to said degree of movement and generating a key-on signal when a detected degree of movement of said object exceeds a predetermined degree;
  (b) musical tone control means for controlling a musical tone signal based on the degree of movement signal of said detecting means; and
  (c) musical tone generating means for starting to generate a musical tone in response to said key-on signal.

65. A musical tone control apparatus according to claim 64, wherein said detecting means detects a degree of an impulse applied to an object so that a predetermined musical parameter of said musical tone to be generated is controlled by the detected impulse.

66. A musical tone control apparatus according to claim 64, wherein said key-on signal is reset when said degree of movement becomes lower than said predetermined degree.

67. A musical tone control apparatus comprising:
(a) detecting means for detecting a degree of movement of an object, wherein said degree of movement of said object is the degree of an acceleration applied to said object, and providing a continuously variable degree of movement signal related thereto, said detecting means generating a key-on signal when a detected degree of movement of said object exceeds a predetermined degree;
(b) musical tone control means for controlling a musical tone signal based on said degree of movement signal of said detecting means; and
(c) musical tone generating means for starting to generate a musical tone in response to said key-on signal.

68. A musical tone control apparatus according to claim 67, wherein said detecting means detects a degree of an impulse applied to an object so that a predetermined musical parameter of said musical tone to be generated is controlled by the detected impulse.

69. A musical tone control apparatus according to claim 67, wherein said key-on signal is reset when said degree of movement becomes lower than said predetermined degree.

70. A musical tone control apparatus comprising:
(a) detecting means for detecting plural frequency characteristics of a natural sound input thereto;
(b) analyzing means for analyzing said plural frequency characteristics of said natural sound to thereby output their analysis results as musical tone control data wherein said sound inputted into said detecting means is generated based on an action of a player; and
(c) musical tone signal generating means for generating a musical tone signal when an output level of at least one of said analysis results is higher than the predetermined level.

71. A musical tone control apparatus as set out in claim 70, wherein said sound is generated based on collision and/or friction between objects, so that said analysis result of said sound varies in response to a state of said collision and/or friction.

72. A musical tone control apparatus according to claim 70 wherein said musical tone signal generating means generates plural musical tone signals respectively having tone pitches corresponding to said plural frequency characteristics when said output level of said analysis results are respectively higher than the predetermined level.

73. A musical tone control apparatus comprising:
(a) motion detecting means for detecting a motion of a player to thereby output a motion signal representing said motion;
(b) a first integration circuit for integrating said motion signal; and
(c) musical tone control means for generating a musical tone control signal based on an integration result of said first integration circuit.

74. A musical tone control apparatus as defined in claim 73, further comprising a second integration circuit which further integrates said integration result of said first integration circuit, so that said musical tone control means generates a musical tone control signal based on an integration result of said second integration circuit.

75. A musical tone control apparatus as defined in claim 74, further comprising an integration control means which controls an integration operation of said first integration circuit and/or said second integration circuit based on a level of said motion signal in a predetermined period.

76. A musical tone control apparatus as defined in claim 73, further comprising an integration control means which controls an integration operation of said first integration circuit based on a level of said motion signal in a predetermined period.

77. A musical tone control apparatus as defined in claim 73, wherein said motion detecting means is configured by an acceleration sensor which senses an acceleration caused by said motion, so that said motion signal represents said acceleration and said integration result of said first integration circuit represents a velocity of said motion.

78. A musical tone control apparatus comprising:
(a) first detecting means for detecting a state of a first predetermined portion of a player;
(b) second detecting means for detecting a state of a second predetermined portion of said player; and
(c) control means for generating a single musical tone control signal based on a combination of simultaneous detecting results of said first and second detecting means.

79. A musical tone control apparatus as defined in claim 78, wherein said first predetermined portion corresponds to one arm of said player, while said second predetermined portion corresponds to another arm of said player.

80. A musical tone control apparatus as defined in claim 78, wherein said first predetermined portion corresponds to one digit of said player, while said second predetermined portion corresponds to another digit of said player.

81. A musical tone control apparatus comprising:
(a) detecting means for detecting a degree of movement of an object, wherein said object is adapted to be swung and said degree of movement of said object is the degree of the swing movement of said object, said detecting means generating a key-on signal when a detected degree of movement of said object exceeds a predetermined degree;
(b) musical tone control means for controlling a musical tone signal based on a detecting result of said detecting means; and
(c) musical tone generating means for starting to generate a musical tone in response to said key-on signal wherein said detecting means detects said degree of movement of said object over a predetermined time interval, and wherein said detecting means generates at least one musical tone control parameter based on said degree of movement of said object over said predetermined time interval.

82. A musical tone control apparatus in accordance with claim 81 above, wherein said musical tone control parameter based on said degree of movement of said object over said predetermined time interval is based on at least one of a peak velocity of said object during said time interval, a peak acceleration of said object during said time interval, and a peak deceleration of said object during said time interval.

* * * * *

UNITED STATES PATENT AND TRADEMARK OFFICE
CERTIFICATE OF CORRECTION

PATENT NO. : 5,290,964
DATED : March 1, 1994
INVENTOR(S) : Teruo Hiyoshi, et al

It is certified that error appears in the above-indentified patent and that said Letters Patent is hereby corrected as shown below:

On the title page: Item [75] Inventors:

Please correct the spelling of the second and third named inventors as follows:
delete " Kimpara Mamoru, Suzuki Hideo" and therefor --Mamoru Kimpara, Hideo Suzuki --.

Signed and Sealed this

Twenty-seventh Day of September, 1994

Attest:

BRUCE LEHMAN

*Attesting Officer*  *Commissioner of Patents and Trademarks*